United States Patent [19]
Takeo et al.

[11] Patent Number: 5,999,638
[45] Date of Patent: *Dec. 7, 1999

[54] METHOD AND APPARATUS FOR ADJUSTING READ-OUT CONDITIONS AND/OR IMAGE PROCESSING CONDITIONS FOR RADIATION IMAGES, RADIATION IMAGE READ-OUT APPARATUS, AND RADIATION IMAGE ANALYZING METHOD AND APPARATUS

[75] Inventors: Hideya Takeo; Wataru Ito; Kazuo Shimura, all of Kanagawa-ken, Japan

[73] Assignee: Fuji Photo Film Co., Ltd., Kanagawa, Japan

[*] Notice: This patent is subject to a terminal disclaimer.

[21] Appl. No.: 08/591,934

[22] Filed: Jan. 29, 1996

Related U.S. Application Data

[62] Division of application No. 08/164,825, Dec. 9, 1993, Pat. No. 5,515,450, which is a continuation of application No. 07/687,140, Apr. 18, 1991, abandoned.

[30] Foreign Application Priority Data

| Apr. 18, 1990 | [JP] | Japan | 2-102015 |
| Apr. 19, 1990 | [JP] | Japan | 2-103392 |
| Jul. 31, 1990 | [JP] | Japan | 2-203070 |
| Aug. 20, 1990 | [JP] | Japan | 2-218483 |
| Sep. 14, 1990 | [JP] | Japan | 2-244193 |
| Oct. 15, 1990 | [JP] | Japan | 2-275584 |
| Oct. 17, 1990 | [JP] | Japan | 2-277996 |
| Oct. 19, 1990 | [JP] | Japan | 2-282801 |
| Mar. 13, 1991 | [JP] | Japan | 3-48362 |
| Mar. 15, 1991 | [JP] | Japan | 3-51132 |
| Apr. 5, 1991 | [JP] | Japan | 3-73268 |

[51] Int. Cl.$^6$ .................................................. G06K 9/00

[52] U.S. Cl. .................... 382/132; 382/159; 250/581; 250/587

[58] Field of Search ................................. 382/128, 132, 382/159, 156, 168; 364/413.13; 395/21, 22; 250/484.4, 580, 581, 584, 587

[56] References Cited

U.S. PATENT DOCUMENTS

4,887,305  12/1989  Shimura ................................... 382/51

(List continued on next page.)

FOREIGN PATENT DOCUMENTS

0409206  1/1991  European Pat. Off. ........ G01F 15/68

OTHER PUBLICATIONS

"Statistical Image Processing With a Hybrid Flying Window Scanning System," Indebetouw, 2417 Optical Engineering, Feb. 25, 1986, No. 2.

(List continued on next page.)

*Primary Examiner*—Matthew C. Bella
*Attorney, Agent, or Firm*—Sughrue, Mion, Zinn Macpeak & Seas, PLLC

[57] ABSTRACT

A first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected. A second image signal representing the radiation image is thereafter obtained by again exposing the stimulable phosphor sheet to stimulating rays, the light emitted by the stimulable phosphor sheet being detected. Read-out conditions, under which the second image signal is to be obtained, and/or image processing conditions, under which the second image signal having been obtained is to be image processed, are adjusted on the basis of the first image signal. A storage device stores information representing a standard pattern of radiation images. A signal transforming device transforms the first image signal representing the radiation image into a transformed image signal representing the radiation image, which has been transformed into the standard pattern. A condition adjuster is provided with a neural network, which receives the transformed image signal and feeds out information representing the read-out conditions and/or the image processing conditions.

8 Claims, 25 Drawing Sheets

U.S. PATENT DOCUMENTS

| | | | |
|---|---|---|---|
| 4,933,872 | 6/1990 | Vandeburg et al. | 364/518 |
| 5,056,147 | 10/1991 | Turner et al. | 382/14 |
| 5,079,698 | 1/1992 | Grenier et al. | 364/413.13 |
| 5,109,275 | 4/1992 | Naka et al. | 358/80 |
| 5,157,733 | 10/1992 | Takeo et al. | 382/6 |
| 5,272,339 | 12/1993 | Shimura et al. | 250/584 |
| 5,502,775 | 3/1996 | Takeo | 382/156 |

OTHER PUBLICATIONS

"Learning Representations by Back–Propagating Errors", D.E. Rumelhart et al., Nature, vol. 323, Oct. 9, 1986, pp. 533–536.

"Neural Computer", Kazuyuki Aihara, The Publishing Bureau of Tokyo Denki University, pp. 1–180, 1988.

"Learning Internal Representations by Error Propagation", D.E. Rumelhart et al., Parallel Distributed Processing, pp. 319–362.

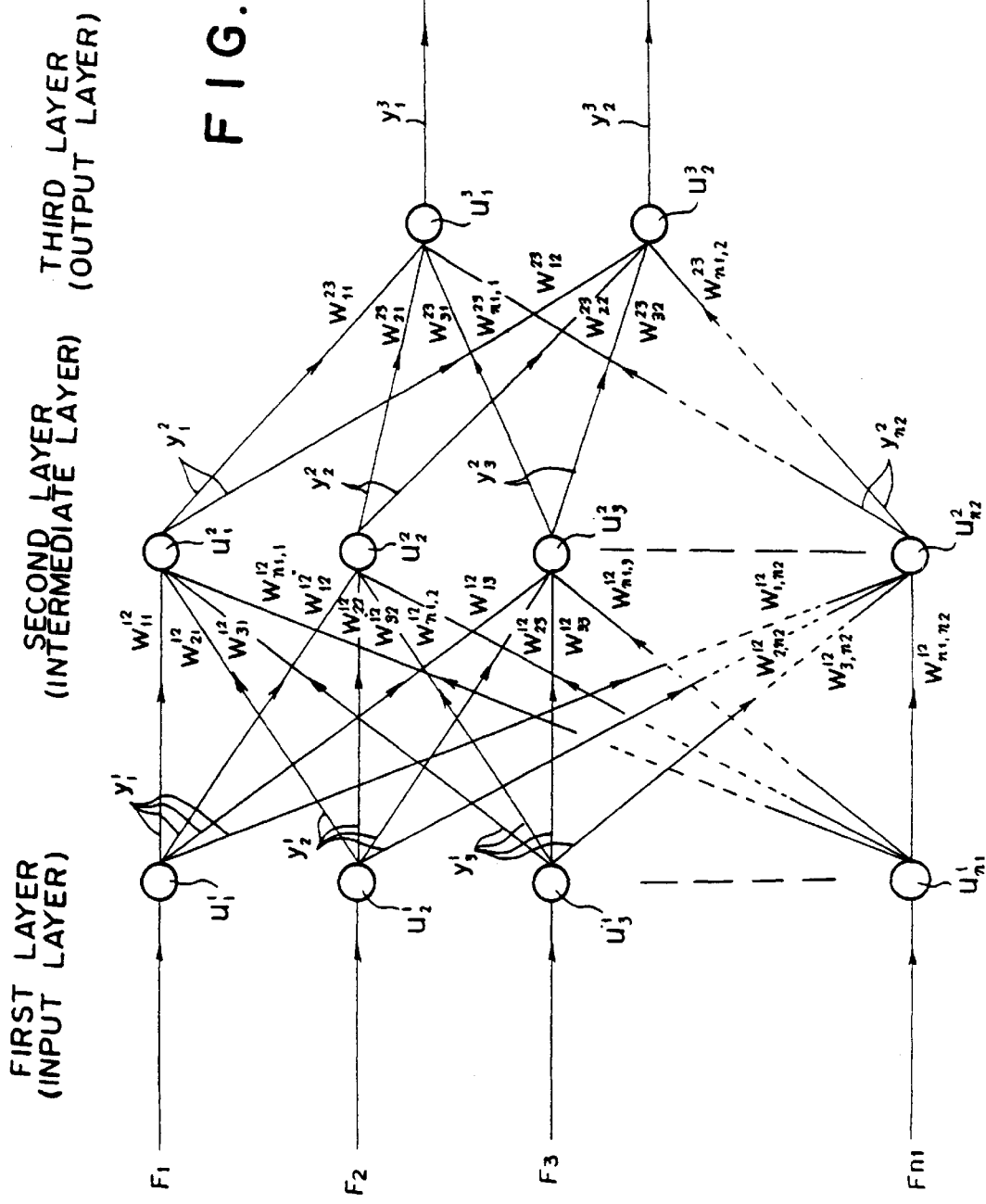

F I G. 8
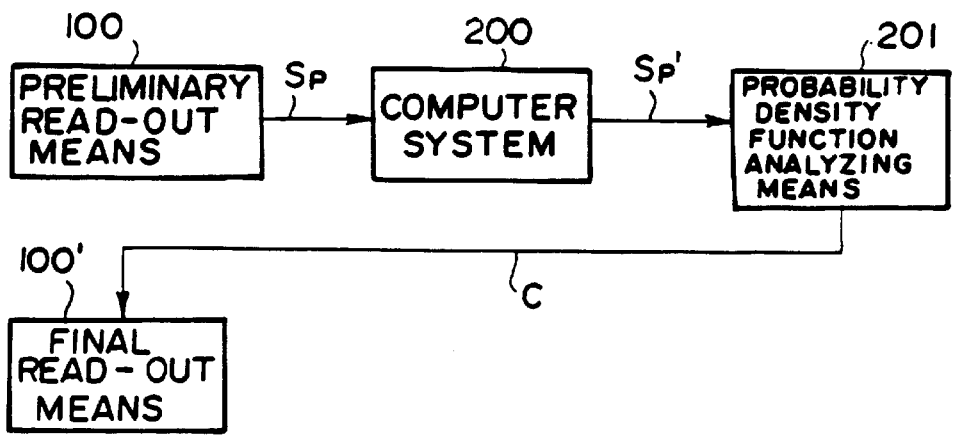
F I G. 9
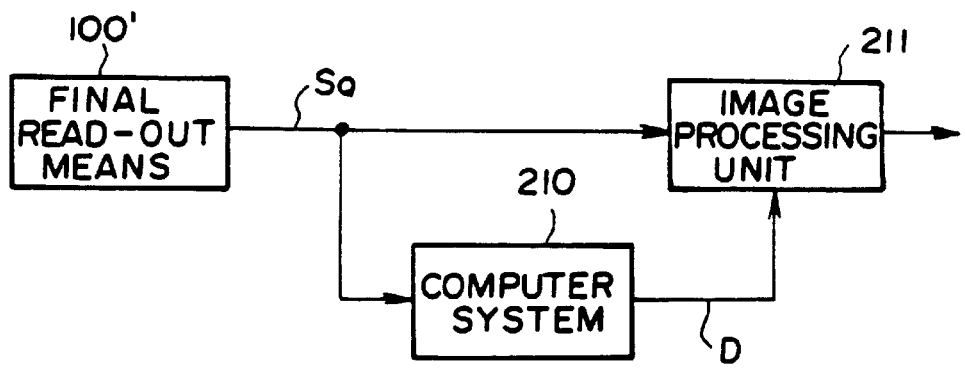
F I G. 10
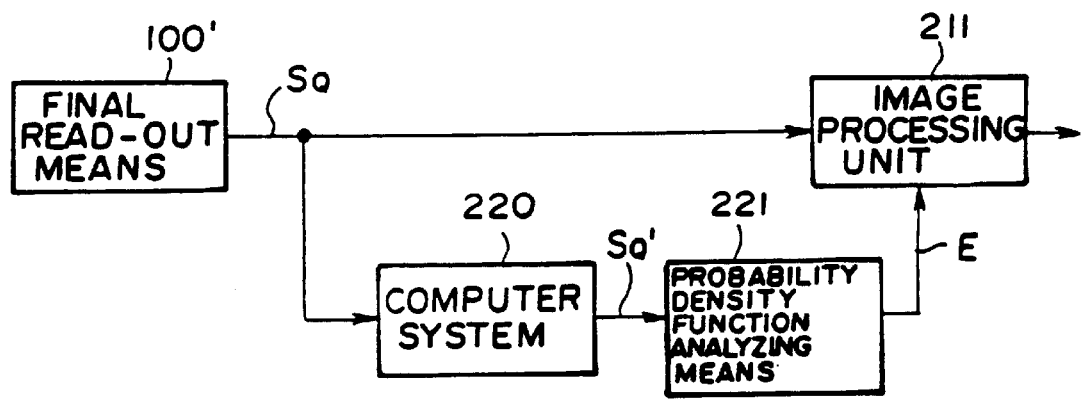

F I G. 11
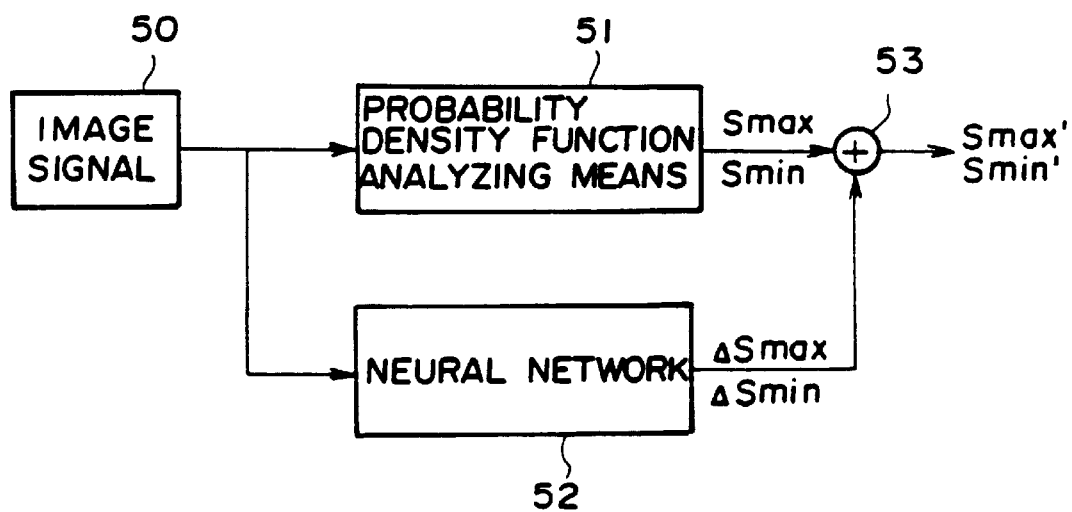

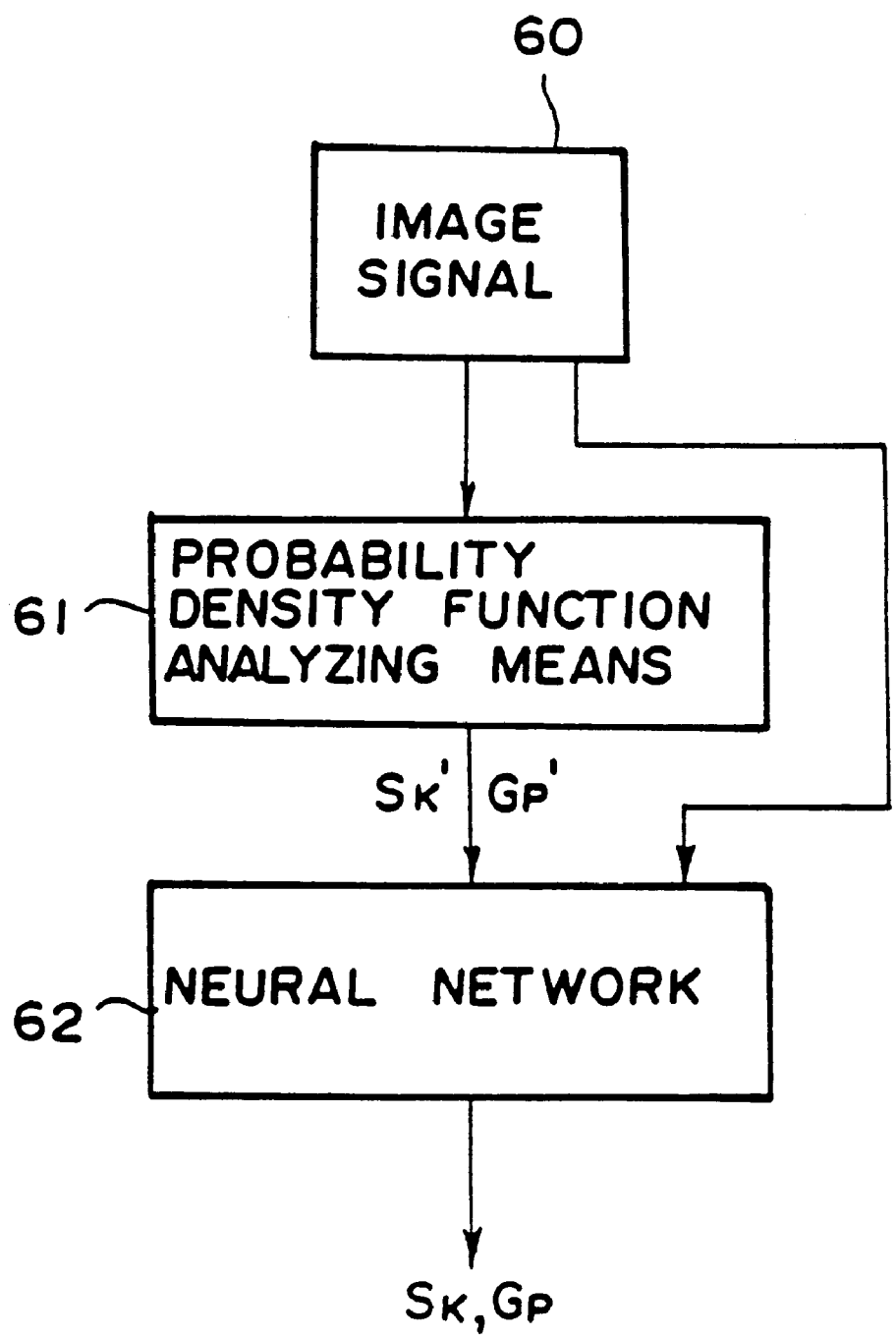

F I G.14
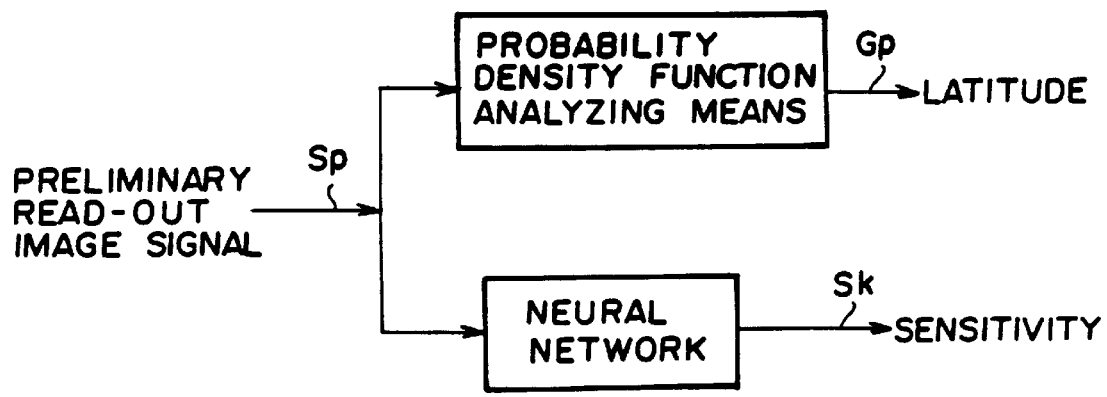

F I G. 17
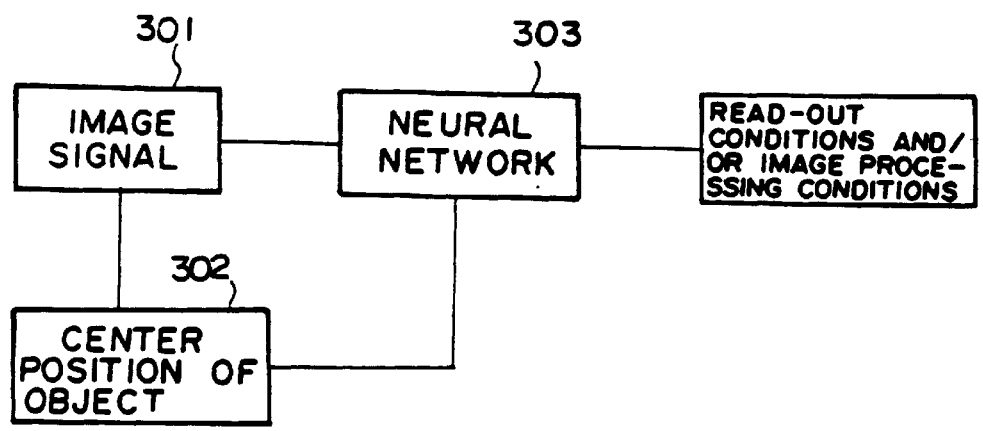
F I G. 18A
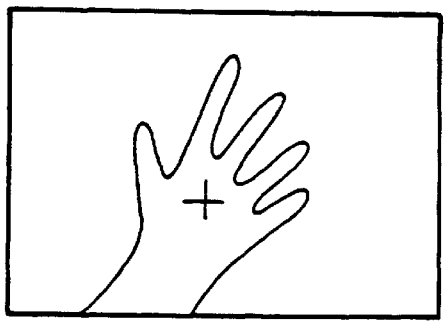
F I G. 18B
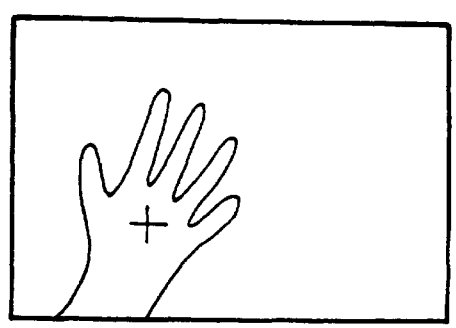

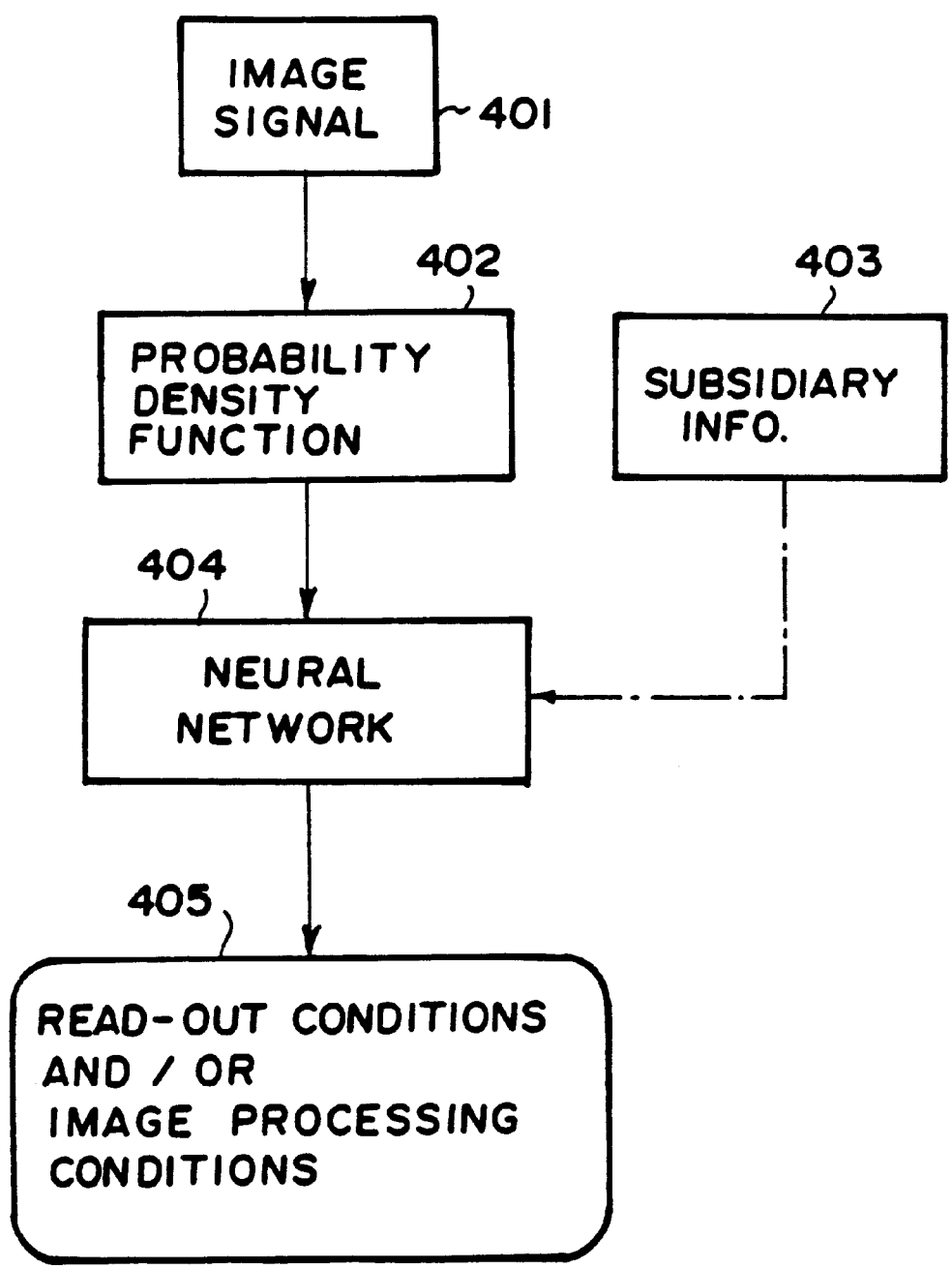
F I G . 19

F I G. 21
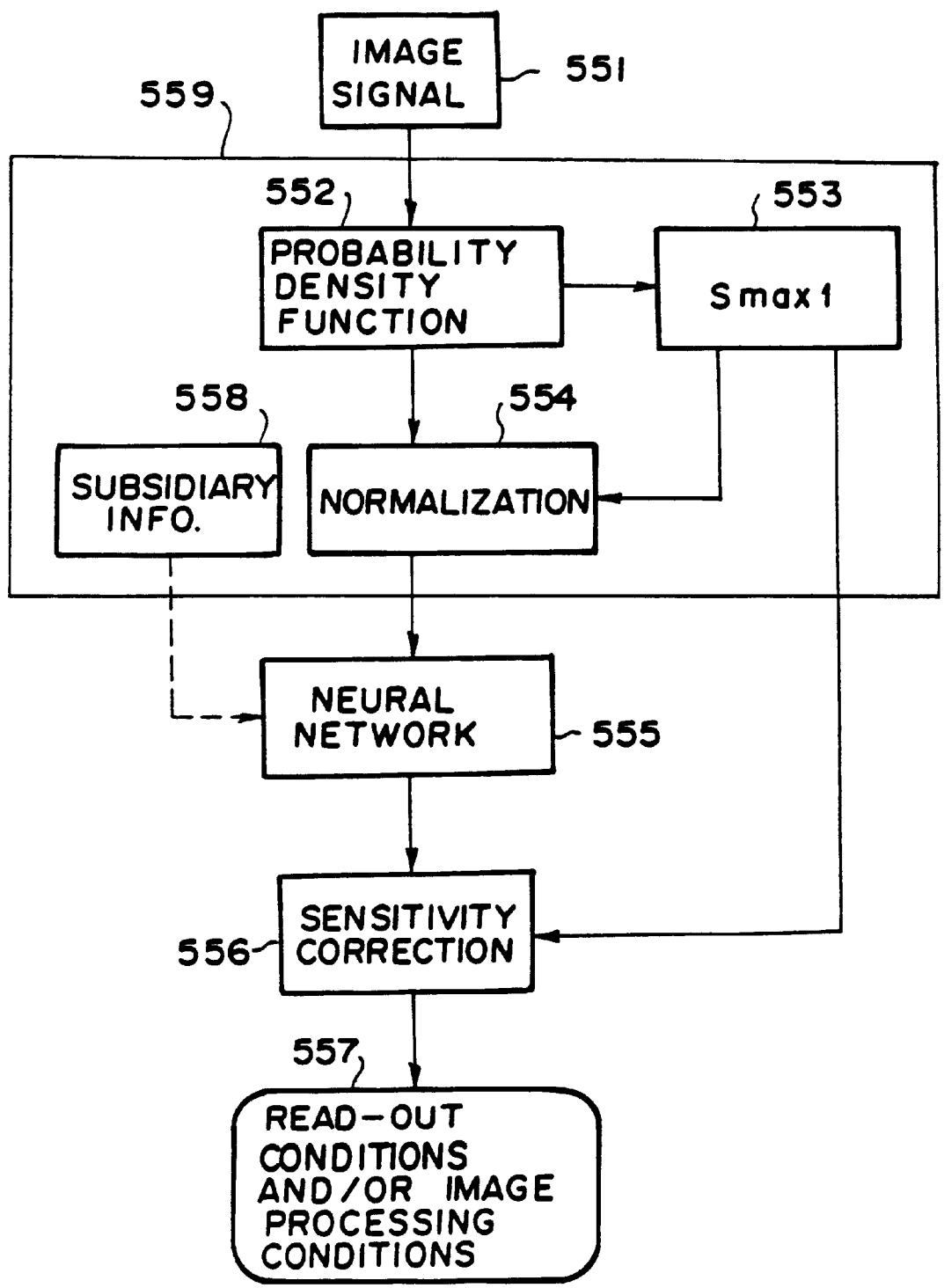

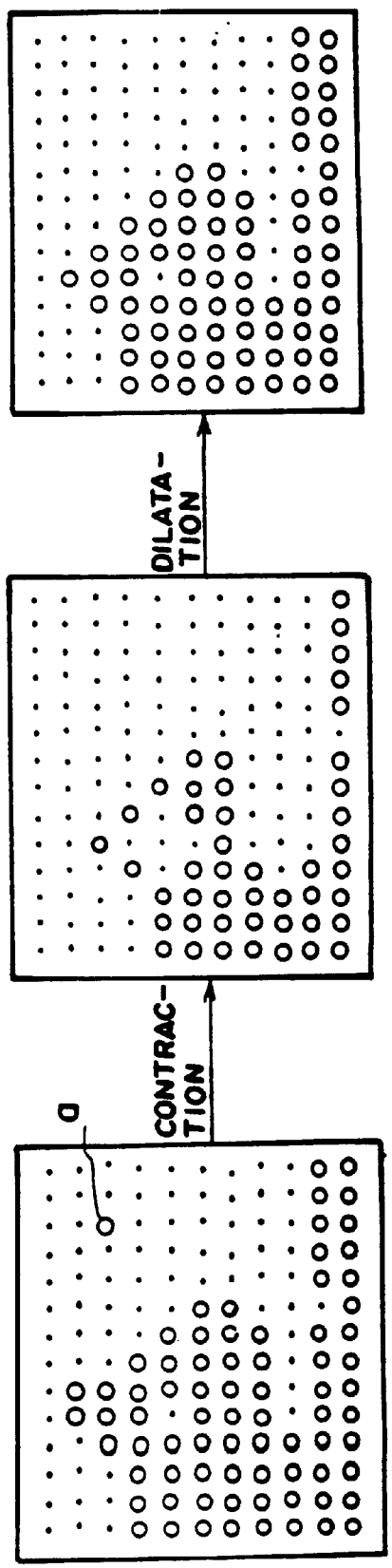

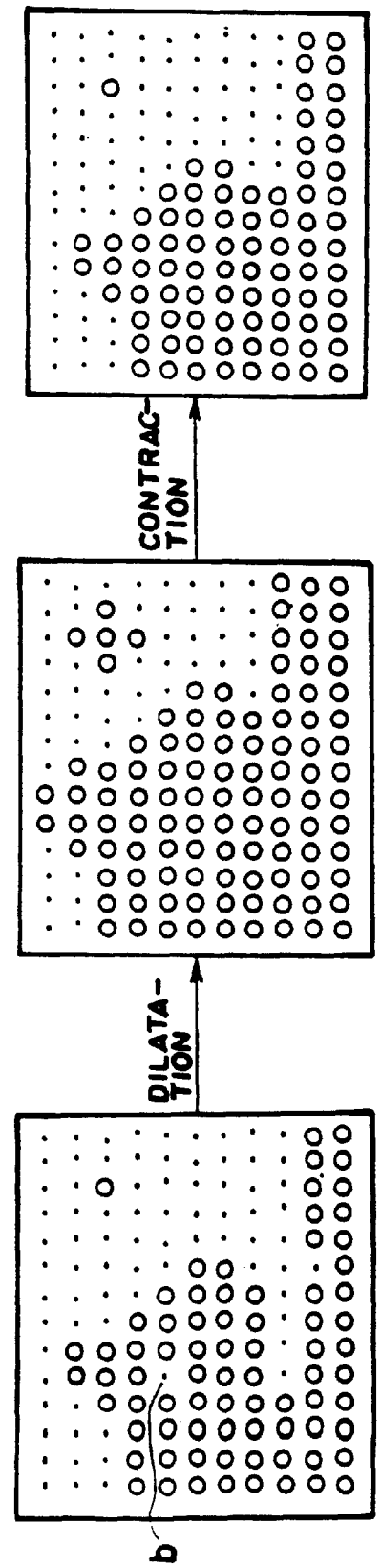

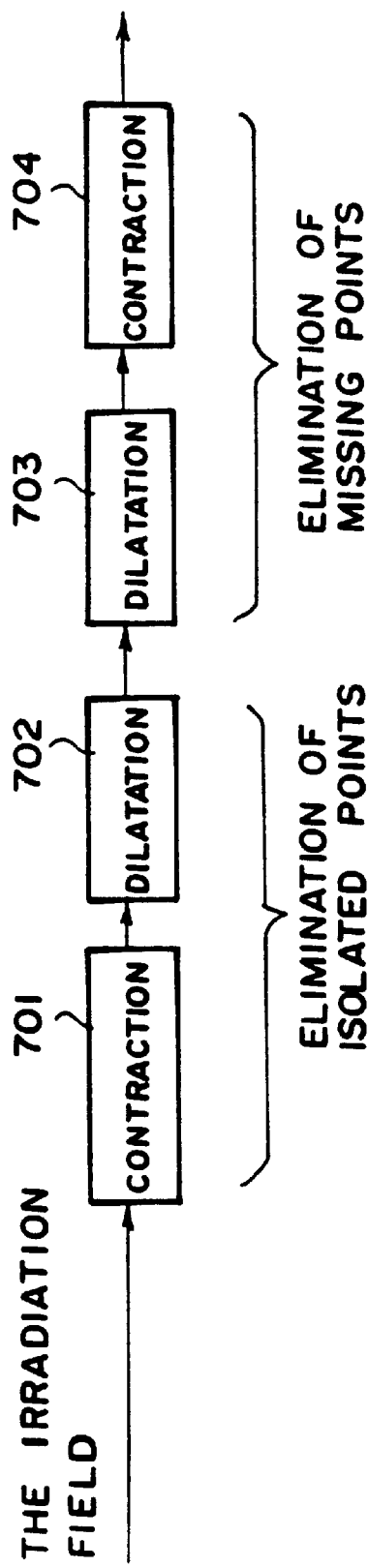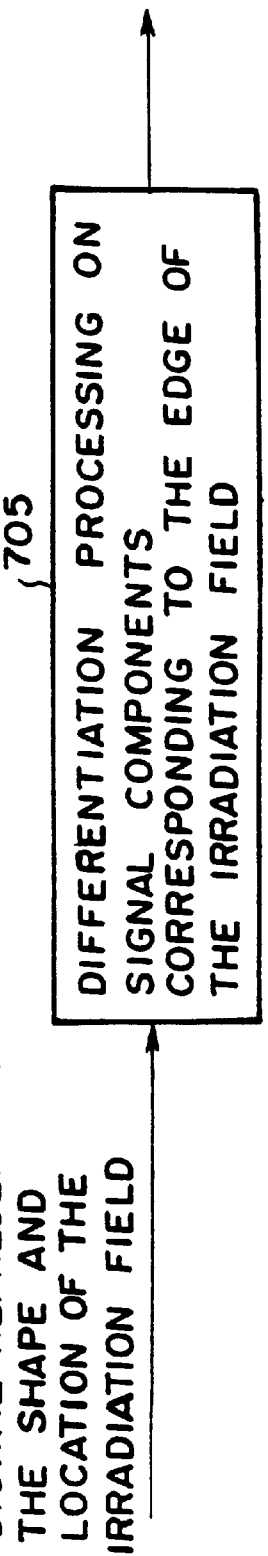

METHOD AND APPARATUS FOR ADJUSTING READ-OUT CONDITIONS AND/OR IMAGE PROCESSING CONDITIONS FOR RADIATION IMAGES, RADIATION IMAGE READ-OUT APPARATUS, AND RADIATION IMAGE ANALYZING METHOD AND APPARATUS

This is a divisional of application Ser. No. 08/164,825 filed Dec. 9, 1993, now U.S. Pat. No. 5,515,450 which is a continuation of application Ser. No. 07/687,140 filed Apr. 18, 1991, now abandoned.

BACKGROUND OF THE INVENTION

1. Field of the Invention

This invention relates to a method and apparatus for adjusting read-out conditions and/or image processing conditions for a radiation image, wherein read-out conditions, under which a radiation image is to be read out, and/or image processing conditions, under which an image signal representing the radiation image is to be processed, are adjusted on the basis of the image signal representing the radiation image. This invention also relates to a radiation image read-out apparatus for reading out a radiation image from a recording medium, such as a stimulable phosphor sheet, on which the radiation image of an object has been stored, and an image signal representing the radiation image is thereby obtained. This invention further relates to a radiation image analyzing apparatus, wherein characteristic measures representing characteristics of a radiation image, such as read-out conditions under which the radiation image is to be read out, image processing conditions under which the image signal representing the radiation image is to be processed, and the portion of an object the image of which was recorded, are found from an image signal representing the radiation image. This invention still further relates to a radiation image analyzing method, wherein a subdivision pattern of radiation images, the shape and location of an irradiation field, an orientation in which the object was placed when the image of the object was recorded, and/or a portion of an object the image of which was recorded is determined from an image signal representing a radiation image, and a radiation image analyzing apparatus for generating characteristic measures representing the results of the determination.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal (image signal), and the image signal is processed and then used for reproducing the X-ray image as a visible image on a copy photograph, or the like. In this manner, a visible image having good image quality with high contrast, high sharpness, high graininess, or the like can be reproduced.

Also, when certain kinds of phosphors are exposed to radiation such as X-rays, α-rays, β-rays, γ-rays, cathode rays or ultraviolet-rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. A radiation image of the object is thereby stored on the stimulable phosphor sheet. The stimulable phosphor sheet is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT display device.

In order for an image signal to be detected accurately, certain factors which affect the image signal must be set in accordance with the dose of radiation delivered to the stimulable phosphor sheet and the like. Novel radiation image recording and reproducing systems which accurately detect an image signal have been proposed. The proposed radiation image recording and reproducing systems are constituted such that a preliminary read-out operation (hereinafter simply referred to as the "preliminary readout") is carried out in order approximately to ascertain the radiation image stored on the stimulable phosphor sheet. In the preliminary readout, the stimulable phosphor sheet is scanned with a light beam having a comparatively low energy level, and a preliminary read-out image signal obtained during the preliminary readout is analyzed. Thereafter, a final read-out operation (hereinafter simply referred to as the "final readout") is carried out to obtain the image signal, which is to be used during the reproduction of a visible image. In the final readout, the stimulable phosphor sheet is scanned with a light beam having an energy level higher than the energy level of the light beam used in the preliminary readout, and the radiation image is read out with the factors affecting the image signal adjusted to appropriate values on the basis of the results of an analysis of the preliminary read-out image signal.

The term "read-out conditions" as used hereinafter means a group of various factors, which are adjustable and which affect the relationship between the amount of light emitted by the stimulable phosphor sheet during image readout and the output of a read-out means. For example, the term "read-out conditions" may refer to a read-out gain and a scale factor which define the relationship between the input to the read-out means and the output therefrom, or to the power of the stimulating rays used when the radiation image is read out.

The term "energy level of a light beam" as used herein means the level of energy of the light beam to which the stimulable phosphor sheet is exposed per unit area. In cases where the energy of the light emitted by the stimulable phosphor sheet depends on the wavelength of the irradiated light beam, i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed at which the stimulable phosphor sheet is scanned with the light beam may be changed.

Regardless of whether the preliminary readout is or is not carried out, it has also been proposed to analyze the image signal (including the preliminary read-out image signal) obtained and to adjust the image processing conditions, which are to be used when the image signal is processed, on the basis of the results of an analysis of the image signal. The term "image processing conditions" as used herein means a group of various factors, which are adjustable and set when an image signal is subjected to processing, which affect the gradation, sensitivity, or the like, of a visible image reproduced from the image signal. The proposed method is applicable to cases where an image signal is obtained from a radiation image recorded on a recording medium such as conventional X-ray film, as well as to systems using stimulable phosphor sheets.

As disclosed in, for example, Japanese Unexamined Patent Publication Nos. 60(1985)-185944 and 61(1986)-280163, operations for calculating the values of the read-out conditions for the final readout and/or the image processing conditions are carried out by a group of algorithms which analyze an image signal (or a preliminary read-out image signal). A large number of image signals detected from a large number of radiation images are statistically processed. The algorithms which calculate the read-out conditions for the final readout and/or the image processing conditions are designed on the basis of the results obtained from this processing.

In general, the algorithms which have heretofore been employed are designed such that a probability density function of an image signal is created, and characteristic values are found from the probability density function. The characteristic values include, for example, the maximum value of the image signal, the minimum value of the image signal, or the value of the image signal at which the probability density function is maximum, i.e. the value which occurs most frequently. The read-out conditions for the final readout and/or the image processing conditions are determined on the basis of the characteristic values.

Methods for determining the read-out conditions for the final readout and/or the image processing conditions on the basis of the results of an analysis of the probability density function of an image signal can be classified into the following:

(1) a method as disclosed in Japanese Unexamined Patent Publication No. 60(1985)-156055 wherein both the maximum value and the minimum value in the range resulting in a reproduced visible image containing the necessary image information are determined from a probability density function of an image signal, and, for example, the read-out conditions for the final readout are set such that, during the final readout, the image information represented by values of the emitted light signal falling within the range of the maximum value to the minimum value is detected accurately, (2) a method as disclosed in Japanese Unexamined Patent Publication No. 60(1985)-185944 wherein only the maximum value is determined from a probability density function of an image signal, a value obtained by subtracting a predetermined value from the maximum value is taken as the minimum value, and the range between the maximum value and the minimum value is taken as the range resulting in a visible image containing the necessary image information, (3) a method as disclosed in Japanese Unexamined Patent Publication No. 61(1986)-280163 wherein only the minimum value is determined from a probability density function of an image signal, a value obtained by adding a predetermined value to the minimum value is taken as the maximum value, and the range between the minimum value and the maximum value is taken as the range resulting in a visible image containing the necessary image information, (4) a method as proposed in Japanese Unexamined Patent Publication No. 63(1988)-233658 wherein a difference probability density function is used, (5) a method as disclosed in Japanese Unexamined Patent Publication No. 61(1986)-170730 wherein a cumulative probability density function is used, and (6) a method as proposed in Japanese Unexamined Patent Publication No. 63(1988)-262141 wherein a probability density function is divided into a plurality of small regions by using a discrimination standard.

The range of an image signal resulting in a visible image containing the necessary image information is determined with one of various methods, and the read-out conditions for the final readout and/or the image processing conditions are set with respect to said range.

Recently, a method for utilizing a neural network, which is quite different from the algorithms described above, have been proposed.

Such a neural network is provided with a learning function by back propagation method. Specifically, when information (an instructor signal), which represents whether an output signal obtained when an input signal is given is or is not correct, is fed into the neural network, the weight of connections between units in the neural network (i.e. the weight of synapse connections) is corrected. By repeating the learning of the neural network, the probability that a correct answer will be obtained in response to a new input signal can be kept high. (Such functions are described in, for example, "Learning representations by back-propagating errors" by D. E. Rumelhart, G. E. Hinton and R. J. Williams, Nature, 323-9,533-356, 1986a; "Back-propagation" by Hideki Aso, Computrol, No. 24, pp. 53–60; and "Neural Computer" by Kazuyuki Aihara, the publishing bureau of Tokyo Denki University).

The neural network is also applicable when the read-out conditions for the final readout and/or the image processing conditions are to be adjusted. By feeding an image signal, or the like, into the neural network, outputs representing the values of the read-out conditions for the final readout and/or the image processing conditions can be obtained from the neural network.

When the neural network is utilized to adjust the read-out conditions for the final readout and/or the image processing conditions, by repeating the learning of the neural network, the read-out conditions for the final readout and/or the image processing conditions appropriate for a specific radiation image can be determined. However, in a single system for processing X-ray images of, for example, the shoulder of a human body, various types of image signals are obtained which represent various radiation images, such as the images of the right shoulder and the left shoulder (reversed images), an enlarged image and a reduced image, an erect image and a side image and an inverted image, and images shifted from each other. In order for a neural network to be constructed which can determine the read-out conditions for the final readout and/or the image processing conditions appropriate for each of various such images, a very large number of units should be incorporated in the neural network. Also, a storage means should be used which has a very large capacity for storing information representing the weight of connections between units in the neural network. Additionally, the learning of the neural network should be repeated very many times.

SUMMARY OF THE INVENTION

The primary object of the present invention is to provide an apparatus for adjusting read-out conditions and/or image processing conditions for a radiation image wherein, even if various image signals representing various radiation images are obtained, the read-out conditions for the final readout and/or the image processing conditions appropriate for each of the various radiation images are determined by a neural network provided with a comparatively small number of units.

Another object of the present invention is to provide a method for adjusting read-out conditions and/or image processing conditions for a radiation image wherein, even if the image density of a specific region of interest is apt to vary for different reproduced radiation images due to, for example, a shift of an object during image recording operations, the read-out conditions for the final readout and/or the image processing conditions are adjusted such that the image density of the region of interest may be kept at an appropriate level in the reproduced radiation images, and an apparatus for carrying out the method.

A further object of the present invention is to provide a radiation image read-out apparatus wherein, when radiation images of the same portion of an object are recorded in the same image recording mode and the probability density functions of the image signals representing the radiation images are close to each other, the read-out conditions for the final readout and/or the image processing conditions are adjusted to values appropriate for each of the radiation images.

A still further object of the present invention is to provide a method for adjusting read-out conditions and/or image processing conditions for a radiation image wherein, when image patterns of an object in a plurality of radiation images shift from each other, the read-out conditions for the final readout and/or the image processing conditions appropriate for each of the radiation images are determined efficiently and accurately, and an apparatus for carrying out the method.

Another object of the present invention is to provide a method for adjusting read-out conditions and/or image processing conditions for a radiation image, wherein drawbacks of a method utilizing a probability density function of an image signal and a method utilizing a neural network are eliminated, and the read-out conditions for the final readout and/or the image processing conditions are adjusted efficiently and accurately by a neural network, the learning of the neural network being repeated only a few times, and an apparatus for carrying out the method.

A further object of the present invention is to provide a radiation image analyzing apparatus, wherein a neural network provided with a comparatively small number of units is utilized, and characteristic measures representing characteristics of a radiation image, such as read-out conditions under which the radiation image is to be read out, image processing conditions under which the image signal representing the radiation image is to be processed, and the portion of an object the image of which was recorded, are found accurately from an image signal representing the radiation image.

A still further object of the present invention is to provide a radiation image analyzing method, wherein a neural network is utilized, and a subdivision pattern of radiation images, the shape and location of an irradiation field, an orientation in which the object was placed when the image of the object was recorded, and/or a portion of an object the image of which was recorded is determined accurately from an image signal representing a radiation image, and an apparatus for carrying out the method.

A first apparatus in accordance with the present invention is applicable when a stimulable phosphor sheet is used and the preliminary readout is carried out.

Specifically, the present invention provides, as a first apparatus, an apparatus for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the apparatus for adjusting read-out conditions and/or image processing conditions for a radiation image comprising:

i) a storage means for storing information representing a standard pattern of radiation images, ii) a signal transforming means for transforming said first image signal representing said radiation image into a transformed image signal representing the radiation image, which has been transformed into said standard pattern, and iii) a condition adjusting means provided with a neural network, which receives said transformed image signal and feeds out information representing the read-out conditions and/or the image processing conditions.

A second apparatus in accordance with the present invention is applicable when a stimulable phosphor sheet and other recording media are used and the image processing conditions are adjusted.

Specifically, the present invention also provides, as a second apparatus, an apparatus for adjusting image processing conditions for a radiation image, wherein image processing conditions, under which an image signal is to be image processed, are adjusted on the basis of the image signal representing a radiation image of an object, the apparatus for adjusting image processing conditions for a radiation image comprising:

i) a storage means for storing information representing a standard pattern of radiation images, ii) a signal transforming means for transforming said image signal representing said radiation image into a transformed image signal representing the radiation image, which has been transformed into said standard pattern, and iii) a condition adjusting means provided with a neural network, which receives said transformed image signal and feeds out information representing the image processing conditions.

In the first and second apparatuses in accordance with the present invention, no limitation is imposed on what pattern is employed as the standard pattern of radiation images. The standard pattern may be selected in accordance with the concept behind the design of the apparatuses, or the like.

Also, in the first and second apparatuses in accordance with the present invention, no limitation is imposed on how the image signal or the first image signal representing the radiation image is transformed into a transformed image signal representing the radiation image, which has been transformed into the standard pattern. For example, the image signal or the first image signal representing the radiation image may be transformed into a transformed image signal representing the radiation image, which has been reversed, rotated, adjusted for the position, enlarged, or reduced.

With the first and second apparatuses in accordance with the present invention, the information representing the standard pattern of radiation images is stored in the storage means. When the image signal (or the first image signal) is obtained, from which the read-out conditions for the final readout and/or the image processing conditions are to be determined, the image signal representing the radiation image is transformed into a transformed image signal representing the radiation image, which has been transformed into the standard pattern. Thereafter, the transformed image signal is fed into the neural network. Therefore, a neural network having a small scale may be used, and a storage means having a small storage capacity may be used to store the weight of connections between units of the neural network. Also, when the level of accuracy, with which the read-out conditions for the final readout and/or the image processing conditions are to be determined, is kept the same, the learning of the neural network may be repeated only a fewer times than when a conventional technique is used.

A first method in accordance with the present invention is applicable when a stimulable phosphor sheet is used and the preliminary readout is carried out.

Specifically, the present invention further provides, as a first method, a method for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the method for adjusting read-out conditions and/or image processing conditions for a radiation image comprising the steps of:

i) carrying out a condition adjustment by using a neural network, which receives said first image signal and feeds out information representing the read-out conditions and/or the image processing conditions, and ii) when learning of said neural network is carried out such that information representing appropriate read-out conditions and/or appropriate image processing conditions may be fed out, utilizing an image signal representing a radiation image, in which a pattern of a specific region of interest in an object is embedded, and read-out conditions and/or image processing conditions, which have been determined as being optimum for the pattern of said region of interest.

A second method in accordance with the present invention is applicable when a stimulable phosphor sheet is used and the preliminary readout is carried out.

Specifically, the present invention still further provides, as a second method, a method for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the method for adjusting read-out conditions and/or image processing conditions for a radiation image comprising the steps of:

i) extracting the image signal components of said first image signal, which represent a pattern of a specific region of interest in said object, said pattern being embedded in said radiation image, by using a neural network, which receives said first image signal made up of a series of image signal components and feeds out information representing the shape and location of the pattern of said region of interest, and ii) adjusting the read-out conditions and/or the image processing conditions on the basis of the extracted image signal components of said first image signal.

A third method in accordance with the present invention is applicable when a stimulable phosphor sheet and other recording media are used and the image processing conditions are adjusted.

Specifically, the present invention also provides, as a third method, a method for adjusting image processing conditions for a radiation image, wherein image processing conditions, under which an image signal is to be image processed, are adjusted on the basis of the image signal representing a radiation image of an object, the method for adjusting image processing conditions for a radiation image comprising the steps of:

i) carrying out a condition adjustment by using a neural network, which receives said image signal and feeds out information representing the image processing conditions, and ii) when learning of said neural network is carried out such that information representing appropriate image processing conditions may be fed out, utilizing an image signal representing a radiation image, in which a pattern of a specific region of interest in an object is embedded, and image processing conditions, which have been determined as being optimum for the pattern of said region of interest.

A fourth method in accordance with the present invention is applicable when a stimulable phosphor sheet and other recording media are used and the image processing conditions are adjusted.

Specifically, the present invention further provides, as a fourth method, a method for adjusting image processing conditions for a radiation image, wherein image processing conditions, under which an image signal is to be image processed, are adjusted on the basis of the image signal representing a radiation image of an object, the method for adjusting image processing conditions for a radiation image comprising the steps of:

i) extracting the image signal components of said image signal, which represent a pattern of a specific region of interest in said object, said pattern being embedded in said radiation image, by using a neural network, which receives said image signal made up of a series of image signal components and feeds out information representing the shape and location of the pattern of said region of interest, and ii) adjusting the image processing conditions on the basis of the extracted image signal components of said image signal.

Conventional methods for adjusting the read-out conditions for the final readout and/or the image processing conditions on the basis of the results of an analysis of a probability density function of an image signal can work efficiently in many cases. However, with the conventional methods, problems often occur depending on how a radiation image of an object is recorded. The reasons why the problems occur will be described hereinbelow by taking radiation images, in which patterns of a shoulder joint are embedded, as an example.

FIGS. 6A and 6B show radiation images in which a pattern of a shoulder joint 9 is embedded. The two radiation images differ from each other in that the radiation image of FIG. 6B includes the patterns of vertebral bodies 10, and the radiation image of FIG. 6A does not include them. FIGS. 7A and 7B show probability density functions of image signals representing the radiation images shown in FIGS. 6A and 6B.

As shown in FIGS. 7A and 7B, the two probability density functions are approximately identical with each other. However, the two radiation images have the difference described above. Therefore, the image signal components representing the pattern of the shoulder joint 9, which is taken as a region of interest, fall within the range K1 in the probability density function shown in FIG. 7A and within the range K2 in the probability density function shown in FIG. 7B. When the read-out conditions for the final readout and/or the image processing conditions are determined from each of the two probability density functions, and visible images of the radiation images shown in FIGS. 6A and 6B are reproduced from the image signals obtained under these conditions, because the two probability density functions are approximately identical with each other, approximately the same values are calculated as the read-out conditions for the final readout and/or the image processing conditions. As a result, two reproduced visible images are obtained which have approximately the same image density and contrast. Therefore, the image density of the pattern of the shoulder joint, which is taken as the region of interest, cannot be kept appropriate.

In such cases, the pattern of the region of interest is not illustrated clearly in the reproduced visible image. Also, for example, when a plurality of reproduced visible images are compared with each other in order for the course of an abnormal part of an object to be investigated, a correct diagnosis cannot be made.

The first, second, third, and fourth methods in accordance with the present invention eliminates the problems described above.

With the first and third methods in accordance with the present invention, the neural network is used to determine the read-out conditions for the final readout and/or the image processing conditions. By repeating the learning of the neural network, appropriate read-out conditions for the final readout and/or appropriate image processing conditions can be determined.

Also, the learning of the neural network is carried out by utilizing an image signal representing a radiation image, in which a pattern of a specific region of interest in an object is embedded, and the read-out conditions for the final readout and/or the image processing conditions, which have been determined as being optimum for the pattern of the region of interest. Therefore, even if the radiation image includes the pattern of the region of interest and other patterns, the read-out conditions for the final readout and/or the image processing conditions can be set to values appropriate for the pattern of the region of interest.

With the second and fourth methods in accordance with the present invention, by repeating the learning of the neural network, the shape and location of the pattern of the region of interest can be determined accurately. The read-out conditions for the final readout and/or the image processing conditions are then determined on the basis of the image signal components of the first image signal representing the pattern of the region of interest. Therefore, the read-out conditions for the final readout and/or the image processing conditions are basically free of adverse effects of the image information other than the pattern of the region of interest and can be set to be appropriate for the pattern of the region of interest.

In order for the read-out conditions for the final readout and/or the image processing conditions to be adjusted on the basis of the image signal components of the first image signal representing the pattern of the region of interest, a technique for analyzing a probability density function may be utilized. Alternatively, a neural network independent of the neural network for determining the shape and location of the pattern of the region of interest may be utilized.

A fifth method in accordance with the present invention is applicable when a stimulable phosphor sheet is used and the preliminary readout is carried out.

Specifically, the present invention still further provides, as a fifth method, a method for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the method for adjusting read-out conditions and/or image processing conditions for a radiation image comprising the steps of:

i) carrying out a temporary condition adjustment by using a probability density function analyzing means, which receives said first image signal, temporarily adjusts the read-out conditions and/or the image processing conditions on the basis of the results of an analysis of a probability density function of said first image signal, and feeds out information representing the read-out conditions and/or the image processing conditions, which have been adjusted temporarily, ii) correcting the read-out conditions and/or the image processing conditions, which have been adjusted temporarily by said probability density function analyzing means, by using a neural network, which receives said first image signal and feeds out information representing correction values to be used in correcting the read-out conditions and/or the image processing conditions, which have been adjusted temporarily, and iii) thereby finally adjusting the read-out conditions and/ or the image processing conditions.

A sixth method in accordance with the present invention is applicable when image signals detected from radiation images stored on a stimulable phosphor sheet and other recording media are processed.

Specifically, the present invention also provides, as a sixth method, a method for adjusting image processing conditions for a radiation image, wherein image processing conditions, under which an image signal is to be image processed, are adjusted on the basis of the image signal representing a radiation image of an object, the method for adjusting image processing conditions for a radiation image comprising the steps of:

i) carrying out a temporary condition adjustment by using a probability density function analyzing means, which receives said image signal, temporarily adjusts the image processing conditions on the basis of the results of an analysis of a probability density function of said image signal, and feeds out information representing the image processing conditions, which have been adjusted temporarily, ii) correcting the image processing conditions, which have been adjusted temporarily by said probability density function analyzing means, by using a neural network, which receives said image signal and feeds out information representing correction values to be used in correcting the image processing conditions, which have been adjusted temporarily, and iii) thereby finally adjusting the image processing conditions.

The fifth and sixth methods in accordance with the present invention are characterized by carrying out necessary corrections by using the neural network in a method for adjusting read-out conditions and/or image processing conditions for a radiation image wherein there is the risk that errors may occur in adjusting the conditions when only the analysis of a probability density function is carried out.

A seventh method in accordance with the present invention is applicable when a stimulable phosphor sheet is used and the preliminary readout is carried out.

Specifically, the present invention further provides, as a seventh method, a method for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the method for adjusting read-out conditions and/or image processing conditions for a radiation image comprising the steps of:

i) carrying out a temporary condition adjustment by using a probability density function analyzing means, which receives said first image signal, temporarily adjusts the read-out conditions and/or the image processing conditions on the basis of the results of an analysis of a probability density function of said first image signal, and feeds out information representing the read-out conditions and/or the image processing conditions, which have been adjusted temporarily, and ii) finally adjusting the read-out conditions and/or the image processing conditions by using a neural network, which receives said first image signal and said information representing the read-out conditions and/or the image processing conditions having been adjusted temporarily and feeds out information representing the read-out conditions and/or the image processing conditions, which have been adjusted finally.

An eighth method in accordance with the present invention is applicable when image signals detected from radiation images stored on a stimulable phosphor sheet and other recording media are processed.

Specifically, the present invention also provides, as an eighth method, a method for adjusting image processing conditions for a radiation image, wherein image processing conditions, under which an image signal is to be image processed, are adjusted on the basis of the image signal representing a radiation image of an object, the method for adjusting image processing conditions for a radiation image comprising the steps of:

i) carrying out a temporary condition adjustment by using a probability density function analyzing means, which receives said image signal, temporarily adjusts the image processing conditions on the basis of the results of an analysis of a probability density function of said image signal, and feeds out information representing the image processing conditions, which have been adjusted temporarily, and ii) finally adjusting the image processing conditions by using a neural network, which receives said image signal and said information representing the image processing conditions having been adjusted temporarily and feeds out information representing the image processing conditions, which have been adjusted finally.

The seventh and eighth methods in accordance with the present invention are characterized by employing the read-out conditions for the final readout and/or the image processing conditions, which have been determined on the basis of the results of an analysis of the probability density function of the image signal, as temporary adjusted conditions in a method for adjusting read-out conditions and/or image processing conditions for a radiation image wherein there is the risk that errors may occur in adjusting the conditions when only the analysis of a probability density function is carried out. The read-out conditions for the final readout and/or the image processing conditions are then finally adjusted by the neural network on the basis of the image signal and the temporary adjusted conditions.

The present invention further provides a third apparatus for carrying out the fifth method in accordance with the present invention.

Specifically, the present invention further provides, as a third apparatus, an apparatus for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the apparatus for adjusting read-out conditions and/or image processing conditions for a radiation image comprising:

i) a probability density function analyzing means, which receives said first image signal, temporarily adjusts the read-out conditions and/or the image processing conditions on the basis of the results of an analysis of a probability density function of said first image signal, and feeds out information representing the read-out conditions and/or the image processing conditions, which have been adjusted temporarily, ii) a neural network, which receives said first image signal and feeds out information representing correction values to be used in correcting the read-out conditions and/or the image processing conditions, which have been adjusted temporarily by said probability density function analyzing means, and iii) an addition means for adding said correction values, which are represented by the information received from said neural network, to the read-out conditions and/or the image processing conditions, which have been adjusted temporarily by said probability density function analyzing means, and feeding out information representing the read-out conditions and/or the image processing conditions, which have thus been adjusted finally.

The present invention still further provides, as a fourth apparatus, an apparatus for adjusting image processing conditions for a radiation image, wherein image processing conditions, under which an image signal is to be image processed, are adjusted on the basis of the image signal representing a radiation image of an object, the apparatus for adjusting image processing conditions for a radiation image comprising:

i) a probability density function analyzing means, which receives said image signal, temporarily adjusts the image processing conditions on the basis of the results of an analysis of a probability density function of said image signal, and feeds out information representing the image processing conditions, which have been adjusted temporarily, ii) a neural network, which receives said image signal and feeds out information representing correction values to be used in correcting the image processing conditions, which have been adjusted temporarily by said probability density function analyzing means, and iii) an addition means for adding said correction values, which are represented by the information received from said neural network, to the image processing conditions, which have been adjusted temporarily by said probability density function analyzing means, and feeding out information representing the image processing conditions, which have thus been adjusted finally.

The present invention also provides a fifth apparatus for carrying out the seventh method in accordance with the present invention.

Specifically, the present invention also provides, as a fifth apparatus, an apparatus for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the apparatus for adjusting read-out conditions and/or image processing conditions for a radiation image comprising:

i) a probability density function analyzing means, which receives said first image signal, temporarily adjusts the read-out conditions and/or the image processing conditions on the basis of the results of an analysis of a probability density function of said first image signal, and feeds out information representing the read-out conditions and/or the image processing conditions, which have been adjusted temporarily, and ii) a neural network, which receives said first image signal and said information representing the read-out conditions and/or the image processing conditions having been adjusted temporarily and feeds out information representing the read-out conditions and/or the image processing conditions, which have been adjusted finally.

The present invention further provides, as a sixth apparatus, an apparatus for adjusting image processing conditions for a radiation image, wherein image processing conditions, under which an image signal is to be image processed, are adjusted on the basis of the image signal representing a radiation image of an object, the apparatus for adjusting image processing conditions for a radiation image comprising:

i) a probability density function analyzing means, which receives said image signal, temporarily adjusts the image processing conditions on the basis of the results of an analysis of a probability density function of said image signal, and feeds out information representing the image processing conditions, which have been adjusted temporarily, and ii) a neural network, which receives said image signal and said information representing the image processing conditions having been adjusted temporarily and feeds out information representing the image processing conditions, which have been adjusted finally.

By feeding an image signal representing a radiation image into a neural network, the read-out conditions for the final readout and/or the image processing conditions can be adjusted only with the neural network. However, in the fifth and sixth methods and the third and fourth apparatuses in accordance with the present invention, a neural network is used, which receives the image signal and feeds out information representing correction values to be used in correcting the read-out conditions for the final readout and/or the image processing conditions, which have been adjusted temporarily by the probability density function analyzing means. The read-out conditions for the final readout and/or the image processing conditions, which have been adjusted temporarily by the probability density function analyzing means, are corrected with the correction values. The read-out conditions for the final readout and/or the image processing conditions are thereby adjusted finally.

In the seventh and eighth methods and the fifth and sixth apparatuses in accordance with the present invention, the image signal representing a radiation image and the information representing the read-out conditions for the final readout and/or the image processing conditions, which have been adjusted temporarily, are fed into the neural network. From the neural network, the information representing the read-out conditions for the final readout and/or the image processing conditions, which have been adjusted finally, are fed out.

As described above, in the fifth and sixth methods and the third and fourth apparatuses in accordance with the present invention, the neural network is used, which receives the image signal and feeds out the information representing the necessary correction values. In the seventh and eighth methods and the fifth and sixth apparatuses in accordance with the present invention, the neural network is used, which receives the image signal and the information representing the read-out conditions for the final readout and/or the image processing conditions having been adjusted temporarily and feeds out the information representing the read-out conditions for the final readout and/or the image processing conditions, which have been adjusted finally. When the learning of the neural network is carried out, the information representing the necessary correction values or the information representing the final read-out conditions for the final readout and/or the final image processing conditions are used as instructor signals.

With the fifth and sixth methods and the third and fourth apparatuses in accordance with the present invention, the read-out conditions for the final readout and/or the image processing conditions, which have been adjusted temporarily by the probability density function analyzing means, are corrected by the neural network, which receives the image signal and feeds out the information representing correction values to be used in correcting the read-out conditions for the final readout and/or the image processing conditions, which have been adjusted temporarily. The read-out conditions for the final readout and/or the image processing conditions are thereby adjusted finally. Also, with the seventh and eighth methods and the fifth and sixth apparatuses in accordance with the present invention, the image signal and the information representing the read-out conditions for the final readout and/or the image processing conditions, which have been adjusted temporarily by the probability density function analyzing means, are fed into the neural network. The information representing the read-out conditions for the final readout and/or the image processing conditions, which have been adjusted finally, are fed out from the neural network. Therefore, errors occurring when only the analysis of a probability density function of an image signal is carried out can be eliminated, and the read-out conditions for the final readout and/or the image processing conditions can be adjusted accurately.

The present invention still further provides, as a seventh apparatus, a radiation image read-out apparatus wherein a stimulable phosphor sheet is used and the preliminary read-out is carried out.

Specifically, the present invention still further provides, as a seventh apparatus, a radiation image read-out apparatus comprising:

i) a preliminary read-out means for exposing a stimulable phosphor sheet, on which the radiation image has been stored, to stimulating rays, which cause the stimulable phosphor sheet to emit light in proportion to the amount of energy stored thereon during its exposure to radiation, detecting the emitted, and thereby obtaining a preliminary read-out image signal representing said radiation image of said object, ii) a final read-out means for again exposing said stimulable phosphor sheet to stimulating rays, which cause said stimulable phosphor sheet to emit light in proportion to the amount of energy stored thereon during its exposure to radiation, detecting the emitted, and thereby obtaining a final read-out image signal representing said radiation image of said object, iii) a latitude operating means for creating a probability density function of said preliminary read-out image signal, and determining a latitude on the basis of the results of an analysis of the probability density function, the latitude constituting one of read-out conditions, under which said final read-out image signal is to be obtained, and/or image processing conditions, under which said final read-out image signal having been obtained is to be image processed, and iv) a sensitivity operating means provided with a neural network, which receives said preliminary read-out image signal and feeds out information representing sensitivity, the sensitivity constituting one of the read-out conditions and/or the image processing conditions.

The present invention also provides, as an eighth apparatus, a radiation image read-out apparatus wherein a stimulable phosphor sheet and other recording media are used and no preliminary readout is carried out.

Specifically, the present invention also provides, as an eighth apparatus, a radiation image read-out apparatus comprising:

i) a read-out means for reading out a radiation image of an object from a recording media, on which the radiation image has been recorded, and thereby obtaining an image signal representing said radiation image of said object, ii) a latitude operating means for creating a probability density function of said image signal, and determining a latitude on the basis of the results of an analysis of the probability density function, the latitude constituting one of image processing conditions, under which said image signal is to be image processed, and iii) a sensitivity operating means provided with a neural network, which receives said image signal and feeds out information representing sensitivity, the sensitivity constituting one of the image processing conditions.

The read-out conditions for the final readout can be classified into the latitude Gp and the sensitivity Sk. The latitude Gp corresponds to the ratio of the largest amount of emitted light, which is capable of being accurately converted into an image signal, to the smallest amount of emitted light, which is capable of being accurately converted into an image signal. The sensitivity Sk corresponds to the photoelectric conversion factor, which represents to what image signal level a predetermined amount of emitted light is to be converted.

The image processing conditions can be classified into the latitude Gp and the sensitivity Sk. In this case, the latitude Gp corresponds to the magnification of conversion of the span of an image signal, which represents what span of the original image signal is to be converted into the whole span (e.g. four orders of ten) of the processed image signal. Also, the sensitivity Sk corresponds to the amount of shift of the value of an image signal, which represents to what image signal value the original image signal having a predetermined value is to be converted.

In cases where a plurality of images of the same portion of an object were recorded in the same image recording mode and the region of interest is the same, even if the object shifted during a plurality of operations for recording the images, the latitude Gp is kept the same, and only the sensitivity Sk varies for different images.

Therefore, in the seventh and eighth apparatuses in accordance with the present invention, the latitude Gp is determined on the basis of the results of an analysis of the probability density function of the image signal (or the preliminary read-out image signal). The sensitivity Sk is directly determined from the radiation image by using the neural network.

The learning of the neural network is carried out such that, when the image signal (or the preliminary read-out image signal) is fed into the neural network, it may feed out the information representing an appropriate sensitivity Sk. Therefore, for example, in cases where the object shifted during a plurality of operations for recording the images and the image patterns of the object in a plurality of radiation images shift from each other, the sift can be found and an appropriate sensitivity Sk can be determined.

As described above, the latitude Gp is determined on the basis of the results of an analysis of the probability density function of the image signal (or the preliminary read-out image signal), and the sensitivity Sk is determined by the neural network. Therefore, even if a shift of an object during the image recording operations, or the like, occurred and appropriate read-out conditions for the final readout and/or appropriate image processing conditions cannot be determined only with a conventional analysis of the probability density function, the read-out conditions for the final readout and/or the image processing conditions can be adjusted accurately with the seventh and eighth apparatuses in accordance with the present invention.

The neural network may be constructed such that it can determine both the sensitivity Sk and the latitude Gp.

However, in cases where the neural network may be constructed such that it can determine both the sensitivity Sk and the latitude Gp, the neural network becomes very complicated, and a storage means having a very large storage capacity should be used to store information representing the weight of connections between units, which constitute the neural network. Also, the learning of the neural network should be repeated very many times. Additionally, a long time is required between when the image signal (or the preliminary read-out image signal) is fed into the neural network and when the sensitivity Sk and the latitude Gp are determined.

The seventh and eighth apparatuses in accordance with the present invention are provided with both the latitude operating means for analyzing the probability density function and the neural network. However, the seventh and eighth apparatuses in accordance with the present invention can be kept simpler in configuration than an apparatus wherein both the sensitivity Sk and the latitude Gp are determined by a neural network. Also, with the seventh and eighth apparatuses in accordance with the present invention, a storage means having a small storage capacity may be used, and the sensitivity Sk and the latitude Gp can be adjusted quickly. Additionally, the learning of the neural network may be repeated only a few times.

A ninth method in accordance with the present invention is applicable when a stimulable phosphor sheet is used and the preliminary readout is carried out.

Specifically, the present invention further provides, as a ninth method, a method for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the method for adjusting read-out conditions and/or image processing conditions for a radiation image comprising the steps of:

i) using a neural network, which receives said first image signal and feeds out information representing the read-out conditions and/or the image processing conditions, and ii) feeding information, which represents the position of the center point of the pattern of said object in said radiation image, into said neural network, said neural network adjusting the read-out conditions and/or the image processing conditions on the basis of said first image signal by taking the position of the center point of the pattern of said object into consideration.

The ninth method is carried out by a ninth apparatus in accordance with the present invention.

Specifically, the present invention still further provides, as a ninth apparatus, an apparatus for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the apparatus for adjusting read-out conditions and/or image processing conditions for a radiation image comprising:

i) a means for determining the position of the center point of the pattern of said object in said radiation image from said first image signal, and feeding out information representing the position of the center point of the pattern of said object, and ii) a neural network, which receives said first image signal and the output of said means for determining the position of the center point of the pattern of said object, adjusts the read-out conditions and/or the image processing conditions on the basis of said first image signal by taking the position of the center point of the pattern of said object into consideration, and feeds out information representing the conditions, which have thus been adjusted.

A tenth method in accordance with the present invention is applicable when a stimulable phosphor sheet and other recording media are used and the image processing conditions are adjusted.

Specifically, the present invention also provides, as a tenth method, a method for adjusting image processing conditions for a radiation image, wherein image processing conditions, under which an image signal is to be image processed, are adjusted on the basis of the image signal representing a radiation image of an object, the method for adjusting image processing conditions for a radiation image comprising the steps of:

i) using a neural network, which receives said image signal and feeds out information representing the image processing conditions, and ii) feeding information, which represents the position of the center point of the pattern of said object in said radiation image, into said neural network, said neural network adjusting the image processing conditions on the basis of said image signal by taking the position of the center point of the pattern of said object into consideration.

The tenth method is carried out by a tenth apparatus in accordance with the present invention.

Specifically, the present invention further provides, as a tenth apparatus, an apparatus for adjusting image processing conditions for a radiation image, wherein image processing conditions, under which an image signal is to be image processed, are adjusted on the basis of the image signal representing a radiation image of an object, the apparatus for adjusting image processing conditions for a radiation image comprising:

i) a means for determining the position of the center point of the pattern of said object in said radiation image from said image signal, and feeding out information representing the position of the center point of the pattern of said object, and ii) a neural network, which receives said image signal and the output of said means for determining the position of the center point of the pattern of said object, adjusts the image processing conditions on the basis of said image signal by taking the position of the center point of the pattern of said object into consideration, and feeds out information representing the conditions, which have thus been adjusted.

With the ninth and tenth methods in accordance with the present invention, a neural network is used, which receives the image signal and feeds out information representing the read-out conditions for the final readout and/or the image processing conditions. Information, which represents the position of the center point of the pattern of the object in the radiation image, is fed into the neural network. The neural network adjusts the read-out conditions for the final readout and/or the image processing conditions on the basis of the image signal by taking the position of the center point of the pattern of the object into consideration. Therefore, even if the pattern of the object in the radiation image shifts, the neural network can accurately finds the position of the pattern of the object in the radiation image and carry out operations for judgment with respect to the image signal close to an image signal representing a standard image. Accordingly, the read-out conditions for the final readout and/or the image processing conditions can be adjusted accurately and efficiently.

In order for the position of the center point of the pattern of the object in the radiation image to be determined, the method disclosed in, for example, Japanese Unexamined Patent Publication No. 2(1990)-28782 may be employed.

An eleventh method in accordance with the present invention is applicable when a stimulable phosphor sheet is used and the preliminary readout is carried out.

Specifically, the present invention still further provides, as an eleventh method, a method for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the method for adjusting read-out conditions and/or image processing conditions for a radiation image comprising the steps of:

i) feeding information, which represents a probability density function of said first image signal, into a neural network, and ii) feeding out information representing the read-out conditions and/or the image processing conditions from said neural network.

The present invention also provides, as a twelfth method, a method for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the method for adjusting read-out conditions and/or image processing conditions for a radiation image comprising the steps of:

i) feeding information, which represents a probability density function of said first image signal, and subsidiary information, which gives specifics about said radiation image stored on said stimulable phosphor sheet, into a neural network, and ii) feeding out information representing the read-out conditions and/or the image processing conditions from said neural network.

The present invention further provides, as a thirteenth method, a method for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the method for adjusting read-out conditions and/or image processing conditions for a radiation image comprising the steps of:

i) taking the value of said first image signal, which value represents the maximum amount of the emitted light in part of a probability density function of said first image signal other than the part corresponding to a background region in said radiation image, as the maximum value, ii) normalizing said probability density function with its maximum value in its part between said maximum value and the minimum value of said first image signal, a normalized probability density function being thereby created, iii) feeding information, which represents said normalized probability density function, into a neural network such that a predetermined value, which falls within the range of the maximum value and the minimum value of the image signal in said normalized probability density function, may always be fed into the same input unit of said neural network, iv) feeding out information representing the read-out conditions and/or the image processing conditions from said neural network, v) correcting the read-out conditions and/or the image processing conditions, which are represented by said information fed out from said neural network, on the basis of said predetermined value, and vi) thereby adjusting the final read-out conditions and/or the final image processing conditions.

The present invention still further provides, as a fourteenth method, a method for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the method for adjusting read-out conditions and/or image processing conditions for a radiation image comprising the steps of:

i) taking the value of said first image signal, which value represents the maximum amount of the emitted light in part of a probability density function of said first image signal other than the part corresponding to a background region in said radiation image, as the maximum value, ii) normalizing said probability density function with its maximum value in its part between said maximum value and the minimum value of said first image signal, a normalized probability density function being thereby created, iii) feeding information, which represents said normalized probability density function, and subsidiary information, which gives specifics about said radiation image stored on said stimulable phosphor sheet, into a neural network such that a predetermined value, which falls within the range of the maximum value and the minimum value of the image signal in said normalized probability density function, may always be fed into the same input unit of said neural network, iv) feeding out information representing the read-out conditions and/or the image processing conditions from said neural network, v) correcting the read-out conditions and/or the image processing conditions, which are represented by said information fed out from said neural network, on the basis of said predetermined value, and vi) thereby adjusting the final read-out conditions and/or the final image processing conditions.

The present invention also provides, as an eleventh apparatus, an apparatus for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the apparatus for adjusting read-out conditions and/or image processing conditions for a radiation image comprising:

i) a probability density function creating means for creating a probability density function of said first image signal and feeding out information, which represents said probability density function, and ii) a neural network for receiving said information, which represents said probability density function, from said probability density function creating means, adjusting the read-out conditions and/or the image processing conditions on the basis of said probability density function, and feeding out information representing the read-out conditions and/or the image processing conditions, which have thus been adjusted.

The present invention further provides, as a twelfth apparatus, an apparatus for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the apparatus for adjusting read-out conditions and/or image processing conditions for a radiation image comprising:

i) a probability density function creating means for creating a probability density function of said first image signal and feeding out information, which represents said probability density function, ii) a subsidiary information feed-out means for feeding out subsidiary information, which gives specifics about said radiation image stored on said stimulable phosphor sheet, and iii) a neural network for receiving said information, which represents said probability density function, from said probability density function creating means, receiving said subsidiary information from said subsidiary information feed-out means, adjusting the read-out conditions and/or the image processing conditions on the basis of said probability density function and said subsidiary information, and feeding out information representing the read-out conditions and/or the image processing conditions, which have thus been adjusted.

The present invention still further provides, as a thirteenth apparatus, an apparatus for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the apparatus for adjusting read-out conditions and/or image processing conditions for a radiation image comprising:

i) an operation means for creating a probability density function of said first image signal, detecting the value of said first image signal, which value represents the maximum amount of the emitted light in part of a probability density function of said first image signal other than the part corresponding to a background region in said radiation image, taking said value of said first image signal, which has thus been detected from said probability density function, as the maximum value, normalizing said probability density function with its maximum value in its part between said maximum value and the minimum value of said first image signal, a normalized probability density function being thereby created, and feeding out information representing said normalized probability density function, ii) a neural network for receiving said information, which represents said normalized probability density function, from said operation means such that a predetermined value, which falls within the range of the maximum value and the minimum value of the image signal in said normalized probability density function, may always be fed into the same input unit of said neural network, determining the read-out conditions and/or the image processing conditions on the basis of said normalized probability density function, and feeding out information representing the read-out conditions and/or the image processing conditions, which have thus been determined, and iii) a correction means for correcting the read-out conditions and/or the image processing conditions, which are represented by said information fed out from said neural network, on the basis of said predetermined value.

The present invention also provides, as a fourteenth apparatus, an apparatus for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the apparatus for adjusting read-out conditions and/or image processing conditions for a radiation image comprising:

i) an operation means for creating a probability density function of said first image signal, detecting the value of said first image signal, which value represents the maximum amount of the emitted light in part of a probability density function of said first image signal other than the part corresponding to a background region in said radiation image, taking said value of said first image signal, which has thus been detected from said probability density function, as the maximum value, normalizing said probability density function with its maximum value in its part between said maximum value and the minimum value of said first image signal, a normalized probability density function being thereby created, and feeding out information representing said normalized probability density function, ii) a subsidiary information feed-out means for feeding out subsidiary information, which gives specifics about said radiation image stored on said stimulable phosphor sheet, iii) a neural network for receiving said information, which represents said normalized probability density function, from said operation means, and said subsidiary information from said subsidiary information feed-out means such that a predetermined value, which falls within the range of the maximum value and the minimum value of the image signal in said normalized probability density function, may always be fed into the same input unit of said neural network, determining the read-out conditions and/or the image processing conditions on the basis of said normalized probability density function, and feeding out information representing the read-out conditions and/or the image processing conditions, which have thus been determined, and iv) a correction means for correcting the read-out conditions and/or the image processing conditions, which are represented by said information fed out from said neural network, on the basis of said predetermined value.

A fifteenth method in accordance with the present invention is applicable when a stimulable phosphor sheet and other recording media are used and the image processing conditions are adjusted.

Specifically, the present invention further provides, as a fifteenth method, a method for adjusting image processing conditions for a radiation image, wherein image processing conditions, under which an image signal is to be image processed, are adjusted on the basis of the image signal representing a radiation image of an object, the method for adjusting image processing conditions for a radiation image comprising the steps of:

i) feeding information, which represents a probability density function of said image signal, into a neural network, and ii) feeding out information representing the image processing conditions from said neural network.

The present invention still further provides, as a fifteenth apparatus, an apparatus for adjusting image processing conditions for a radiation image, wherein image processing conditions, under which an image signal is to be image processed, are adjusted on the basis of the image signal representing a radiation image of an object, the apparatus for adjusting image processing conditions for a radiation image comprising:

i) a probability density function creating means for creating a probability density function of said image signal and feeding out information, which represents said probability density function, and ii) a neural network for receiving said information, which represents said probability density function, from said probability density function creating means, adjusting the image processing conditions on the basis of said probability density function, and feeding out information representing the image processing conditions, which have thus been adjusted.

The present invention also provides, as a sixteenth method, a method for adjusting image processing conditions for a radiation image, wherein image processing conditions, under which an image signal is to be image processed, are adjusted on the basis of the image signal representing a radiation image of an object, the method for adjusting image processing conditions for a radiation image comprising the steps of:

i) feeding information, which represents a probability density function of said image signal, and subsidiary information, which gives specifics about said radiation image, into a neural network, and ii) feeding out information representing the image processing conditions from said neural network.

The present invention further provides, as a sixteenth apparatus, an apparatus for adjusting image processing conditions for a radiation image, wherein image processing conditions, under which an image signal is to be image processed, are adjusted on the basis of the image signal representing a radiation image of an object, the apparatus for adjusting image processing conditions for a radiation image comprising:

i) a probability density function creating means for creating a probability density function of said image signal and feeding out information, which represents said probability density function, ii) a subsidiary information feed-out means for feeding out subsidiary information, which gives specifics about said radiation image, and iii) a neural network for receiving said information, which represents said probability density function, from said probability density function creating means, receiving said subsidiary information from said subsidiary information feed-out means, adjusting the image processing conditions on the basis of said probability density function and said subsidiary information, and feeding out information representing the image processing conditions, which have thus been adjusted.

The present invention still further provides, as a seventeenth method, a method for adjusting image processing conditions for a radiation image, wherein image processing conditions, under which an image signal is to be image processed, are adjusted on the basis of the image signal representing a radiation image of an object, the method for adjusting image processing conditions for a radiation image comprising the steps of:

i) taking the value of said image signal, which value represents the maximum amount of the emitted light in part of a probability density function of said image signal other than the part corresponding to a background region in said radiation image, as the maximum value, ii) normalizing said probability density function with its maximum value in its part between said maximum value and the minimum value of said image signal, a normalized probability density function being thereby created, iii) feeding information, which represents said normalized probability density function, into a neural network such that a predetermined value, which falls within the range of the maximum value and the minimum value of the image signal in said normalized probability density function, may always be fed into the same input unit of said neural network, iv) feeding out information representing the image processing conditions from said neural network, v) correcting the image processing conditions, which are represented by said information fed out from said neural network, on the basis of said predetermined value, and vi) thereby adjusting the final image processing conditions.

The present invention also provides, as a seventeenth apparatus, an apparatus for adjusting image processing conditions for a radiation image, wherein image processing conditions, under which an image signal is to be image processed, are adjusted on the basis of the image signal representing a radiation image of an object, the apparatus for adjusting image processing conditions for a radiation image comprising:

i) an operation means for creating a probability density function of said image signal, detecting the value of said image signal, which value represents the maximum amount of the emitted light in part of a probability density function of said image signal other than the part corresponding to a background region in said radiation image, taking said value of said image signal, which has thus been detected from said probability density function, as the maximum value, normalizing said probability density function with its maximum value in its part between said maximum value and the minimum value of said image signal, a normalized probability density function being thereby created, and feeding out information representing said normalized probability density function, ii) a neural network for receiving said information, which represents said normalized probability density function, from said operation means such that a predetermined value, which falls within the range of the maximum value and the minimum value of the image signal in said normalized probability density function, may always be fed into the same input unit of said neural network, determining the image processing conditions on the basis of said normalized probability density function, and feeding out information representing the image processing conditions, which have thus been determined, and iii) a correction means for correcting the image processing conditions, which are represented by said information fed out from said neural network, on the basis of said predetermined value.

The present invention further provides, as an eighteenth method, a method for adjusting image processing conditions for a radiation image, wherein image processing conditions, under which an image signal is to be image processed, are adjusted on the basis of the image signal representing a radiation image of an object, the method for adjusting image processing conditions for a radiation image comprising the steps of:

i) taking the value of said image signal, which value represents the maximum amount of the emitted light in part of a probability density function of said image signal other than the part corresponding to a background region in said radiation image, as the maximum value, ii) normalizing said probability density function with its maximum value in its part between said maximum value and the minimum value of said image signal, a normalized probability density function being thereby created, iii) feeding information, which represents said normalized probability density function, and subsidiary information, which gives specifics about said radiation image, into a neural network such that a predetermined value, which falls within the range of the maximum value and the minimum value of the image signal in said normalized probability density function, may always be fed into the same input unit of said neural network, iv) feeding out information representing the image processing conditions from said neural network, v) correcting the image processing conditions, which are represented by said information fed out from said neural network, on the basis of said predetermined value, and vi) thereby adjusting the final image processing conditions.

The present invention also provides, as an eighteenth apparatus, an apparatus for adjusting image processing conditions for a radiation image, wherein image processing conditions, under which an image signal is to be image processed, are adjusted on the basis of the image signal representing a radiation image of an object, the apparatus for adjusting image processing conditions for a radiation image comprising:

i) an operation means for creating a probability density function of said image signal, detecting the value of said image signal, which value represents the maximum amount of the emitted light in part of a probability density function of said image signal other than the part corresponding to a background region in said radiation image, taking said value of said image signal, which has thus been detected from said probability density function, as the maximum value, normalizing said probability density function with its maximum value in its part between said maximum value and the minimum value of said image signal, a normalized probability density function being thereby created, and feeding out information representing said normalized probability density function, ii) a subsidiary information feed-out means for feeding out subsidiary information, which gives specifics about said radiation image, iii) a neural network for receiving said information, which represents said normalized probability density function, from said operation means, and said subsidiary information from said subsidiary information feed-out means such that a predetermined value, which falls within the range of the maximum value and the minimum value of the image signal in said normalized probability density function, may always be fed into the same input unit of said neural network, determining the image processing conditions on the basis of said normalized probability density function, and feeding out information representing the image processing conditions, which have thus been determined, and iv) a correction means for correcting the image processing conditions, which are represented by said information fed out from said neural network, on the basis of said predetermined value.

The predetermined value, which falls within the range of the maximum value and the minimum value of the image signal in the normalized probability density function, may be any value falling within the range of the maximum value and the minimum value of the image signal. By way of example, the predetermined value may be the maximum value, the minimum value, or an intermediate value between the maximum value and the minimum value of the image signal. The information representing the normalized probability density function is fed into the neural network such that the predetermined value may always be fed into the same input unit of the neural network. This means that, even if the values of the image signal and the predetermined value change, the aforesaid predetermined value is always fed into a certain predetermined input unit of the neural network. Values of the image signal other than the aforesaid predetermined value are sequentially fed into units adjacent to the predetermined input unit with reference to the aforesaid predetermined value.

With the eleventh and twelfth apparatuses in accordance with the present invention, the information, which represents the probability density function of the image signal, is fed into the neural network. Alternatively, both the information, which represents the probability density function of the image signal, and the subsidiary information, which gives specifics about the radiation image, such as the information concerning the patient and the mode in which the radiation image was recorded, are fed into the neural network. The neural network adjusts the read-out conditions for the final readout and/or the image processing conditions on the basis of the probability density function, or on the basis of both the probability density function and the subsidiary information. Therefore, by using the neural network capable of making general judgments, drawbacks of a method utilizing only the probability density function of an image signal can be eliminated (i.e. errors due to local analysis can be eliminated). Also, the read-out conditions for the final readout and/or the image processing conditions can be adjusted efficiently and accurately, the learning of the neural network being repeated only a few times.

With the thirteenth and fourteenth apparatuses in accordance with the present invention, the value of the image signal, which value represents the maximum amount of the emitted light in part of a probability density function of the image signal other than the part corresponding to a background region in the radiation image, is taken as the maximum value. The probability density function is normalized with its maximum value in its part between the maximum value and the minimum value of the image signal, a normalized probability density function being thereby created. The read-out conditions for the final readout and/or the image processing conditions are determined on the basis of the normalized probability density function and are then corrected. Therefore, appropriate read-out conditions for the final readout and/or appropriate image processing conditions, can be adjusted on the basis of the probability density function of the image signal components of the image signal, which correspond only to the object image region in the radiation image. The conditions thus adjusted are not adversely affected by the image signal components of the image signal corresponding to the background region in the radiation image.

Also, the image signal representing a radiation image is not always the same. When the radiation dose varies, the sensitivity also varies, and therefore the values of the image signal change. Specifically, when the sensitivity varies, the minimum value of the image signal and the maximum value thereof in the part of the probability density function of the image signal other than the part corresponding to a background region in the radiation image also change. With the thirteenth and fourteenth apparatuses in accordance with the present invention, the information representing the normalized probability density function is fed into the neural network such that the predetermined value, which falls within the range of the maximum value and the minimum value of the image signal in the normalized probability density function, may always be fed into the same input unit of the neural network. The read-out conditions and/or the image processing conditions, which are represented by the information fed out from the neural network, are corrected on the basis of the predetermined value, which falls within the range of the maximum value and the minimum value of the image signal in the normalized probability density function. Therefore, appropriate read-out conditions for the final readout and/or appropriate image processing conditions can be obtained ultimately, which are not affected by the sensitivity of the radiation image.

Also, with the thirteenth and fourteenth apparatuses in accordance with the present invention, the information, which represents the normalized probability density function, or both the normalized probability density function and the subsidiary information, which gives specifics about the radiation image, such as the information concerning the patient and the mode in which the radiation image was recorded, are fed into the neural network. The read-out conditions for the final readout and/or the image processing conditions are determined by the neural network on the basis of the normalized probability density function, or on the basis of both the normalized probability density function and the subsidiary information, and are then corrected on the basis of the predetermined value. Therefore, by using the neural network capable of making general judgments, drawbacks of a method utilizing only the probability density function of an image signal can be eliminated (i.e. errors due to local analysis can be eliminated). Also, the read-out conditions for the final readout and/or the image processing conditions can be adjusted efficiently and accurately, the learning of the neural network being repeated only a few times.

The same effects as those described above can be obtained also with the fifteenth through eighteenth apparatuses in accordance with the present invention.

The present invention still further provides, as a nineteenth apparatus, a radiation image analyzing apparatus comprising:
  i) an irradiation field determining means for determining the shape and location of an irradiation field of radiation in a radiation image on the basis of a plurality of image signal components representing picture elements in said radiation image, which includes the irradiation field at a part, and
  ii) a characteristic measure operating means provided with a neural network, which receives all or some of the image signal components representing the picture elements located in the irradiation field having been determined and feeds out information representing characteristic measures, the characteristic measures representing the characteristics of said radiation image.

No limitation is imposed on the algorithms, which are employed in the irradiation field determining means to determine the shape and location of the irradiation field. For example, algorithms may be employed which determine the shape and location of the irradiation field on the basis of a difference between the mean-level value of the values of the image signal components corresponding to the region inside of the irradiation field and the mean-level value of the values of the image signal components corresponding to the region outside of the irradiation field. Alternatively, algorithms may be employed which determine the shape and location of the irradiation field on the basis of a difference between the amount of dispersion in the values of the image signal components corresponding to the region inside of the irradiation field and the amount of dispersion in the values of the image signal components corresponding to the region outside of the irradiation field. As another alternative, algorithms may be employed which determine the shape and location of the irradiation field on the basis of how the value of the image signal changes in the vicinity of the contour of the irradiation field. As a further alternative, algorithms may be employed which determine the shape and location of the irradiation field on the basis of a combination of two or more of these factors. Such algorithms are described in, for example, Japanese Unexamined Patent Publication Nos. 61(1986)-39039, 63(1988)-259538, 1(1989)-42436, and 2(1990)-67690.

Also, no limitation is imposed on the characteristic measures. For example, the characteristic measures may be the read-out conditions for the final readout, which are adjusted to appropriate values, the image processing conditions, under which the image signal representing the radiation image is to be image processed, the portion of the object the image of which was recorded (e.g., the head, the neck, the chest, or the abdomen in cases where the object is a human body), and the orientation in which the object was placed when the image of the object was recorded (e.g. the frontal or side orientation).

With the nineteenth apparatus in accordance with the present invention, the shape and location of the irradiation field are determined, and only the image signal components representing the picture elements located in the irradiation field are fed into the neural network. Therefore, the number of the input points of the neural network and the number of the units thereof can be kept small. Also, a storage means having a small storage capacity may be used to store information representing the coefficients concerning the weight of connections between the units. Additionally, by carrying out the learning of the neural network for only a short period, accurate outputs can be obtained from the neural network.

Instead of all of the image signal components representing the picture elements located in the irradiation field being fed into the neural network, only some of these image signal components may be fed into the neural network. For example, these image signal components may be sampled alternately, and only the sampled components may be fed into the neural network. In such cases, a storage means having an even smaller storage capacity may be employed.

The present invention also provides, as a nineteenth method, a radiation image analyzing method, wherein a subdivision pattern of radiation images, the shape and location of an irradiation field, an orientation in which an object was placed when the image of the object was recorded, and/or a portion of an object the image of which was recorded is determined on the basis of an image signal representing a radiation image of the object, the radiation image analyzing method comprising the steps of:
  i) feeding the image signal into a neural network, and
  ii) feeding out information, which represents the results of the determination with respect to the radiation image, from said neural network.

The present invention further provides, as a twentieth apparatus, a radiation image analyzing apparatus comprising:
  i) an image signal feed-out means for feeding out an image signal representing a radiation image of an object, and
  ii) a characteristic measure operating means provided with a neural network, which receives said image signal and feeds out information representing characteristic measures, said characteristic measures representing the results of determination of a subdivision pattern of radiation images, the shape and location of an irradiation field, an orientation in which an object was placed when the image of the object was recorded, and/or a portion of an object the image of which was recorded.

No limitation is imposed on the characteristic measures. For example, in cases where a subdivision image recording was carried out, in which the recording area of a recording media is divided into a plurality of predetermined subdivisions and a radiation image is recorded in each of the subdivisions, the subdivision pattern is determined. In such cases, the characteristic measures may represent the results of determination of four subdivision patterns (a two-on-one subdivision pattern having two radiation images which are vertically adjacent to each other, a two-on-one subdivision pattern having two radiation images which are horizontally adjacent to each other, a four-on-one subdivision pattern having four radiation images which are vertically and horizontally adjacent to each other, and one-on-one pattern). As for the determination of the shape and location of an irradiation field, the characteristic measures may represent the results of determination of the contour of an irradiation field, e.g. a circular irradiation field or a rectangular irradiation field. In the determination of the orientation in which the object was placed when the image of the object was recorded, the characteristic measures may represent the results of determination of two orientations, e.g. a frontal orientation (a frontal image) and a side orientation (a side image). As for the determination of the portion of the object the image of which was recorded, the characteristic measures may represent the head, the chest, the shoulder, the arm, or the like.

With the nineteenth method and the twentieth apparatus in accordance with the present invention, the neural network receives the image signal, which is made up of a series of image signal components representing the picture elements in a radiation image, and feeds out the information representing the characteristic measures. The characteristic measures represent the results of determination of a subdivision pattern of radiation images, the shape and location of an irradiation field, an orientation in which an object was placed when the image of the object was recorded, and/or a portion of an object the image of which was recorded. Therefore, determination can be carried out accurately with a simple apparatus.

Instead of all of the image signal components representing the picture elements located in the irradiation field being fed into the neural network, only some of these image signal components may be fed into the neural network. For example, these image signal components may be sampled alternately, and only the sampled components may be fed into the neural network. In such cases, a storage means having an even smaller storage capacity may be employed.

BRIEF DESCRIPTION OF THE DRAWINGS

FIG. 3 is an explanatory view showing an example of a neural network, FIG. 11 is a block diagram showing a different embodiment of the method in accordance with the present invention, FIG. 12 is a block diagram showing a different embodiment of the method in accordance with the present invention, FIG. 14 is a block diagram showing how the read-out conditions for the final readout are adjusted, FIG. 17 is a block diagram showing a different embodiment of the method for adjusting read-out conditions and/or image processing conditions for a radiation image in accordance with the present invention, FIGS. 18A and 18B are explanatory views showing two images in which the positions of center points of the patterns of an object shift from each other, FIG. 19 is a block diagram showing a different embodiment of the method for adjusting read-out conditions and/or image processing conditions for a radiation image in accordance with the present invention, FIG. 21 is a block diagram showing a different embodiment of the method for adjusting read-out conditions and/or image processing conditions for a radiation image in accordance with the present invention, FIGS. 29A, 29B, and 29C are explanatory views showing how isolated points are eliminated by a figure fusing process, FIGS. 30A, 30B, and 30C are explanatory views showing how missing points are eliminated by a figure fusing process, FIG. 31 is a block diagram showing an example of how a binary image process is carried out on a binary pattern signal, which is fed out from a neural network and represents the shape and location of an irradiation field, and FIG. 32 is a block diagram showing a different example of how a binary image process is carried out on a binary pattern signal, which is fed out from a neural network and represents the shape and location of an irradiation field.

DESCRIPTION OF THE PREFERRED EMBODIMENTS

The present invention will hereinbelow be described in further detail with reference to the accompanying drawings.

In the embodiments described below, an X-ray image of the shoulder of a human body is stored on a stimulable phosphor sheet.

Figure 4:
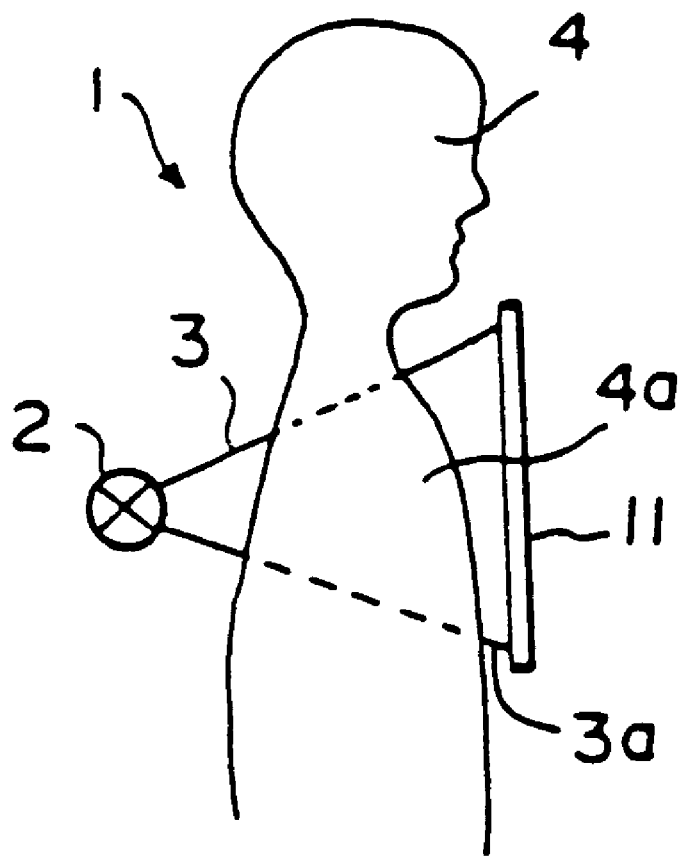
FIG. 4 is a schematic view showing an example of an X-ray image recording apparatus.

FIG. 4 is a schematic view showing an example of an X-ray image recording apparatus.

With reference to FIG. 4, X-rays 3 are produced by an X-ray source 2 of an X-ray image recording apparatus 1 and irradiated to the shoulder 4a of a human body 4. X-rays 3a, which have passed through the human body 4, impinge upon a stimulable phosphor sheet 11. In this manner, an X-ray image of the shoulder 4a of the human body 4 is stored on the stimulable phosphor sheet 11.

Figure 1A:
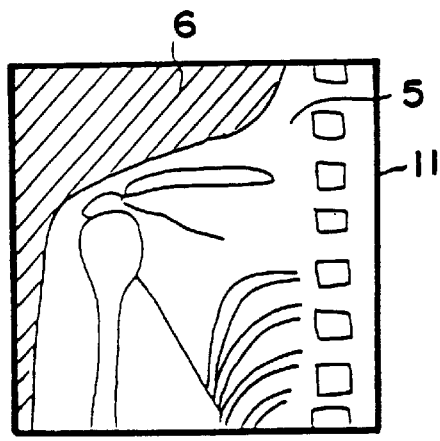
FIGS. 1A and 1B are explanatory views showing X-ray images of the right and left shoulders.
Figure 1B:
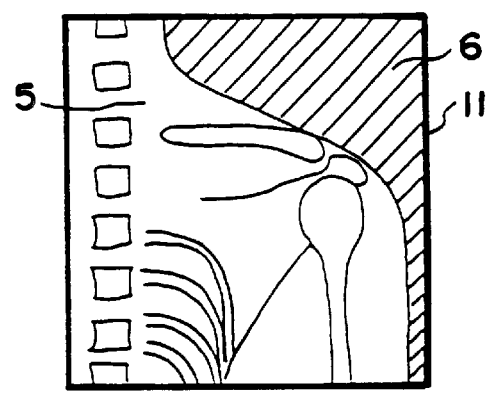

FIGS. 1A and 1B are explanatory views showing examples of X-ray images of the shoulders stored on stimulable phosphor sheets.

FIGS. 1A and 1B show the X-ray images of the right and left shoulders. Each of the X-ray images comprises an object image region 5, in which the pattern of the human body is stored, and a background region 6, upon which the X-rays impinged directly without passing through the object 4.

Figure 5:
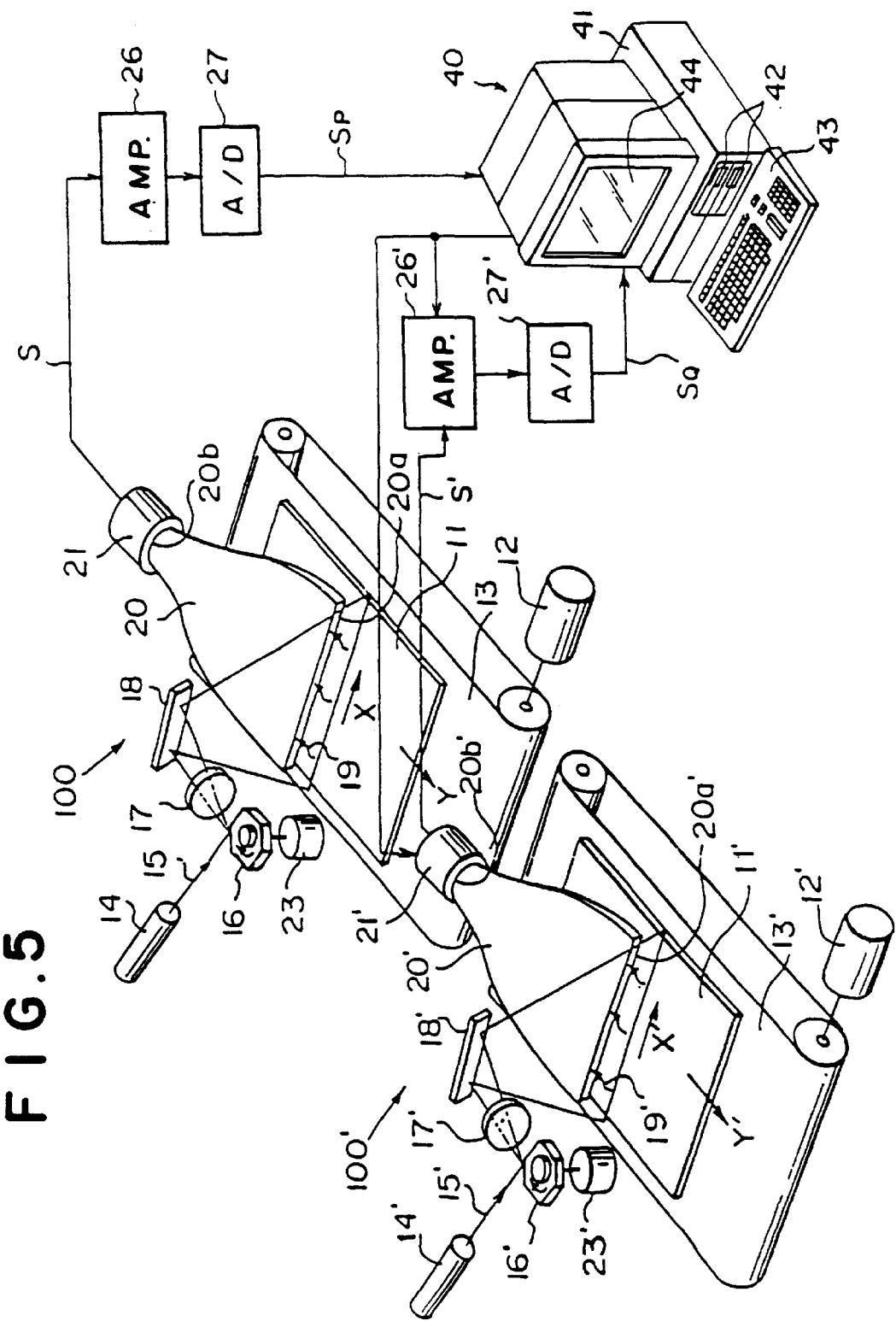
FIG. 5 is a perspective view showing an example of an X-ray image read-out apparatus and an example of a computer system, in which an embodiment of the first apparatus in accordance with the present invention is employed.

FIG. 5 is a perspective view showing an example of an X-ray image read-out apparatus and an example of a computer system, in which an embodiment of the first apparatus in accordance with the present invention is employed. In this embodiment, by way of example, a stimulable phosphor sheet is used, and a preliminary readout is carried out.

The stimulable phosphor sheet 11, on which the X-ray image has been stored, is placed at a predetermined position in a preliminary read-out means 100 which carries out a preliminary readout by scanning the stimulable phosphor sheet 11 with a light beam having a low energy level, thereby releasing only part of the energy from the stimulable phosphor sheet 11, which energy was stored during its exposure to radiation. The stimulable phosphor sheet 11 is conveyed in a sub-scanning direction indicated by the arrow Y by a sheet conveyance means 13 which is constituted of an endless belt or the like and which is operated by a motor 12. A laser beam 15 which has a low energy level is produced by a laser beam source 14, and is reflected and deflected by a rotating polygon mirror 16 which is quickly rotated by a motor 23 in the direction indicated by the arrow. The laser beam 15 then passes through a converging lens 17 constituted of an fθ lens or the like. The direction of the optical path of the laser beam 15 is then changed by a mirror 18, and the laser beam 15 impinges upon the stimulable phosphor sheet 11 and scans it in a main scanning direction indicated by the arrow X, which direction is approximately normal to the sub-scanning direction indicated by the arrow Y. When the stimulable phosphor sheet 11 is exposed to the laser beam 15, the exposed portion of the stimulable phosphor sheet 11 emits light 19 in an amount proportional to the amount of energy stored thereon during its exposure to radiation. The emitted light 19 is guided by a light guide member 20 and photoelectrically detected by a photomultiplier 21. The light guide member 20 is made from a light guiding material such as an acrylic plate and has a linear light input face 20a, positioned so that it extends along the main scanning line on the stimulable phosphor sheet 11, and a ring-shaped light output face 20b, positioned so that it is in close contact with a light receiving face of the photomultiplier 21. The emitted light 19, which has entered the light guide member 20 at its light input face 20a, is guided through repeated total reflection inside of the light guide member 20, emanates from the light output face 20b, and is received by the photomultiplier 21. In this manner, the amount of the emitted light 19, which amount represents the X-ray image, is converted into an electric signal by the photomultiplier 21.

An analog output signal S generated by the photomultiplier 21 is logarithmically amplified by a logarithmic amplifier 26, and digitized by an A/D converter 27 into a preliminary read-out image signal SP. The preliminary read-out image signal SP takes a value proportional to the logarithmic value of the amount of the light 19, which was emitted from each of picture elements in the X-ray image stored on the stimulable phosphor sheet 11.

In the preliminary readout, read-out conditions, i.e. the voltage applied to the photomultiplier 21 and the amplification factor of the logarithmic amplifier 26, are adjusted so that image information can be detected accurately even if the amount of energy stored on the stimulable phosphor sheet 11 during its exposure to radiation varies over a wide range.

The preliminary read-out image signal SP obtained in the manner described above is fed into a computer system 40. The computer system 40 is provided with an embodiment of the first apparatus in accordance with the present invention. The computer system 40 comprises a main body 41 in which a CPU and an internal memory are incorporated, a disk drive unit 42 which operates a floppy disk serving as a subsidiary memory, a keyboard 43 from which necessary instructions, or the like, are fed into the computer system 40, and a CRT display device 44 which displays necessary information.

In the computer system 40, the read-out conditions for the final readout, i.e. the sensitivity and the contrast during the final readout, are determined in the manner described later. By way of example, the voltage applied to a photomultiplier 21' and the amplification factor of a logarithmic amplifier 26' are controlled in accordance with the sensitivity and the contrast.

The contrast corresponds to the ratio of the largest amount of emitted light, which is capable of being accurately converted into an image signal during the final readout, to the smallest amount of emitted light, which is capable of being accurately converted into an image signal during the final readout. The sensitivity corresponds to the photoelectric conversion factor, which represents to what image signal level a predetermined amount of emitted light is to be converted.

A stimulable phosphor sheet 11' on which the preliminary readout has been finished is placed at a predetermined position in the final read-out means 100' and scanned with a laser beam 15' having an energy level higher than that of the laser beam 15 used during the preliminary readout. In this manner, an image signal is detected under the read-out conditions which have been determined on the basis of the preliminary read-out image signal. The configuration of the final read-out means 100' is nearly the same as that of the preliminary read-out means 100, and therefore elements corresponding to those constituting the preliminary read-out means 100 are numbered with corresponding primed reference numerals in FIG. 5.

After the image signal is digitized in an A/D converter 27', the resulting image signal SQ is fed into the computer system 40, which carries out appropriate image processing on the image signal SQ. After being image processed, the image signal is fed into a reproducing apparatus (not shown), which reproduces a visible image from the image signal.

How the computer system 40 adjusts the read-out conditions for the final readout on the basis of the preliminary read-out image signal SP will be described hereinbelow.

As shown in FIGS. 1A and 1B, during the recording of X-ray images of the shoulder, the images which are reversed approximately horizontally are often obtained. In such cases, a judgment is made in the manner described below as to whether the image is of the right shoulder (FIG. 1A) or of the left shoulder (FIG. 1B). In this embodiment, the image of the right shoulder shown in FIG. 1A is taken as the standard pattern in the first apparatus in accordance with the present invention.

Figure 2A:
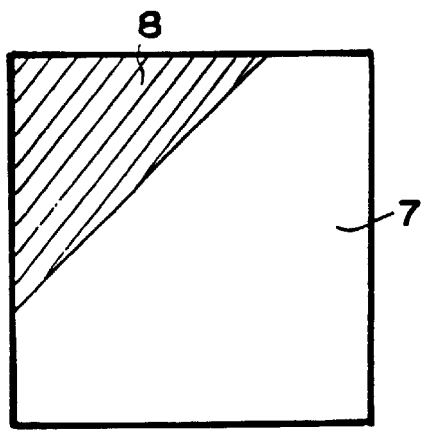
FIGS. 2A and 2B are explanatory views showing a standard pattern and a reversed pattern.
Figure 2B:
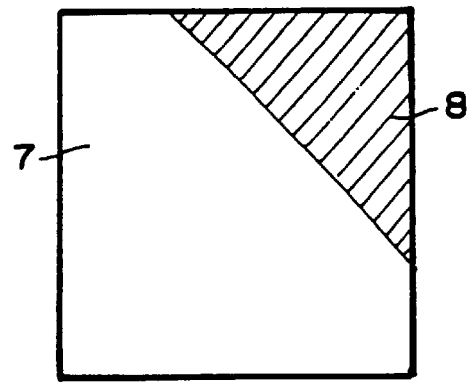

FIGS. 2A and 2B are explanatory views showing a standard pattern and a reversed pattern, which are represented by information stored in the computer system 40.

The standard pattern is composed of a first region 7, which is represented by a mean-level value of the preliminary read-out image signal SP corresponding to the object image region in the X-ray image shown in FIG. 1A, and a second region 8, which is represented by a mean-level value of the preliminary read-out image signal SP detected from the background region 6 in the X-ray image shown in FIG. 1A. Also, the reversed pattern is composed of a first region 7, which is represented by a mean-level value of the preliminary read-out image signal SP corresponding to the object image region in the X-ray image shown in FIG. 1B, and a second region 8, which is represented by a mean-level value of the preliminary read-out image signal SP detected from the background region 6 in the X-ray image shown in FIG. 1B.

When the preliminary read-out image signal SP is fed into the computer system 40, pattern matching is carried out between the preliminary read-out image signal SP and each of the image signal SS representing the standard pattern shown in FIG. 2A and the image signal SR representing the reversed pattern shown in FIG. 2B. In this manner, a judgment is made as to whether the preliminary read-out image signal SP represents the X-ray image of the right shoulder or of the left shoulder. In this embodiment, during the pattern matching, calculations are made to find square values of differences between the image signal components of the preliminary read-out image signal SP and each of the image signals SS and SR, which image signal components represent corresponding picture elements in the preliminary read-out image signal SP and each of the image signals SS and SR, i.e. $(SS-SP)^2$ and $(SR-SP)^2$. The square values obtained for the whole area of the image are added, and sums QS and QR are calculated with the formulas $$Q_S = \Sigma (S_S - S_P)^2 \quad (1)$$

$$Q_R = \Sigma (S_R - S_P)^2 \quad (2)$$

It is judged that the X-ray image represented by the preliminary read-out image signal SP is the image associated with the sums QS or QR, whichever is smaller.

In cases where it has been judged that the image represented by the preliminary read-out image signal SP is of the left shoulder (FIG. 1B), the preliminary read-out image signal SP is processed such that the image represented by the preliminary read-out image signal SP is reversed. In this manner, an image signal corresponding to the image of the right shoulder shown in FIG. 1A, or an image signal corresponding to the image of the left shoulder is always fed into a neural network, which will be described below.

In the manner described above, the image signal is processed such that the processed image signal represents the predetermined standard pattern (i.e. the pattern of the right shoulder in this embodiment). The processed image signal is then fed into the neural network. Therefore, the number of units constituting the neural network can be reduced, and the requirement of the storage capacity of a storage means for storing the weight coefficients, which represent the degrees of connections between the units, can be kept small. Also, the learning of the neural network can be finished quickly.

FIG. 3 is an explanatory view showing an example of the neural network which is provided with a learning function by back propagation method. As described above, the term "learning function by back propagation method" as used herein means the learning algorithms in a neural network, with which the output of the neural network is compared with a correct answer (an instructor signal), and the weight of connections (i.e. the weight of synapse connections) is corrected sequentially from the output side to the input side of the neural network.

With reference to FIG. 3, the neural network comprises a first layer (an input layer), a second layer (an intermediate layer), and a third layer (an output layer). The first, second, and third layers are composed respectively of n1 number of units, n2 number of units, and two units. Signals F1, F2, ..., Fn1 fed into the first layer (the input layer) are the image signal components of the preliminary read-out image signal SP representing the picture elements in the X-ray image (the reversed image in the cases of the images of the left shoulder). Two outputs $y_1^3$ and $y_2^3$ obtained from the third layer (the output layer) are the signals corresponding to the sensitivity and the contrast during the final readout. An i'th unit of a k'th layer is indicated by $u_i^k$. The total input into the unit $u_i^k$ is indicated by $x_i^k$, and the total output therefrom is indicated by $y_i^k$. The weight of connection from the unit $u_i^k$ to a unit $u_j^{k+1}$ is indicated by $W_{i\ j}^{k\ k+1}$. Also, each unit $u_i^k$ has the same characteristic function, which is expressed as $$f(x) = \frac{1}{1-e^x} \quad (3)$$

The input $x_j^k$ into each unit $u_j^k$ and the output $y_j^k$ therefrom are expressed as $$x_j^k = \sum_i W_{i\ j}^{k-1\ k} \cdot y_i^{k-1} \quad (4)$$

$$y_j^k = f(x_j^k) \quad (5)$$

Inputs F1, F2, ..., Fn1 into the units $u_i^1$, where i=1, 2, ..., n1, which units constitute the input layer, are fed into the units $u_i^1$, where i=1, 2, ..., n1, without being weighted. The n1 number of signals F1, F2, ..., Fn1 are weighted with the weights of connection $W_{i\ j}^{k\ k+1}$, and transmitted to the ultimate outputs $y_1^3$ and $y_2^3$. In this manner, the read-out conditions for the final readout (i.e. the sensitivity and the contrast) are obtained.

How the weights of connection $W_{i\ j}^{k\ k+1}$ are determined will be described hereinbelow. First, initial values of the weights of connection $W_{i\ j}^{k\ k+1}$ are given by random numbers. The range of the random numbers should preferably be limited such that, even when the values of the inputs F1, F2, ..., Fn1 fluctuate to the largest extent, the outputs $y_1^3$ and $y_2^3$ may take values falling within a predetermined range or values close to said predetermined range.

Thereafter, preliminary read-out image signals are obtained in the manner described above from a plurality of stimulable phosphor sheets storing X-ray images of the right or left shoulder, for which the appropriate read-out conditions for the final readout are known. As for the X-ray images of the left shoulder, the preliminary read-out image signals are reversed. In this manner, the n1 number of inputs F1, F2, ..., Fn1 are obtained. The n1 number of inputs F1, F2, ..., Fn1 are fed into the neural network shown in FIG. 3, and the outputs $y_i^k$ of the respective units $u_i^k$ are monitored.

After the outputs $y_i^k$ are obtained, square errors E1 and E2 between the ultimate outputs $y_1^3$, $y_2^3$ and the instructor signals (the sensitivity $y_1^3$ and the contrast $y_2^3$) representing the read-out conditions for the final readout appropriate for the image are calculated with the formulas $$E_1 = \frac{1}{2}(y_1^3 - \tilde{y}_1^3)2 \quad (6)$$

-continued $$E_2 = \frac{1}{2}\left(y_2^3 - \tilde{y}_2^3\right)2 \tag{7}$$

The weights of connection $W_{ij}^{k\,k+1}$ are then corrected such that the square errors E1 and E2 become the smallest. The output $y_1^3$ will be described hereinbelow. The descriptions below also apply to the output $y_2^3$.

The square error E1 is a function of $W_{ij}^{k\,k+1}$. Therefore, in order for the square error E1 to be minimized, the weights of connection $W_{ij}^{k\,k+1}$ are corrected with the formula $$W_{ij}^{k\,k+1} = W_{ij}^{k\,k+1} - \eta \cdot \frac{\partial E_1}{\partial W_{ij}^{k\,k+1}} \tag{8}$$

where $\eta$ denotes a coefficient, which is referred to as a learning coefficient.

The following formula obtains:

$$\frac{\partial E_1}{\partial W_{ij}^{k\,k+1}} = \frac{\partial E_1}{\partial x_j^{k+1}} \frac{\partial x_j^{k+1}}{\partial W_{ij}^{k\,k+1}} \tag{9}$$

Also, Formula (4) gives $$x_j^{k+1} = \sum_i W_{ij}^{k\,k+1} \cdot y_i^k \tag{4'}$$

Therefore, formula (9) gives $$\frac{\partial E_1}{\partial W_{ij}^{k\,k+1}} = \frac{\partial E_1}{\partial x_j^{k+1}} \cdot y_i^k \tag{10}$$

From Formula (6), the following formula obtains:

$$\frac{\partial E_1}{\partial x_1^3} = \left(y_1^3 - \tilde{y}_1^3\right) \cdot \frac{\partial y_1^3}{\partial x_1^3} \tag{11}$$

Formula (11) can be changed with Formula (5) into $$\frac{\partial E_1}{\partial x_1^3} = \left(y_1^3 - \tilde{y}_1^3\right) \cdot f'(x_1^3) \tag{12}$$

From Formula (3), the following formula obtains:

$$f'(x) = f(x)\,(1 - f(x)) \tag{13}$$

Therefore, $$f'(x_1^3) = y_1^3 \cdot (1 - y_1^3) \tag{14}$$

Setting k=2 in Formula (10) and substituting Formulas (12) and (14) into Formula (10) yield $$\frac{\partial E_1}{\partial W_{i1}^{23}} = \frac{\partial E_1}{\partial x_1^3} \cdot y_i^2 = \left(y_1^3 - \tilde{y}_1^3\right) \cdot y_1^3 \cdot (1 - y_1^3) \cdot y_i^2 \tag{15}$$

Substitution of Formula (15) into Formula (8) yields $$W_{i1}^{23} = W_{i1}^{23} - \eta \cdot \left(y_1^3 - \tilde{y}_1^3\right) \cdot y_1^3 \cdot (1 - y_1^3) \cdot y_i^2 \tag{16}$$

The weights of connection $W_{i\,1}^{2\,3}$, where i=1, 2, 3, are corrected with Formula (16).

Also, the following formula obtains:

$$\frac{\partial E_1}{\partial x_j^2} = \frac{\partial E_1}{\partial x_1^3} \frac{\partial x_1^3}{\partial x_j^2} \tag{17}$$

Substitution of Formulas (4) and (5) into Formula (17) yields $$\frac{\partial E_1}{\partial x_j^2} = \frac{\partial E_1}{\partial x_1^3} \frac{\partial}{\partial x_j^2}\left(\sum_j W_{j1}^{23} \cdot y_j^2\right) = \frac{\partial E_1}{\partial x_1^3} \cdot W_{j1}^{23} \cdot f'(x_j^2) \tag{18}$$

Formula (13) gives $$f'(x_j^2) = y_j^2 \cdot (1 - y_j^2) \tag{19}$$

Substitution of Formulas (12), (14), and (19) into Formula (18) yields $$\frac{\partial E_1}{\partial x_j^2} = \left(y_1^3 - \tilde{y}_1^3\right) \cdot y_1^3 \cdot (1 - y_1^3) \cdot y_j^2 \cdot (1 - y_j^2) \cdot W_{j1}^{23} \tag{20}$$

Setting k=1 in Formula (10) and substituting Formula (20) into Formula (10) yield $$\frac{\partial E_1}{\partial W_{ij}^{12}} = \frac{\partial E_1}{\partial x_j^2} \cdot y_i^1 = \left(y_1^3 - \tilde{y}_1^3\right) \cdot y_1^3 \cdot (1 - y_1^3) \cdot y_j^2 \cdot (1 - y_j^2) \cdot W_{j1}^{23} \cdot y_i^1 \tag{21}$$

Substitution of Formula (21) into Formula (8) and setting of k=1 yield $$W_{ij}^{12} = W_{ij}^{12} - \eta \cdot \left(y_1^3 - \tilde{y}_1^3\right) \cdot y_1^3 \cdot (1 - y_1^3) \cdot y_j^2 \cdot (1 - y_j^2) \cdot y_i^1 \cdot w_{j1}^{23} \tag{22}$$

The values of the weights of connection $W_{i\,1}^{2\,3}$ where i=1, 2, ..., n1, which have been corrected with Formula (16), are substituted into Formula (22). In this manner, the weights of connection $W_{i\,j}^{1\,2}$, where i=1, 2, ..., n1 and j=1, 2, ..., n2, are corrected.

Theoretically, the weights of connection $W_{i\,j}^{k\,k+1}$ can be converged to predetermined values by using Formulas (16) and (22), using a sufficiently small learning coefficient $\eta$ and carrying out the learning operations very many times. However, if a sufficiently small learning coefficient $\eta$ is used, the speed with which the learning operations are effected will become low. If a very large learning coefficient $\eta$ is used, "vibration" will occur in the learning operations (i.e. the weights of connection do not converge to predetermined values). Therefore, actually, the vibration is prevented by employing an inertia term, which is expressed in Formula (23), in the calculations of the correction amounts for the weights of connection, and the learning coefficient $\eta$ is set to a slightly large value.

$$\Delta W_{i\ j}^{k\ k+1}(t+1) = \alpha \cdot \Delta W_{i\ j}^{k\ k+1}(t) + \eta \cdot \frac{\partial E_1}{\partial x_j^{k+1}} \cdot y_i^k \quad (23)$$

where α denotes the coefficient referred to as the inertia term, and $\Delta W_{i\ j}^{k\ k+1}$ (t) denotes the correction amount, which is used during the t'th learning operation and which is obtained by subtracting a weight of connection $W_{i\ j}^{k\ k+1}$, which has not been corrected, from a weight of connection $W_{i\ j}^{k\ k+1}$, which has been corrected. (Such an inertia term is described in, for example, "Learning internal representations by error propagation In Parallel Distributed Processing" by D. E. Rumelhart, G. E. Hinton and R. J. Williams, Volume 1, J. L. McClell and, D. E. Rumelhart and The PDP Research Group, MIT Press, 1986b.)

By way of example, the inertia term α is set to 0.9, the learning coefficient η is set to 0.25, and 200,000 times of corrections (learning operations) are carried out for each of the weights of correction $W_{i\ j}^{k\ k+1}$. Thereafter, each of the weights of correction $W_{i\ j}^{k\ k+1}$ is fixed at a final value. At the time at which the learning operations are completed, the two outputs $y_1^3$ and $y_2^3$ represents the appropriate sensitivity and the appropriate contrast during the final readout.

Therefore, after the learning operations are completed, in order for appropriate read-out conditions for the final read-out to be obtained, a preliminary read-out image signal SP representing an X-ray image is fed into the neural network shown in FIG. 3. The outputs $y_1^3$ and $y_2^3$ obtained from the neural network are utilized as signals representing the read-out conditions (i.e. the sensitivity and the contrast) for the final readout appropriate for the X-ray image. Because the learning operations have been carried out in the manner described above, the signals accurately represent the appropriate read-out conditions for the final readout.

The number of layers of the neural network is not limited to three. Also, no limitation is imposed on the number of the units of each layer. The number of the units of each layer may be determined in accordance with the number of the picture elements represented by the preliminary read-out image signal SP, which is fed into the neural network, the accuracy, with which the read-out conditions for the final readout are to be obtained, or the like.

The voltage applied to the photomultiplier 21' of the final read-out means 100', the amplification factor of the logarithmic amplifier 26', and the like, are controlled in accordance with the read-out conditions for the final readout, which have been adjusted by the neural network. The final readout is carried out under the controlled conditions.

In the aforesaid embodiment, before the preliminary read-out image signal SP representing an X-ray image of the shoulder is fed into the neural network, pattern matching is effected with respect to the patterns shown in FIGS. 2A and 2B. A judgment is thereby made as to whether the X-ray image represented by the preliminary read-out image signal SP is the standard image (i.e. the image of the right shoulder) or the reversed image (i.e. the image of the left shoulder). In cases where the X-ray image represented by the preliminary read-out image signal SP is the reversed image (i.e. the image of the left shoulder), the preliminary read-out image signal SP is processed such that the processed image signal SP represents the standard image (i.e. the image of the right shoulder). The first apparatus in accordance with the present invention is not limited to the processing of images of the shoulder. For example, the first apparatus in accordance with the present invention is also applicable when images of the right and left hands, images of the right and left sides of the head or the abdomen, and the like, are processed.

Also, the first apparatus in accordance with the present invention is not limited to the processing of images reversed horizontally. For example, the first apparatus in accordance with the present invention is also applicable when an image is to be rotated into a normal orientation in cases where an image signal representing an inclined image is obtained due to oblique setting of a stimulable phosphor sheet during the image recording operation, or an image signal representing a laterally inclined image or an inverted image is obtained due to setting of a stimulable phosphor sheet in an incorrect direction during the image read-out operation. The first apparatus in accordance with the present invention is also applicable when images having different scales of enlargement (or reduction), which are obtained from, for example, a direct image recording operation and fluorography, are to be corrected. The first apparatus in accordance with the present invention is further applicable when position adjustment is to be carried out such that an object image region may be located at the center area of an image in cases where the object image pattern was recorded at a peripheral part of the image. Additionally, the first apparatus in accordance with the present invention is applicable when a combination of the aforesaid processes is to be carried out.

In the aforesaid embodiment, the preliminary read-out means 100 and the final read-out means 100' are separate from each other. Alternatively, because the configurations of the preliminary read-out means 100 and the final read-out means 100' are approximately identical to each other, a single read-out means may be utilized for performing both the preliminary readout and the final readout. In this case, after being subjected to the preliminary readout, the stimulable phosphor sheet 11 may be moved back to the position at which image readout is started. Thereafter, the final readout may be carried out.

In cases where a single read-out means is utilized to perform both the preliminary readout and the final readout, it is necessary to change the intensity of the light beam used in the preliminary readout and the final readout. For this purpose, various methods may be employed as described above, for example, a laser beam source or the like may change the intensity of the light beam.

In the aforesaid embodiment, the read-out conditions for the final readout are adjusted by the computer system 40. Alternatively, predetermined read-out conditions may be used when the final readout is carried out regardless of the characteristics of the preliminary read-out image signal SP. On the basis of the preliminary read-out image signal SP, the computer system 40 may adjust the image processing conditions to be used in carrying out image processing of the image signal SQ. The computer system 40 may also adjust both the read-out conditions and the image processing conditions.

The aforesaid embodiment is applied to the radiation image read-out apparatus wherein the preliminary readout is carried out. However, the first apparatus in accordance with the present invention is also applicable to radiation image read-out apparatuses wherein no preliminary read-out operations are carried out, and only the aforesaid final read-out operations are carried out. In these cases, an image signal is obtained by use of predetermined read-out conditions. Based on the image signal, image processing conditions are calculated by the computer system 40. The image signal is processed under the calculated image processing conditions.

An embodiment of the first method, i.e. the method for adjusting read-out conditions and/or image processing conditions for a radiation image, in accordance with the present invention will be described hereinbelow. In this embodiment, a stimulable phosphor sheet is used, and an X-ray image having a pattern of the shoulder joint of a human body as a region of interest is processed.

Figure 6A:
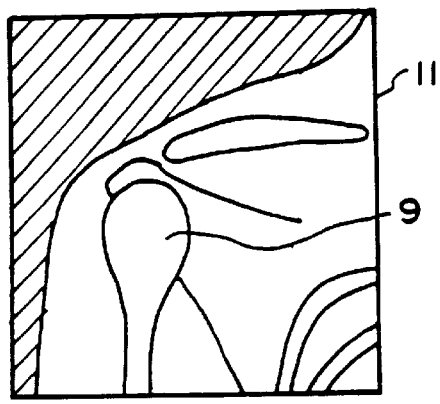
FIGS. 6A and 6B are explanatory views showing X-ray images of the shoulder joint.
Figure 6B:
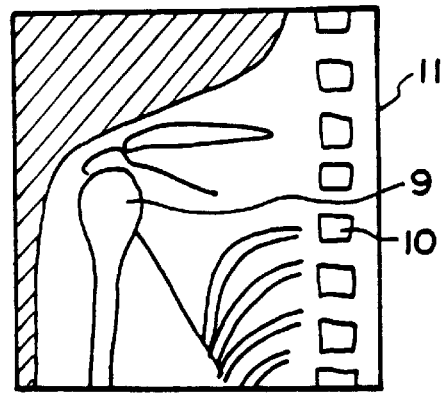
Figure 7A:
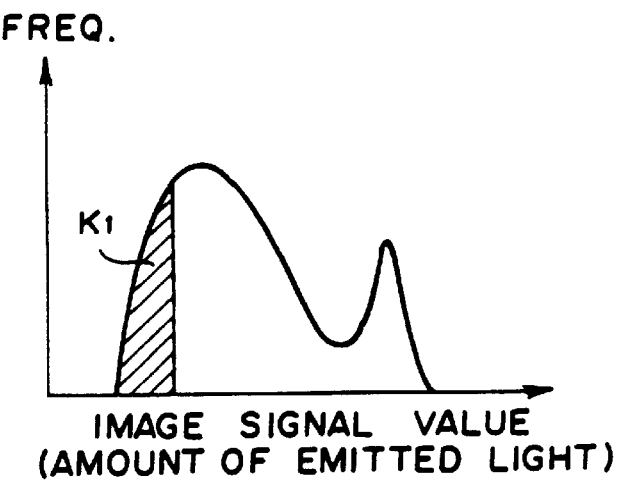
FIGS. 7A and 7B are graphs showing patterns of probability density functions of image signals, which represent the X-ray images shown in FIGS. 6A and 6B, FIGS. 8, 9, and 10 are block diagrams showing systems for carrying out different embodiments of the method in accordance with the present invention.
Figure 7B:
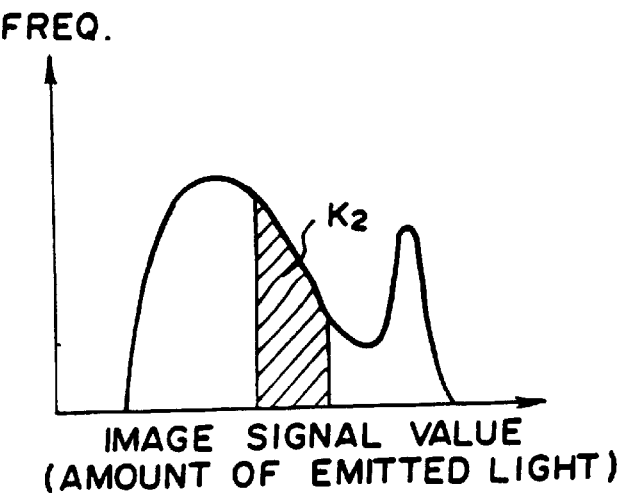

FIGS. 6A and 6B are explanatory views showing X-ray images of the shoulder joint, which images have been stored on stimulable phosphor sheets 11 in the X-ray image recording apparatus shown in FIG. 4 in the manner described above.

In this embodiment, in the computer system 40 shown in FIG. 5, the read-out conditions for the final readout are adjusted on the basis of the preliminary read-out image signal SP in the manner described below.

By using the X-ray image read-out apparatus shown in FIG. 5, preliminary read-out image signals are obtained in the manner described above from a plurality of stimulable phosphor sheets storing X-ray images having a shoulder joint pattern 9 as shown in FIGS. 6A and 6B, for which the appropriate read-out conditions for the final readout are known. In this manner, the n1 number of inputs F1, F2, ..., Fn1 are obtained. In this embodiment, under the appropriate read-out conditions for the final readout, an image signal is obtained which represents an X-ray image such that the pattern of the shoulder joint 9 may have an appropriate image density.

The n1 number of inputs F1, F2, ..., Fn1 are fed into the neural network shown in FIG. 3, and the learning operations of the neural network are carried out in the same manner as that described above. At the time at which the learning operations are completed, the two outputs $y_1^3$ and $y_2^3$ represents the appropriate sensitivity and the appropriate contrast during the final readout (i.e. such that the pattern of the shoulder joint 9 may have an appropriate image density in a reproduced X-ray image).

Therefore, after the learning operations are completed, in order for appropriate read-out conditions for the final readout to be obtained, a preliminary read-out image signal SP representing an X-ray image is fed into the neural network shown in FIG. 3. The outputs $y_1^3$ and $y_2^3$ obtained from the neural network are utilized as signals representing the read-out conditions (i.e. the sensitivity and the contrast) for the final readout appropriate for the X-ray image. Because the learning operations have been carried out in the manner described above, the signals accurately represent the appropriate read-out conditions for the final readout.

The voltage applied to the photomultiplier 21' of the final read-out means 100', the amplification factor of the logarithmic amplifier 26', and the like, are controlled in accordance with the read-out conditions for the final readout, which have been adjusted by the neural network. The final readout is carried out under the controlled conditions.

In the aforesaid embodiment, the read-out conditions for the final readout are adjusted by the computer system 40. Alternatively, predetermined read-out conditions may be used when the final readout is carried out regardless of the characteristics of the preliminary read-out image signal SP. On the basis of the preliminary read-out image signal SP, the computer system 40 may adjust the image processing conditions to be used in carrying out image processing of the image signal SQ. The computer system 40 may also adjust both the read-out conditions and the image processing conditions.

As illustrated in FIG. 8, in an embodiment of the second method in accordance with the present invention, the preliminary read-out image signal SP obtained in the preliminary read-out means 100 is fed into a neural network constituted of a computer system 200. An image pattern in the predetermined region of interest is determined, and the preliminary read-out image signal SP' is sampled which represents only the image pattern corresponding to the region of interest. The sampled preliminary read-out image signal SP' is fed into a probability density function analyzing means 201, which adjusts the read-out conditions for the final readout on the basis of the results of an analysis of the probability density function of the preliminary read-out image signal SP'. In such cases, the read-out conditions for the final readout are adjusted only for the image pattern corresponding to the region of interest. Therefore, the read-out conditions for the final readout, which have thus been adjusted, are always optimum for the image pattern corresponding to the region of interest.

Information C representing the read-out conditions for the final readout is then fed into the final read-out means 100', and the read-out conditions for the final readout are adjusted in accordance with the information C. In this manner, a reproduced visible image can be obtained in which the image pattern corresponding to the region of interest has an appropriate image density.

Techniques for analyzing probability density functions are described in detail in, for example, Japanese Unexamined Patent Publication Nos. 60(1985)-185944 and 61(1986)-280163. In this embodiment, such known techniques for analyzing probability density functions may be employed.

In cases where the image pattern corresponding to a predetermined region of interest is determined by the neural network, appropriate image processing conditions can be adjusted on the basis of the results of an analysis of the probability density function.

In lieu of the probability density function analyzing means 201, a neural network may be employed to adjust the read-out conditions for the final readout and/or the image processing conditions.

The aforesaid embodiments of the first and second methods in accordance with the present invention are applied to the radiation image read-out method wherein the preliminary readout is carried out. However, the first and second methods in accordance with the present invention are also applicable to radiation image read-out methods wherein no preliminary read-out operations are carried out, and only the aforesaid final read-out operations are carried out. FIG. 9 shows such an embodiment.

In this embodiment, an image signal SQ is obtained by use of predetermined read-out conditions in the final read-out means 100'. Based on the image signal SQ, appropriate image processing conditions are calculated by a computer system 210 constituting a neural network. Also, in such cases, the learning operations of the neural network are carried out by utilizing radiation images having image patterns of a specific region of interest. In this manner, the image processing conditions can be obtained which are optimum for the image pattern of the region of interest.

Information D representing the optimum image processing conditions, which have thus been adjusted, is fed into an image processing unit 211. In the image processing unit 211, image processing, such as gradation processing, is carried out on the image signal SQ under the optimum image processing conditions.

Also, as illustrated in FIG. 10, the image signal SQ obtained in the final read-out means 100' may be fed into a neural network constituted of a computer system 220. An image pattern in the predetermined region of interest is determined, and the image signal SQ' is sampled which represents only the image pattern corresponding to the region of interest. The sampled image signal SQ' is fed into a probability density function analyzing means 221, which adjusts the image processing conditions on the basis of the results of an analysis of the probability density function of the image signal SQ'. In such cases, the image processing conditions are adjusted only for the image pattern corresponding to the region of interest. Therefore, the image processing conditions, which have thus been adjusted, are always optimum for the image pattern corresponding to the region of interest.

Information E representing the image processing conditions is then fed into the image processing unit 211, and the image processing conditions are adjusted in accordance with the information E. In this manner, a reproduced visible image can be obtained in which the image pattern corresponding to the region of interest has an appropriate image density.

Also, in such cases, in lieu of the probability density function analyzing means 221, a neural network may be utilized to adjust the image processing conditions.

An embodiment of the third apparatus, i.e. the apparatus for adjusting read-out conditions and/or image processing conditions for a radiation image, in accordance with the present invention will be described hereinbelow. In this embodiment, a stimulable phosphor sheet is used, and an X-ray image having a pattern of the shoulder joint of a human body as a region of interest is processed.

This embodiment is incorporated in the computer system 40 shown in FIG. 5.

The preliminary read-out image signal SP is obtained by reading the X-ray image shown in FIG. 6A or FIG. 6B in the X-ray image read-out apparatus of FIG. 5 in the same manner as that described above. The preliminary read-out image signal SP is fed into the computer system 40.

In the computer system 40, when necessary, a subdivision pattern and the shape and location of an irradiation field are determined from the preliminary read-out image signal SP. Thereafter, the probability density function of the preliminary read-out image signal SP is created. The read-out conditions for the final readout, i.e. the sensitivity Sk and the latitude Gp during the final readout, are determined by a neural network on the basis of the results of an analysis of the probability density function. By way of example, the voltage applied to a photomultiplier 21' and the amplification factor of a logarithmic amplifier 26' are controlled in accordance with the sensitivity Sk and the latitude Gp.

In the computer system 40, the read-out conditions for the final readout and/or the image processing conditions are temporarily determined on the basis of the results of an analysis of the probability density function of the preliminary read-out image signal SP. Also, the conditions, which have been temporarily determined, are corrected by a neural network. In this manner, the read-out conditions for the final readout and/or the image processing conditions are adjusted finally.

FIG. 11 shows such processes carried out in the computer system 40.

Specifically, as shown in FIG. 11, the embodiment of the third apparatus in accordance with the present invention is provided with a probability density function analyzing means 51, which receives an image signal 50, temporarily determines the read-out conditions for the final readout on the basis of the results of an analysis of the probability density function of the image signal 50, and feeds out information representing the temporarily determined conditions. This embodiment is also provided with a neural network 52, which receives the image signal 50, determines correction values $\Delta$Smax and $\Delta$Smin to be used in correcting the read-out conditions for the final readout, Smax and Smin, which have been temporarily determined by the probability density function analyzing means 51, and feeds out information representing the correction values. This embodiment is further provided with an addition means 53, which adds the correction values $\Delta$Smax and $\Delta$Smin having been determined by the neural network 52 to the read-out conditions for the final readout, Smax and Smin, having been temporarily determined by the probability density function analyzing means 51, and feeds out information representing the read-out conditions for the final readout, Smax' and Smin' (Smax'=Smax+$\Delta$Smax, Smin'=Smin+$\Delta$Smin). The conditions are temporarily determined by the probability density function analyzing means 51, and are corrected by the neural network 52. In this manner, the read-out conditions for the final readout is adjusted finally.

In the aforesaid embodiment of the third apparatus in accordance with the present invention, Smax' and Smin' corresponding to the maximum value and the minimum value of the image signal are employed as the read-out conditions for the final readout. Alternatively, other values, which correspond to the sensitivity and the scale factor, may be employed as the read-out conditions for the final readout.

An embodiment of the fifth apparatus in accordance with the present invention will be described hereinbelow. This embodiment is incorporated in the computer system 40 shown in FIG. 5. How the preliminary read-out image signal SP is processed in the computer system 40 will be described below.

In this embodiment, in the computer system 40 the read-out conditions for the final readout and/or the image processing conditions are temporarily determined on the basis of the results of an analysis of the probability density function of the preliminary read-out image signal SP. Also, the read-out conditions for the final readout and/or the image processing conditions are finally adjusted by a neural network on the basis of the temporarily determined conditions and the preliminary read-out image signal SP.

FIG. 12 shows such processes carried out in the computer system 40.

Specifically, as shown in FIG. 12, the embodiment of the fifth apparatus in accordance with the present invention is provided with a probability density function analyzing means 61, which receives an image signal 60, temporarily determines the read-out conditions for the final readout on the basis of the results of an analysis of the probability density function of the image signal 60, and feeds out information representing the temporarily determined conditions. This embodiment is also provided with a neural network 62, which receives the image signal 60 and the read-out conditions for the final readout, Sk' and GP', having been temporarily determined by the probability density function analyzing means 61 and feeds out information representing the read-out conditions for the final readout, Sk and Gp, having been adjusted finally. The conditions are temporarily determined by the probability density function analyzing means 61, and the read-out conditions for the final readout is adjusted finally by the neural network 62 on the basis of the image signal 60 and the temporarily determined conditions, Sk' and Gp'.

In this embodiment of the fifth apparatus in accordance with the present invention, Sk and Gp corresponding to the sensitivity and the contrast of the image signal are employed as the read-out conditions for the final readout. Alternatively, other values, which correspond to the sensitivity and the scale factor, may be employed as the read-out conditions for the final readout. By way of example, as in the aforesaid embodiment of the third apparatus in accordance with the present invention, the values corresponding to the maximum value and the minimum value of the image signal may be employed as the read-out conditions for the final readout.

How the neural network employed in the aforesaid embodiment of the third apparatus in accordance with the present invention works will be described hereinbelow.

In this embodiment, signals F1, F2, ..., Fn1 fed into the first layer (the input layer) of the neural network shown in FIG. 3 are the image signal components of the preliminary read-out image signal SP representing the picture elements in the X-ray image. Two outputs $y_1^3$ and $y_2^3$ obtained from the third layer (the output layer) are the signals corresponding to the correction values to be used in correcting the results of the analysis of the probability density function.

By using the X-ray image read-out apparatus shown in FIG. 5, preliminary read-out image signals are obtained in the manner described above from a plurality of stimulable phosphor sheets storing X-ray images having a shoulder joint pattern 9 as shown in FIGS. 6A and 6B, for which the appropriate read-out conditions for the final readout are known. In this manner, the n1 number of inputs F1, F2, ..., Fn1 are obtained. In this embodiment, under the appropriate read-out conditions for the final readout, an image signal is obtained which represents an X-ray image such that the pattern of the shoulder joint 9 may have an appropriate image density. Outputs are obtained which represent the correction values to be used in correcting different results of an analysis of the probability density function.

The n1 number of inputs F1, F2, ..., Fn1 are fed into the neural network shown in FIG. 3, and the learning operations of the neural network are carried out in the same manner as that described above. In this embodiment, the instructor signals $\tilde{y}_1^3$ and $\tilde{y}_2^3$ represent the correction values, $\Delta S_{max}$ and $\Delta S_{min}$, which are appropriate for the image. At the time at which the learning operations are completed, the two outputs $y_1^3$ and $y_2^3$ represents the appropriate correction values to be used in correcting the sensitivity and the contrast during the final readout (i.e. such that the pattern of the shoulder joint 9 may have an appropriate image density in a reproduced X-ray image). In cases where no correction need be carried out, a correction value of 0 is fed out.

Therefore, after the learning operations are completed, in order for appropriate read-out conditions for the final readout to be obtained, a preliminary read-out image signal SP representing an X-ray image is fed into the neural network shown in FIG. 3. The outputs $y_1^3$ and $y_2^3$ obtained from the neural network are utilized as signals representing the correction values to be used in correcting the read-out conditions for the final readout, which have been temporarily determined on the basis of the results of an analysis of the probability density function. Because the learning operations have been carried out in the manner described above, the signals represent the correction values for accurately correcting the read-out conditions for the final readout.

The correction values, which have thus been obtained, are added to the outputs resulting from the analysis of the probability density function. In this manner, the optimum read-out conditions for the final readout are obtained.

The voltage applied to the photomultiplier 21' of the final read-out means 100', the amplification factor of the logarithmic amplifier 26', and the like, are controlled in accordance with the read-out conditions for the final readout, which have been corrected by the neural network. The final readout is carried out under the controlled conditions.

In the aforesaid embodiment of the fifth apparatus in accordance with the present invention, the neural network works in the same manner as that in the neural network employed in the aforesaid embodiment of the third apparatus in accordance with the present invention. The image signal components of the preliminary read-out image signal SP, which represent the picture elements in the X-ray image, and the conditions (the sensitivity and the contrast), which have been temporarily determined from the analysis of the probability density function, are fed into the first layer (the input layer) of the neural network. Two outputs $y_1^3$ and $y_2^3$ obtained from the third layer (the output layer) are the signals corresponding to the final read-out conditions for the final readout (i.e. the sensitivity and the contrast).

At the time at which the learning operations of the neural network employed in the embodiment of the fifth apparatus in accordance with the present invention are completed, the two outputs $y_1^3$ and $y_2^3$ represents the appropriate sensitivity and the appropriate contrast during the final readout (i.e. such that the pattern of the shoulder joint 9 may have an appropriate image density in a reproduced X-ray image).

In the manner described above, in the embodiment of the fifth apparatus in accordance with the present invention, the appropriate read-out conditions for the final readout are adjusted by the neural network. The voltage applied to the photomultiplier 21' of the final read-out means 100', the amplification factor of the logarithmic amplifier 26', and the like, are controlled in accordance with the read-out conditions for the final readout, which have been adjusted by the neural network. The final readout is carried out under the controlled conditions.

In the aforesaid embodiments of the third and fifth apparatuses in accordance with the present invention, the read-out conditions for the final readout are adjusted by the computer system 40. Alternatively, the image processing conditions, under which the image signal SQ is to be image processed, may be determined by the computer system 40.

Specifically, the method for adjusting the read-out conditions for the final readout by the computer system 40 provided with probability density function analyzing means the neural network may be applied when the image processing conditions are to be determined. In such cases, predetermined read-out conditions may be used when the final readout is carried out regardless of the characteristics of the preliminary read-out image signal SP. On the basis of the preliminary read-out image signal SP, the computer system 40 may adjust the image processing conditions to be used in carrying out image processing of the image signal SQ. The computer system 40 may also adjust both the read-out conditions and the image processing conditions.

The aforesaid embodiments of the third and fifth apparatuses in accordance with the present invention are applied to the radiation image read-out method wherein the preliminary readout is carried out. However, the third and fifth apparatuses in accordance with the present invention are also applicable to radiation image read-out methods wherein no preliminary read-out operations are carried out, and only the aforesaid final read-out operations are carried out. In such cases, as an embodiment of the fourth apparatus in accordance with the present invention, the image processing conditions are determined on the basis of the results of an analysis of the probability density function of an image signal, which has been detected with an appropriate method. The image processing conditions are then corrected by a computer system constituting a neural network. In an embodiment of the sixth apparatus in accordance with the present invention, the image processing conditions are determined on the basis of the results of an analysis of the probability density function of an image signal, which has been detected with an appropriate method. Thereafter, on the basis of the conditions thus determined and the image signal, a neural network adjusts appropriate image processing conditions.

In the embodiments of the fourth and sixth apparatuses in accordance with the present invention, an image stored on the stimulable phosphor sheet is read out. The fourth and sixth apparatuses in accordance with the present invention are also applicable when image signals are detected from images, such as medical images, which have been recorded on conventional X-ray film, or the like.

Information representing the optimum image processing conditions, which have thus been adjusted, is fed into an image processing unit. In the image processing unit, image processing, such as gradation processing, is carried out on the image signal under the optimum image processing conditions.

An embodiment of the seventh apparatus, i.e. the radiation image read-out apparatus, in accordance with the present invention will be described hereinbelow.

Figure 13A:
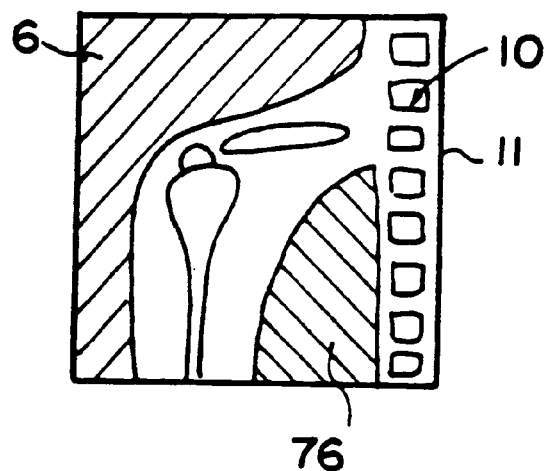
FIGS. 13A and 13B are explanatory views showing examples of X-rays stored on stimulable phosphor sheets.
Figure 13B:
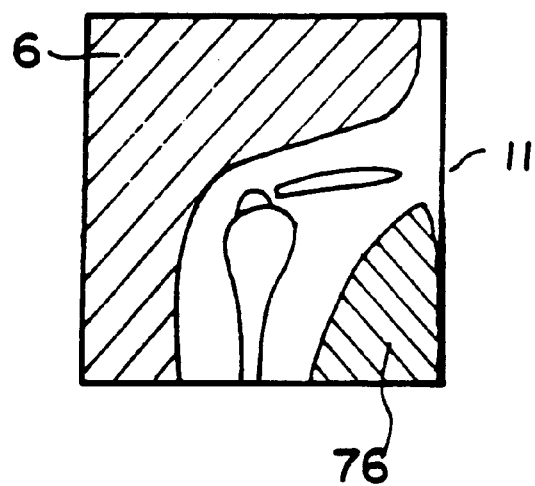

FIGS. 13A and 13B are explanatory views showing X-ray images stored on stimulable phosphor sheets.

The X-ray images shown in FIGS. 13A and 13B are of the right shoulder. However, in the X-ray image of FIG. 13A, patterns of vertebral bodies 10 are included, and the area of a lung field pattern 76 is large.

On the other hand, in the X-ray image of FIG. 13B, no patterns of vertebral bodies 10 are included, and the area of a lung field pattern 76 is small. In general, images of various portions of an object, such as the head, the chest, and the abdomen, are stored on stimulable phosphor sheets.

This embodiment is constituted in the same manner as that shown in FIG. 5. Examples of the latitude operating means and the sensitivity operating means of the seventh apparatus in accordance with the present invention are incorporated in the computer system 40.

FIG. 14 shows how the read-out conditions for the final readout are adjusted in the computer system 40.

When the preliminary read-out image signal SP is fed into the computer system 40, its probability density function is analyzed, and the latitude Gp is determined from the results of the analysis. The preliminary read-out image signal SP is also fed into a neural network, which determines the sensitivity Sk.

The computer system 40 stores information concerning algorithms, which analyze probability density functions and determine latitudes Gp varying in accordance with characteristics of an image, such as portion of the object the image of which was recorded (e.g. the head, the neck, the chest, or the abdomen), the orientation in which the object was placed when the image of the object was recorded (e.g. a front image, a right side image, or a left side image), and the mean value of the image signal (i.e. the mean value of the amount of energy stored on the stimulable phosphor sheet). The computer system 40 also stores information concerning the neural network (or the coefficients representing the weight of connections of neurons constituting the neural network), which determines the sensitivity Sk suitable for the characteristics of the image. When the preliminary read-out image signal SP is fed into the computer system, the information, which represents the corresponding probability density function analyzing algorithm, and the information, which represents the corresponding neural network, are read from the memory of the computer system. The probability density function analyzing algorithm and the neural network determine the latitude Gp and the sensitivity Sk as the read-out conditions for the final readout. The voltage applied to the photomultiplier 21', the amplification factor of the logarithmic amplifier 26', and the like, are controlled in accordance with the sensitivity Sk and the latitude Gp.

How the algorithm works to determine the latitude Gp by analyzing a probability density function will be described hereinbelow.

Figure 15:
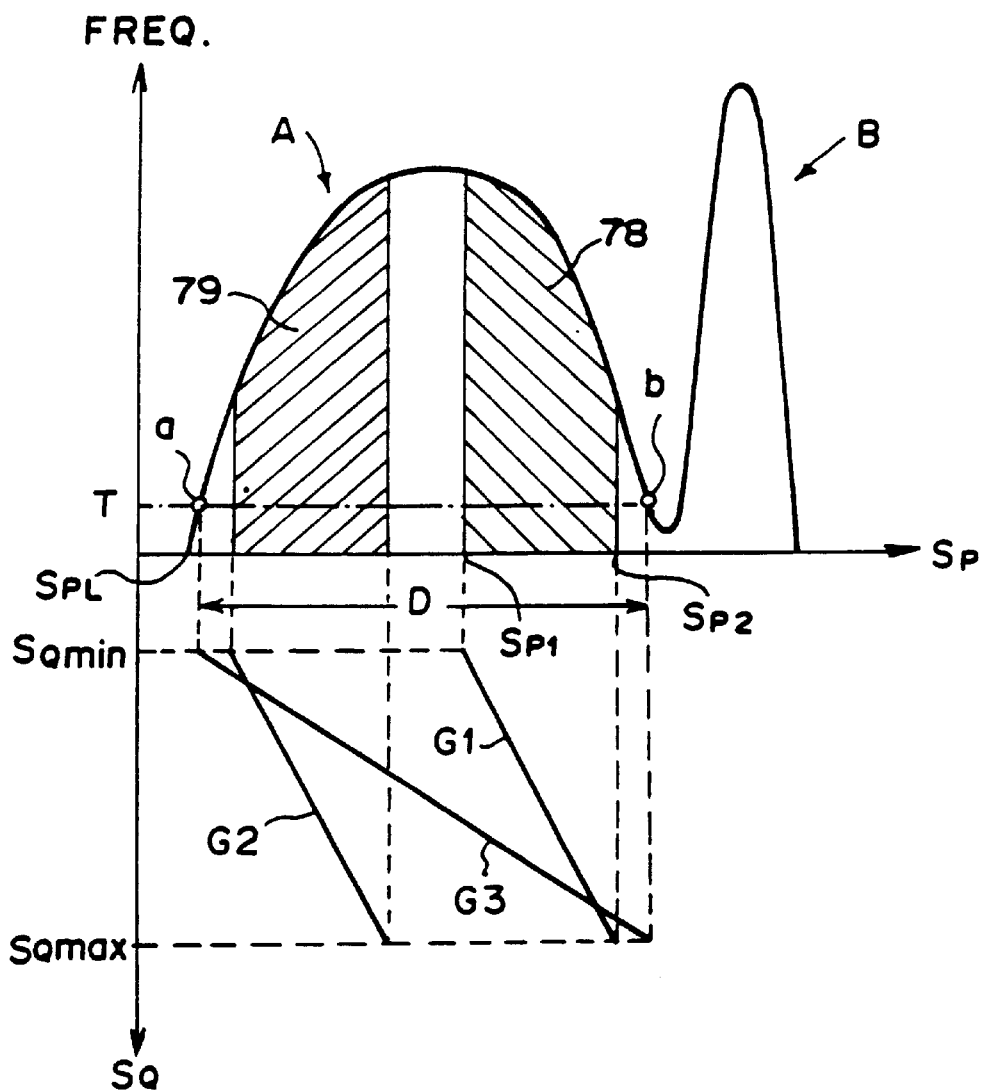
FIG. 15 is a graph showing an example of a probability density function of a preliminary read-out image signal.

FIG. 15 shows a probability density function of the preliminary read-out image signal SP detected from the X-ray image shown in FIG. 13A or FIG. 13B. Approximately the same probability density functions are obtained when the patterns of the vertebral bodies are included and the area of the lung field pattern is large in the X-ray image of FIG. 13A and when no patterns of the vertebral bodies are included and the area of the lung field pattern is small in the X-ray image of FIG. 13B. Therefore, a single probability density function is shown in FIG. 15.

With reference to FIG. 15, the values of the preliminary read-out image signal SP, which were obtained by detecting the light emitted by a stimulable phosphor sheet during a preliminary readout and are proportional to the amount of light emitted, are plotted on the horizontal axis, which has a logarithmic scale. The relative frequency of occurrence of the values of the preliminary read-out image signal SP is plotted on the vertical axis at the upper part of the graph, and the values of the image signal obtained during the final readout are plotted on a logarithmic scale on the vertical axis at the lower part of the graph. The probability density function of the preliminary read-out image signal SP is composed of projecting parts A and B. The projecting part B corresponds to a background region 6 shown in FIGS. 13A and 13B, upon which the X-rays 3 impinged directly without passing through the object 4. It is unnecessary for the image information corresponding to the projecting part B to be reproduced. The projecting part A corresponds to the object image region, upon which the X-rays 3 having passed through the object 4 impinged. The region which it is necessary to reproduce varies for the image shown in FIG. 13A and the image shown in FIG. 13B. The region 78 of the probability density function corresponds to the region in the image shown in FIG. 13A, which it is necessary to reproduce. The region 79 of the probability density function corresponds to the region in the image shown in FIG. 13B, which it is necessary to reproduce. In order for the read-out conditions (the sensitivity Sk and the latitude Gp) for the final readout to be determined which are suitable for the X-ray image shown in FIG. 13A, the read-out conditions for the final readout should be determined such that, during the final readout, the minimum value SP1 of the preliminary read-out image signal SP falling within the region 78 may be detected as the minimum image signal value SQmin, and the maximum value SP2 of the preliminary read-out image signal SP falling within the region 78 may be detected as the maximum image signal value SQmax. Specifically, the read-out conditions for the final readout should be determined such that, during the final readout, the image information represented by values of the emitted light signal falling within the range of SP1 to SP2 is detected as an image signal having values lying on the straight line G1. In order for the read-out conditions for the final readout to be determined which are suitable for the X-ray image shown in FIG. 13B, the read-out conditions for the final readout should be determined such that, during the final readout, the image information represented by values of the emitted light signal falling within the range of the minimum value to the maximum value of the preliminary read-out image signal SP corresponding to the projecting part 79 is detected as an image signal having values lying on the straight line G2.

However, it cannot be discriminated from the probability density function whether the X-ray image was recorded as shown in FIG. 13A or FIG. 13B. Therefore, it cannot be determined whether the read-out conditions for the final readout, which corresponds to the straight line G1, is to be set or the read-out conditions for the final readout, which corresponds to the straight line G2, is to be set.

Therefore, heretofore, by way of example, the values of the probability density function are compared to a threshold value T, starting with the value of the function at the minimum value SP1 of the preliminary read-out image signal SP and working along the direction of increase of the image signal values, i.e. along the chained line. When the probability density function crosses through the threshold value T, a calculation is made to find out whether the function is rising or falling. In this manner, a first rising point "a" and a second falling point "b" are found. The read-out conditions for the final readout are set so that, during the final readout, the minimum value and the maximum value of the range D sandwiched between the points "a" and "b" are detected as the minimum value SQmin and the maximum value SQmax of the image signal SQ. Specifically, the read-out conditions for the final readout are set so that, during the final readout, the image information represented by values of the emitted light signal falling within the range D is detected as an image signal having values lying on the straight line G3. In such cases, problems occur in that, for example, the latitude is wide, and therefore an image is obtained which has a low density resolution. The sensitivity Sk corresponds to the positions of the straight lines G1, G2, and G3 with respect to the horizontal direction (the sensitivity Sk is high for a left straight line). The latitude Gp corresponds to the inclination of the straight line (the latitude Gp is narrow when the angle of inclination of the straight line is large). When the straight lines G1 and G2 are compared with each other, the sensitivity Sk (i.e. the position with respect to the horizontal direction) differs markedly, and the latitude Gp (i.e. the angle of inclination) is nearly the same. It has been known that, when the region of interest is the same, even if the object shifts during the image recording operations, the latitude Gp is kept approximately the same. Therefore, in this embodiment, a predetermined proportion (e.g. 1/3) with respect to the range D sandwiched between the points "a" and "b", which have been found in the manner described above, is taken as the latitude Gp. The sensitivity Sk is determined by the neural network shown in FIG. 3.

In this embodiment, signals F1, F2, . . . , Fn1 fed into the first layer (the input layer) of the neural network shown in FIG. 3 are the image signal components of the preliminary read-out image signal SP representing the picture elements in the X-ray image, which image signal components have been thinned out. The output $y_1^3$ obtained from the third layer (the output layer) are the signal corresponding to the sensitivity Sk during the final readout.

By using the X-ray image read-out apparatus shown in FIG. 5, preliminary read-out image signals are obtained in the manner described above from a plurality of stimulable phosphor sheets storing X-ray images, for which the appropriate read-out conditions (sensitivity Sk) for the final readout are known. The preliminary read-out image signal SP is then thinned out. In this manner, the n1 number of inputs F1, F2, . . . , Fn1 are obtained. The n1 number of inputs F1, F2, . . . , Fn1 are fed into the neural network shown in FIG. 3, and the learning operations of the neural network are carried out in the same manner as that described above. In this embodiment, the instructor signal $\tilde{y}_1^3$ represents the sensitivity, which is appropriate for the image. By carrying out the learning operations, the weight of connection $W_{i\ j}^{k\ k+1}$ is fixed at a final value. In this case, after the system provided with the determining apparatus for determining the read-out conditions for the final readout by using the neural network is located at the user, the learning operations are continued. Therefore, the final value means the final value at the original operation starting stage at the user. When the learning operations are finished, the output $y_1^k$ represents an approximately appropriate sensitivity Sk during the final readout.

The neural network whose learning operations have been finished is prepared in the manner described above. By using the neural network, different values of the sensitivity Sk are determined for the X-ray images shown in FIGS. 13A and 13B. The final readout is carried out by using the sensitivity Sk, which has been determined by the neural network, and the latitude Gp, which has been determined on the basis of the results of an analysis of the probability density function.

In the aforesaid embodiment, the read-out conditions for the final readout are adjusted by the probability density function analyzing means and the neural network. Alternatively, predetermined read-out conditions may be used when the final readout is carried out regardless of the characteristics of the preliminary read-out image signal SP. The probability density function analyzing means and the neural network may adjust the image processing conditions to be used in carrying out image processing of the image signal SQ. The probability density function analyzing means and the neural network may also adjust both the read-out conditions and the image processing conditions.

Figure 16:
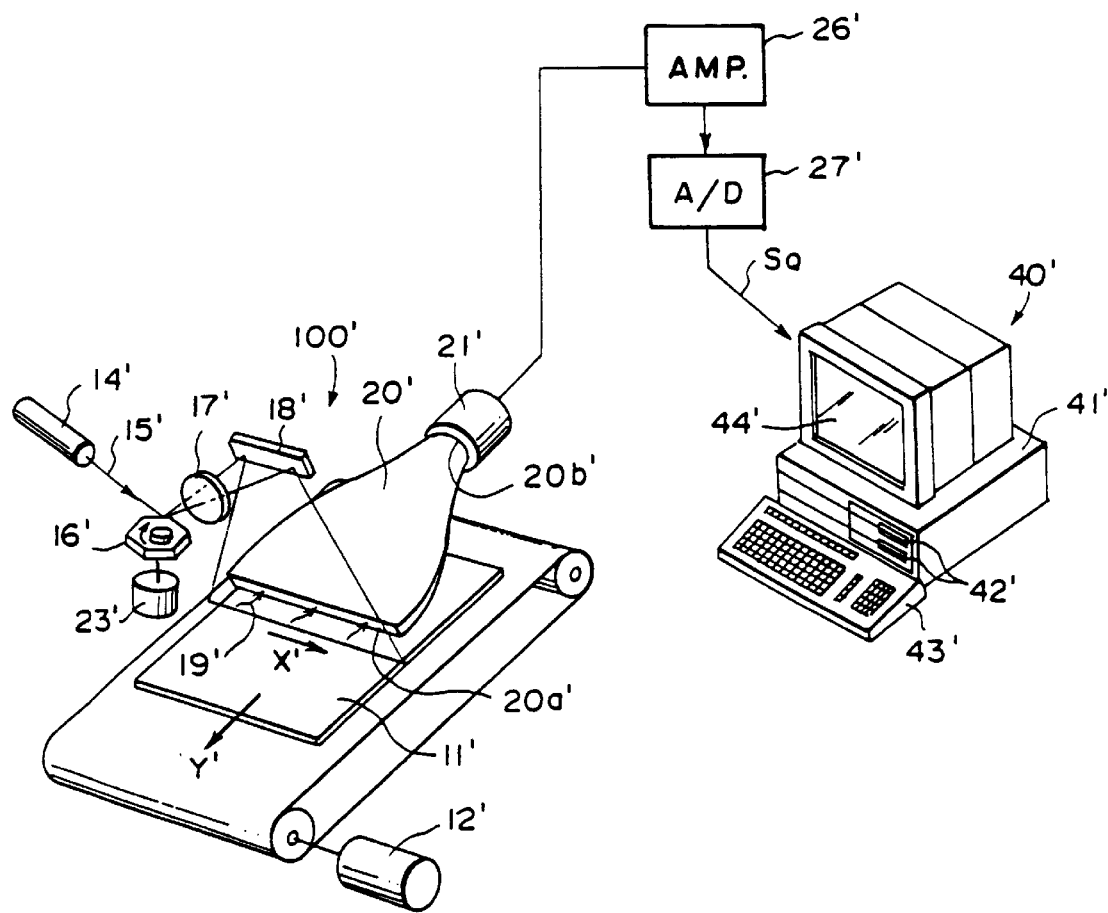
FIG. 16 is a perspective view showing another embodiment of the radiation image read-out apparatus in accordance with the present invention.

FIG. 16 shows an embodiment of the eighth apparatus in accordance with the present invention. In this embodiment, a stimulable phosphor sheet is used, but no preliminary readout is carried out.

In this embodiment, the read-out means 100' is constituted in the same manner as in the final read-out means 100' shown in FIG. 5. In FIG. 16, similar elements are numbered with the same reference numerals with respect to FIG. 5.

The image signal SQ obtained from the A/D converter 27' is fed into a computer system 40'. In the computer system 40', the image processing conditions, under which the image signal SQ is to be image processed, are determined in the same manner as that in the aforesaid embodiment of the seventh apparatus in accordance with the present invention such that a visible image can be obtained which has an appropriate density and an appropriate contrast. As the image processing conditions, the latitude is determined by the probability density function analyzing means, and the sensitivity is determined by the neural network. The image signal obtained from the image processing is fed into an image reproducing apparatus (not shown), which reproduces a hard copy of the radiation image from the image signal.

In the aforesaid embodiments of the seventh and eighth apparatuses in accordance with the present invention, the stimulable phosphor sheet is used. The seventh and eighth apparatuses in accordance with the present invention are also applicable when other recording media, such as X-ray film, are used.

An embodiment of the ninth method, i.e. the method for adjusting read-out conditions and/or image processing conditions for a radiation image, in accordance with the present invention will be described hereinbelow.

FIG. 17 shows the embodiment of the ninth method in accordance with the present invention. The ninth apparatus for carrying out the ninth method in accordance with the present invention is provided with a means 302 for determining the position of the center point of the pattern of the object in an radiation image on the basis of an image signal 301 representing the radiation image of the object. The ninth apparatus is also provided with a neural network 303, which receives the output of the object center position determining means 302 and the image signal 301 and adjusts the read-out conditions for the final readout and/or the image processing conditions on by taking the position of the center point of the pattern of the object into consideration.

When the image signal 301 is fed into the neural network 303 and the information, which represents the read-out conditions for the final readout and/or the image processing conditions, is fed out from the neural network 303, the information representing the position of the center point of the pattern of the object in the image is fed into the neural network 303. Therefore, in the neural network 303, the read-out conditions for the final readout and/or the image processing conditions can be adjusted on the basis of the image signal by considering the position of the center point of the pattern of the object.

The embodiment of the ninth apparatus is incorporated in the computer system 40 shown in FIG. 5.

In the computer system 40, when necessary, a subdivision pattern and the shape and location of an irradiation field are determined from the preliminary read-out image signal SP. Thereafter, the read-out conditions for the final readout, i.e. the sensitivity Sk and the latitude Gp during the final readout, are determined by the neural network on the basis of the preliminary read-out image signal SP. By way of example, the voltage applied to a photomultiplier 21' and the amplification factor of a logarithmic amplifier 26' are controlled in accordance with the sensitivity Sk and the latitude Gp. At this time, the information, which represents the position of the center point of the pattern of the object, is fed into the neural network together with the preliminary read-out image signal SP. The neural network adjusts the sensitivity Sk and the latitude Gp on the basis of the preliminary read-out image signal SP by considering the position of the center point of the pattern of the object.

In the computer system 40, the preliminary read-out image signal SP is fed into the neural network 303 and the object center position determining means 302. The neural network 303 adjusts the read-out conditions for the final readout on the basis of the preliminary read-out image signal SP by considering the position of the center point of the pattern of the object.

In order for the position of the center point of the pattern of the object to be determined, the method disclosed in Japanese Unexamined Patent Publication No. 2(1990)-28782 may be employed. The disclosed method for determining an image point in an object image comprises the steps of:

i) on the basis of an image signal comprising image signal components representing image information at respective picture elements on a recording medium (such as a stimulable phosphor sheet or photographic film) on which a radiation image including an object image has been recorded, weighting the respective picture elements with image signal values corresponding to the respective picture elements or with the reciprocals of said image signal values, thereby to find the center of gravity on said recording medium, and ii) determining a position, at which said center of gravity is located, as the image point in said object image.

Alternatively, a method for determining an image point in an object image may be employed, which comprises the steps of:

i) on the basis of an image signal comprising image signal components representing image information at respective picture elements on a recording medium (such as a stimulable phosphor sheet or photographic film) on which a radiation image including an object image has been recorded, arraying image signal values corresponding to the respective picture elements or the reciprocals of said image signal values so that the positions of said image signal values or the positions of said reciprocals of said image signal values coincide with the positions of the corresponding picture elements, ii) cumulating said image signal values or said reciprocals of said image signal values along each of two different directions on said recording medium, and plotting the resulting cumulative values of said image signal values or the resulting cumulative values of said reciprocals of said image signal values along each of said two different directions, thereby to find the distributions of the cumulative values along said two different directions, iii) detecting a coordinate point along each of said two different directions, at which point the cumulative value is approximately one half of the maximum cumulative value, from each of said distributions of the cumulative values, and ix) determining a position on said recording medium, which position is defined by the coordinate points detected along said two different directions, as the image point in said object image.

In the two methods for determining an image point in an object image, whether to use the image signal values or the reciprocals of the image signal values may be determined in the manner described below. After said image signal is detected, calculations are made based on said image signal to find a first representative value which is representative of the image signal values corresponding to the peripheral portion of said recording medium, and a second representative value which is representative of the image signal values corresponding to the overall area of said recording medium or corresponding to approximately the center portion of said recording medium. Said first representative value and said second representative value are compared with each other, and whether to use the image signal values or the reciprocals of the image signal values is selected in accordance with the results of the comparison.

How the learning operations of the neural network are repeated and appropriate read-out conditions for the final readout are adjusted thereby will be described hereinbelow. The neural network is constituted as shown in FIG. 3. Signals F1, F2, . . . , Fn1 fed into the first layer (the input layer) are the image signal components of the preliminary read-out image signal SP representing the picture elements in the X-ray image. Two outputs $y_1^3$ and $y_2^3$ obtained from the third layer (the output layer) are the signals corresponding to the sensitivity and the contrast during the final readout.

Preliminary read-out image signals are obtained in the manner described above from a plurality of stimulable phosphor sheets storing X-ray images, for which the appropriate read-out conditions for the final readout are known. In this manner, the n1 number of inputs F1, F2, . . . , Fn1 are obtained. The n1 number of inputs F1, F2, . . . , Fn1 are fed into the neural network shown in FIG. 3, and the learning operations of the neural network are repeated in the same manner as that described above. The instructor signals representing the read-out conditions for the final readout appropriate for the image represent the sensitivity $\tilde{y}_1^3$ and the contrast $\tilde{y}_2^3$. At the time at which the learning operations are completed, the two outputs $y_1^3$ and $y_2^3$ represents the appropriate sensitivity and the appropriate contrast during the final readout.

Therefore, after the learning operations are completed, in order for appropriate read-out conditions for the final read-out to be obtained, a preliminary read-out image signal SP representing an X-ray image is fed into the neural network shown in FIG. 3. The outputs $y_1^3$ and $y_2^3$ obtained from the neural network are utilized as signals representing the read-out conditions (i.e. the sensitivity and the contrast) for the final readout appropriate for the X-ray image. Because the learning operations have been carried out in the manner described above, the signals accurately represent the appropriate read-out conditions for the final readout.

In cases where the read-out conditions for the final readout and/or the image processing conditions are determined by using only the neural network, judgments are made based on the image signal representing the whole image. Therefore, if the position of the object image region in the image (shown in FIG. 18B) shifts largely from the standard position in the image shown in FIG. 18A, when judgments are made, the same weight as that for the image signal components corresponding to the object image region is assigned to the image signal components corresponding to the background region, and therefore errors will occur in making the judgments. Also, because the image signal is directly fed into the neural network and the learning operations of the neural network are repeated, if image signals representing many images in which the object image regions shift are fed into the neural network, a very long period is required for the learning operations to be carried out.

Therefore, in the ninth method in accordance with the present invention, when the image signal is fed into the neural network and the read-out conditions for the final readout are determined by the neural network, the information representing the position of the center point of the pattern of the object in the image is fed into the neural network. In the neural network, the whole image signal is shifted in accordance with the shift of the center point of the pattern of the object such that the position of the center point of the pattern of the object, which was employed during the learning operations, and the position of the center point of the pattern of the object in the image represented by the image signal fed into the neural network may coincide with each other. Thereafter, the read-out conditions for the final readout are determined.

Therefore, even if image signals representing many images, in which the object image regions shift, are fed into the neural network, the read-out conditions for the final readout can be determined efficiently and accurately.

In the aforesaid embodiment of the ninth method in accordance with the present invention, the read-out conditions for the final readout are determined by the computer system 40. Alternatively, the image processing conditions, under which the image signal SQ is to be image processed, may be determined by the computer system 40.

Specifically, the method for adjusting the read-out conditions for the final readout by the computer system 40 provided with the neural network may be applied when the image processing conditions are to be determined. In such cases, predetermined read-out conditions may be used when the final readout is carried out regardless of the characteristics of the preliminary read-out image signal SP. On the basis of the preliminary read-out image signal SP, the computer system 40 may adjust the image processing conditions to be used in carrying out image processing of the image signal SQ. The computer system 40 may also adjust both the read-out conditions and the image processing conditions.

The aforesaid embodiment of the ninth method in accordance with the present invention is applied to the radiation image read-out method wherein the preliminary readout is carried out. However, the ninth method in accordance with the present invention is also applicable to radiation image read-out methods wherein no preliminary read-out operations are carried out, and only the aforesaid final read-out operations are carried out. In such cases, as an embodiment of the tenth method in accordance with the present invention, in the computer system provided with the neural network, the image processing conditions are determined on the basis of the image signal obtained by an appropriate method. At this time, the position of the center point of the pattern of the object is taken into consideration in the neural network.

In the embodiment of the tenth method in accordance with the present invention, an image stored on the stimulable phosphor sheet is read out. The tenth method in accordance with the present invention is also applicable when image signals are detected from images, such as medical images, which have been recorded on conventional X-ray film, or the like.

Information representing the optimum image processing conditions, which have thus been adjusted, is fed into an image processing unit. In the image processing unit, image processing, such as gradation processing, is carried out on the image signal under the optimum image processing conditions.

An embodiment of the eleventh method, i.e. the method for adjusting read-out conditions and/or image processing conditions for a radiation image, in accordance with the present invention will be described hereinbelow. FIG. 19 is a block diagram showing the embodiment of the eleventh method in accordance with the present invention. Specifically, a probability density function 402 of an image signal 401 representing a radiation image is created. The information representing the probability density function 402 is fed into a neural network 404. Alternatively, both the information, which represents the probability density function 402, and subsidiary information, which gives specifics about the radiation image, e.g. the information concerning the patient and the mode in which the radiation image was recorded, are fed into the neural network 404. The neural network 404 adjusts the read-out conditions for the final readout and/or the image processing conditions 405.

This embodiment is incorporated in the computer system 40 shown in FIG. 5.

In the computer system 40, when necessary, a subdivision pattern and the shape and location of an irradiation field are determined from the preliminary read-out image signal SP. Thereafter, the probability density function of the preliminary read-out image signal SP is created. The read-out conditions for the final readout, i.e. the sensitivity Sk and the latitude Gp during the final readout, are determined by a neural network on the basis of the results of an analysis of the probability density function. By way of example, the voltage applied to a photomultiplier 21' and the amplification factor of a logarithmic amplifier 26' are controlled in accordance with the sensitivity Sk and the latitude Gp. Also, the image processing conditions are determined on the basis of the results of an analysis of the probability density function.

The preliminary read-out image signal SP is fed into an operation means, which carries out the embodiment of the eleventh method in accordance with the present invention. In this embodiment, the combination of the hardware and software functions, which are incorporated in the computer system 40 for realizing the functions of the respective means of the eleventh method in accordance with the present invention, constitutes the examples of the respective means of the eleventh method in accordance with the present invention.

Figure 20:
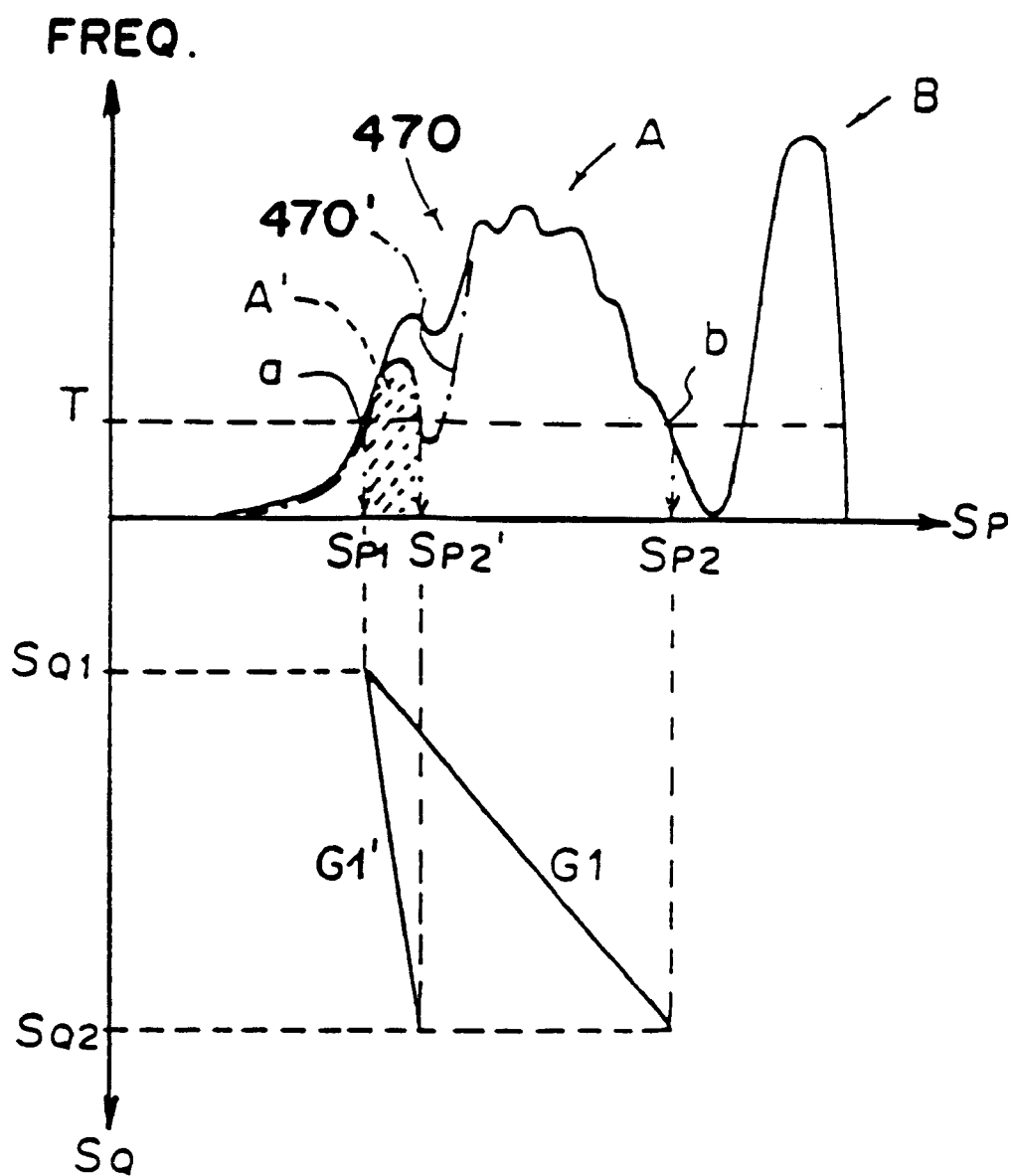
FIG. 20 is a graph showing examples of probability density functions of image signals detected from stimulable phosphor sheets.

FIG. 20 shows the probability density function of the preliminary read-out image signal SP.

With reference to FIG. 20, the values of the preliminary read-out image signal SP are plotted on the horizontal axis. The relative frequency of occurrence of the values of the preliminary read-out image signal SP is plotted on the vertical axis at the upper part of the graph (a single image signal component of the preliminary read-out image signal SP corresponding to each picture element in the X-ray image is counted as one). Also, the values of the image signal SQ obtained during the final readout are plotted on the vertical axis at the lower part of the graph.

The probability density function 470 of the preliminary read-out image signal SP is composed of a projecting part A, which corresponds to the object image region, and a projecting part B, which corresponds to a background region and is located on the larger image signal value side than the projecting part A. The values of the probability density function 470 are compared to a threshold value T, starting with the smaller value of the preliminary read-out image signal SP and working along the direction of increase of the image signal values. Points, at which the probability density function crosses through the threshold value T, are found. In this manner, a first point "a" and a second point "b" are found. The values SP1 and SP2 corresponding to the points "a" and "b" are thus found. The range of the value SP1 to the value SP2 of the preliminary read-out image signal SP is found as corresponding to the object image pattern in the X-ray image. The read-out conditions for the final readout are set so that, during the final readout, the amounts of light emitted from points on the X-ray image corresponding to the values SP1 and SP2 of the preliminary read-out image signal SP are detected as the minimum value SQ1 and the maximum value SQ2 of the image signal SQ. Specifically, the read-out conditions for the final readout are set so that, during the final readout, the image information represented by values of the emitted light signal falling within the range of SP1 to SP2 is detected as an image signal having values lying on the straight line G1. The final readout is carried out under the read-out conditions, which have thus been set. The read-out conditions for the final readout are determined by the position of the straight line G1 with respect to the horizontal direction in FIG. 20 (the sensitivity Sk) and the inclination of the straight line G1 (the latitude Gp).

However, in cases where a probability density function 470' is obtained which has a projecting part A' crossing through the threshold value T, the read-out conditions for the final readout, which correspond to a straight line G1', are set by mistake. If the final readout is carried out under the read-out conditions for the final readout, which have thus been set by mistake, an image signal SQ is obtained which corresponds only to the range between the values SP1 and SP2' of the preliminary read-out image signal SP (which range corresponds to the range A' of the probability density function). In such cases, a new image recording operation must be carried out.

In the embodiment of the eleventh method in accordance with the present invention, such that the read-out conditions for the final readout which correspond to the straight line G1 in FIG. 20 may be set even in cases described above, the information representing the probability density function is fed into the neural network, the learning operations of the neural network are carried out, and appropriate read-out conditions for the final readout corresponding to the probability density function are determined.

In an embodiment of the twelfth method in accordance with the present invention, in order for the accuracy, with which the conditions are adjusted, to be kept higher, subsidiary information giving specifics about the radiation image are fed into the neural network together with the information representing the probability density function. The read-out conditions for the final readout are determined in accordance with the combination of the subsidiary information and the probability density function. In this manner, the accuracy, with which the conditions are adjusted by the neural network, can be kept high. The subsidiary information includes, for example, the information concerning the patient (such as the name of the patient or the portion of the object the image of which was recorded), and the mode in which the image was recorded (such as a simple image recording mode, a contrasted image recording mode, or a tomographic mode).

An X-ray image read-out apparatus will be described hereinbelow, in which a computer system wherein an embodiment of the thirteenth method in accordance with the present invention is employed is incorporated.

Figure 22:
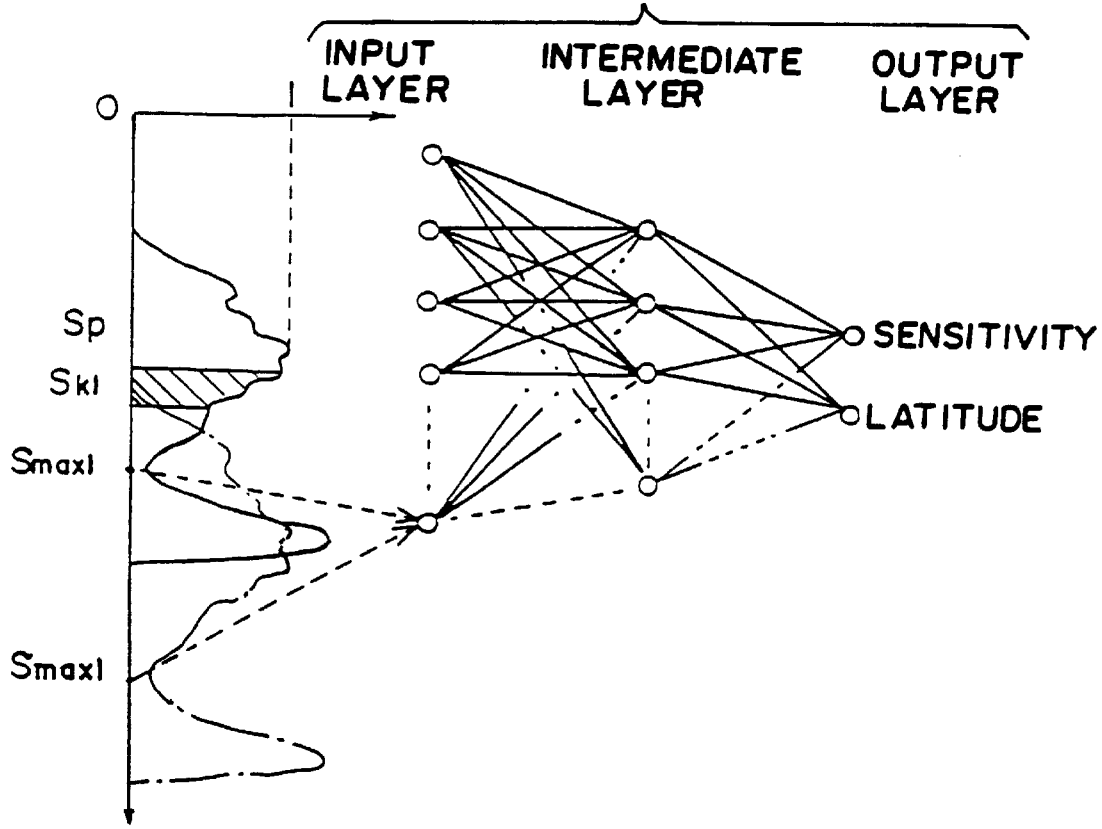
FIG. 22 is an explanatory view showing a normalized probability density function of a preliminary read-out image signal and an example of a neural network.

FIG. 21 shows the embodiment of the thirteenth method in accordance with the present invention. FIG. 22 shows a normalized probability density function, which has been obtained by normalizing the probability density function of the preliminary read-out image signal SP, and an example of the neural network. In this embodiment, a probability density function 552 of an image signal 551 representing a radiation image is created by an operation means 559. The value of the image signal, which value represents the maximum amount of the emitted light in part of the probability density function 559 other than the part corresponding to a background region in the radiation image, is taken as the maximum value Smax1. The probability density function 552 is normalized in its part between the maximum value Smax1 and the minimum value Smin of the image signal 551, a normalized probability density function 554 being thereby created. Information, which represents the normalized probability density function 554, is fed into a neural network 555 as shown in FIG. 22 such that a predetermined value (the maximum value Smax1 in this case), which falls within the range of the maximum value Smax1 and the minimum value Smin of the image signal in the normalized probability density function 554, may always be fed into the same input unit (the lowest input unit in this case) of the neural network 555. Alternatively both the information, which represents the normalized probability density function 554, and subsidiary information 558, which gives specifics about the radiation image stored on the stimulable phosphor sheet, are fed into the neural network. Information representing the read-out conditions and/or the image processing conditions is fed out from the neural network 555. The read-out conditions and/or the image processing conditions, which are represented by the information fed out from the neural network 555, are corrected for the sensitivity. In this manner, appropriate read-out conditions and/or appropriate image processing conditions are set.

The embodiment of the thirteenth method in accordance with the present invention is incorporated in the computer system 40 shown in FIG. 5.

In the computer system 40, when necessary, a subdivision pattern and the shape and location of an irradiation field are determined from the preliminary read-out image signal SP. Thereafter, the probability density function of the preliminary read-out image signal SP is created. The value of the image signal, which value represents the maximum amount of the emitted light in part of the probability density function other than the part corresponding to a background region in the radiation image, is taken as the maximum value Smax1. The probability density function is normalized in its part between the maximum value Smax1 and the minimum value Smin of the preliminary read-out image signal SP, a normalized probability density function being thereby created. Information, which represents the normalized probability density function, is fed into the neural network as shown in FIG. 22 such that, even if the values of the image signal in the normalized probability density function vary, the maximum values Smax1 and S'max1 may always be fed into the same input unit (the lowest input unit in FIG. 22) of the neural network. The neural network determines the read-out conditions for the final readout, i.e. the sensitivity Sk' and the latitude Gp' during the final readout, on the basis of the normalized probability density function. The sensitivity Sk' and the latitude Gp' are corrected with the maximum value Smax1. By way of example, the voltage applied to a photomultiplier 21' and the amplification factor of a logarithmic amplifier 26' are controlled in accordance with the sensitivity Sk and the latitude Gp, which have thus been corrected.

The final readout is carried out at the final readout means 100' shown in FIG. 5 under the read-out conditions for the final readout, which have thus been adjusted.

The image signal SQ obtained by being digitized in the A/D converter 27' is fed into the computer system 40. In the computer system 40, appropriate image processing is carried out on the image signal SQ, and the processed image signal is fed into a reproducing apparatus (not shown). In the reproducing apparatus, an X-ray image is reproduced from the image signal.

In the computer system 40, the probability density function of the preliminary read-out image signal SP is created. The value of the image signal, which value represents the maximum amount of the emitted light in part of the probability density function other than the part corresponding to a background region in the radiation image, is taken as the maximum value Smax1. The probability density function is normalized in its part between the maximum value Smax1 and the minimum value Smin of the preliminary read-out image signal SP, a normalized probability density function being thereby created. Information, which represents the normalized probability density function, is fed into the neural network as shown in FIG. 22 such that the maximum value Smax1 may always be fed into the same input unit (the lowest input unit in FIG. 22) of the neural network. The neural network determines the read-out conditions for the final readout and/or the image processing conditions. The image processing conditions are corrected with the maximum value Smax1 taken as a predetermined value, which falls within the maximum value Smax1 and the minimum value Smin in the normalized probability density function. In this manner, the image processing conditions appropriate for the X-ray image are adjusted.

The preliminary read-out image signal SP is fed into an operation means, which carries out the embodiment of the thirteenth method in accordance with the present invention. In this embodiment, the combination of the hardware and software functions, which are incorporated in the computer system 40 for realizing the functions of the respective means of the thirteenth method in accordance with the present invention, constitutes the examples of the respective means of the thirteenth method in accordance with the present invention.

How the probability density function is normalized in the embodiment of the thirteenth method in accordance with the present invention will be described hereinbelow.

Figure 23:
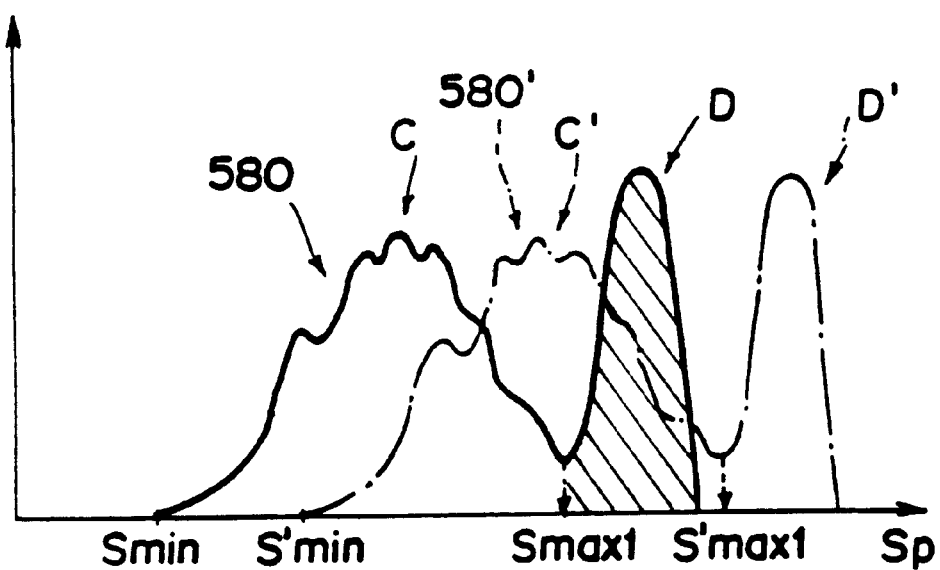
FIG. 23 is a graph showing different examples of probability density functions of image signals detected from stimulable phosphor sheets.

FIG. 23 shows the probability density functions of preliminary read-out image signals SP. With reference to FIG. 23, the values of the preliminary read-out image signal SP are plotted on the horizontal axis. The relative frequency of occurrence of the values of the preliminary read-out image signal SP is plotted on the vertical axis at the upper part of the graph (a single image signal component of the preliminary read-out image signal SP corresponding to each picture element in the X-ray image is counted as one).

The probability density function 580 of the preliminary read-out image signal SP is composed of a projecting part C, which corresponds to the object image region, and a projecting part D, which corresponds to a background region and is located on the larger image signal value side than the projecting part C. The value of the preliminary read-out image signal, which value represents the maximum amount of the emitted light in part of the probability density function 580 other than the part corresponding to a background region in the radiation image, is taken as the maximum value Smax1. Also, the minimum value of the preliminary read-out image signal in the probability density function 580 is taken as Smin. The probability density function is normalized with its maximum value in its part between the maximum value Smax1 and the minimum value Smin of the preliminary read-out image signal SP, a normalized probability density function being thereby created. The normalized probability density function corresponds only to the object image region and is free of the image signal corresponding to the background region.

However, in cases where a probability density function 580' is obtained, which is of the preliminary read-out image signal having values different from the probability density function 580 due to a change in the X-ray dose, i.e. when the sensitivity of the image varies, the minimum value Smin and the maximum value Smax1 of the image signal vary. The values of the image signal in the normalized probability density function fed into the neural network cover a wide range. If such a normalized probability density function is fed into the neural network, a long time will be required for the leaning operations to be carried out. Also, appropriate read-out conditions for the final readout and/or appropriate image processing conditions cannot be obtained.

Therefore, in the embodiment of the thirteenth method in accordance with the present invention, the information, which represents the normalized probability density function, is fed into the neural network such that appropriate read-out conditions for the final readout and/or appropriate image processing conditions can be set without being adversely affected by the sensitivity. Specifically, as shown in FIG. 22, the information, which represents the normalized probability density function, is fed into the neural network such that a predetermined value (the maximum value Smax1 in FIGS. 22 and 23), which falls within the range of the maximum value Smax1 and the minimum value Smin of the image signal in the normalized probability density function, may always be fed into the same input unit of the neural network. In this manner, approximately the same conditions are determined even if the image signal values in the normalized probability density function fed into the neural network vary. The read-out conditions for the final readout and/or the image processing conditions, which are fed out from the neural network, are corrected in accordance with the predetermined value (the maximum value Smax1 in FIGS. 22 and 23), and the read-out conditions for the final readout and/or the image processing conditions appropriate for the image are thereby adjusted.

In the aforesaid embodiment, the maximum value Smax1 is employed as the predetermined value, which falls within the range of the maximum value Smax1 and the minimum value Smin of the image signal in the normalized probability density function. Alternatively, any of other values may be employed which falls within the range of the maximum value and the minimum value of the image signal in the normalized probability density function. For example, the minimum value of the image signal, an intermediate value between the maximum value and the minimum value, or the like, may be employed. In cases where the minimum value is employed as the predetermined value, it is fed into the top input unit in FIG. 22. In cases where the intermediate value between the maximum value and the minimum value is employed as the predetermined value, it is fed into an intermediate input unit in FIG. 22.

As described above, the predetermined value (the maximum value Smax1 in this case) of the image signal in the normalized probability density function is always fed into the same input unit of the neural network. In such case, other values of the image signal are sequentially fed into the input units adjacent to the input unit determined with reference to the predetermined value. For example, in cases where the maximum value Smax1 is fed into the lowest input unit, the values of the image signal from the maximum value Smax1 to the minimum value Smin in the normalized probability density function are fed sequentially into input units in the order from the lowest input unit to the top input unit. In cases where the minimum value is employed as the predetermined value, the values of the image signal from the minimum value Smin to the maximum value Smax1 in the normalized probability density function are fed sequentially into input units in the order from the top input unit to the lowest input unit. In cases where an intermediate value between the maximum value and the minimum value is employed as the predetermined value, the values of the image signal from the minimum value Smin to the maximum value Smax1 in the normalized probability density function are fed sequentially into input units in the order from an intermediate input unit to the top and lowest input units.

In an embodiment of the fourteenth method in accordance with the present invention, in order for the accuracy, with which the conditions are adjusted, to be kept higher, subsidiary information giving specifics about the radiation image are fed into the neural network together with the information representing the normalized probability density function. The read-out conditions for the final readout are determined in accordance with the combination of the subsidiary information and the normalized probability density function. In this manner, the accuracy, with which the conditions are adjusted by the neural network, can be kept high.

How the learning operations of the neural network are repeated and appropriate read-out conditions for the final readout are adjusted thereby will be described hereinbelow. The neural network is constituted as shown in FIG. 3. Signals F1, F2, . . . , Fn1 fed into the first layer (the input layer) are the signals representing the probability density function or the normalized probability density function of the image signal components of the preliminary read-out image signal SP representing the picture elements in the X-ray image. Two outputs $y_1^3$ and $y_2^3$ obtained from the third layer (the output layer) are the signals corresponding to the sensitivity and the latitude during the final readout.

Preliminary read-out image signals are obtained in the manner described above from a plurality of stimulable phosphor sheets storing X-ray images, for which the appropriate read-out conditions for the final readout are known. The preliminary read-out image signal is then thinned out. In this manner, the n1 number of inputs F1, F2, . . . , Fn1 are obtained. The n1 number of inputs F1, F2, . . . , Fn1 are fed into the neural network shown in FIG. 3, and the learning operations of the neural network are repeated in the same manner as that described above. The instructor signals representing the read-out conditions for the final readout appropriate for the image represent the sensitivity $y_1^3$ and the latitude $y_2^3$. At the time at which the learning operations are completed, the two outputs $y_1^3$ and $y_2^3$ represents the appropriate sensitivity and the appropriate latitude during the final readout.

Therefore; after the learning operations are completed, a probability density function or a normalized probability density function is created from a preliminary read-out image signal SP representing an X-ray image, and is fed into the neural network shown in FIG. 3. The outputs $y_1^3$ and $y_2^3$ obtained from the neural network are utilized as signals representing the read-out conditions (i.e. the sensitivity and the latitude) for the final readout appropriate for the X-ray image. Because the learning operations have been carried out in the manner described above, the signals accurately represent the appropriate read-out conditions for the final readout.

How the sensitivity is corrected in the embodiment of the thirteenth method in accordance with the present invention will be described hereinbelow. In this embodiment, as shown in FIG. 22, the normalized probability density function is fed into the neural network such that the maximum value Smax1 may always be fed into the same input unit. The read-out conditions for the final readout are determined which do not depend on the sensitivity even if the sensitivity of the image signal values in the normalized probability density function changes. Therefore, the read-out conditions (i.e. the sensitivity and the latitude) for the final readout, which are determined by the neural network, are fed out as information concerning the relative position, instead of being fed out as absolute values. As described above, the latitude corresponds to the ratio of the largest amount of emitted light, which is converted into the image signal, to the smallest amount of emitted light, which is converted into the image signal. Specifically, the latitude corresponds to the ratio of the maximum value Smax1 to the minimum value Smin. From the neural network, information representing the ratio of the maximum value Smax1 to the minimum value Smin is fed out as the latitude. Therefore, the latitude need not be corrected. In this embodiment, the sensitivity is obtained from the neural network as the information concerning the position between the minimum value Smin and the maximum value Smax1, i.e. as the percentage of the position of sensitivity of the necessary region (the hatched region in FIG. 22) from the point corresponding to the minimum value Smin toward the point corresponding to the maximum value Smax1 of the preliminary read-out image signal SP in the normalized probability density function. Because the minimum value Smin and the maximum value Smax1 are already known, the sensitivity is corrected with the formula Sensitivity Sk=Smax1-(Smax1-Smin)xSk1 (%) (24)

The final read-out conditions for the final readout (the sensitivity and the latitude) are thereafter adjusted.

In the manner described above, the read-out conditions for the final readout are determined by the neural network and the sensitivity correcting means. The voltage applied to the photomultiplier 27', the amplification factor of the amplifier 26' of the final read-out means 100', or the like, is controlled in accordance with the read-out conditions for the final readout. The final readout is carried out under the controlled conditions.

In the aforesaid embodiments of the eleventh and thirteenth methods in accordance with the present invention, the read-out conditions for the final readout are adjusted by the computer system 40. Alternatively, predetermined read-out conditions may be used when the final readout is carried out regardless of the characteristics of the preliminary read-out image signal SP. On the basis of the preliminary read-out image signal SP, the computer system 40 may adjust the image processing conditions to be used in carrying out image processing of the image signal SQ. The computer system 40 may also adjust both the read-out conditions and the image processing conditions.

The aforesaid embodiments of the eleventh and thirteenth methods in accordance with the present invention are applied to the radiation image read-out apparatus wherein the preliminary readout is carried out. However, the eleventh and thirteenth methods in accordance with the present invention are also applicable to radiation image read-out apparatuses wherein no preliminary read-out operations are carried out, and only the aforesaid final read-out operations are carried out. In these cases, an image signal is obtained by use of predetermined read-out conditions. Based on the image signal, image processing conditions are calculated by the computer system 40. The image signal is processed under the calculated image processing conditions.

An embodiment of the nineteenth apparatus, i.e. the radiation image analyzing apparatus, in accordance with the present invention will be described hereinbelow. This embodiment is incorporated in the computer system 40 shown in FIG. 5.

In the computer system 40, the shape and location of an irradiation field are determined from the preliminary read-out image signal SP. Thereafter, the read-out conditions for the final readout, i.e. the sensitivity and the contrast during the final readout, are determined. By way of example, the voltage applied to the photomultiplier 27', the amplification factor of the amplifier 26' of the final read-out means 100', or the like, is controlled in accordance with the read-out conditions for the final readout. In this embodiment, the read-out conditions for the final readout constitute the characteristic measures in the nineteenth apparatus in accordance with the present invention.

How the computer system 40 determines the shape and location of the irradiation field from the preliminary read-out image signal SP and adjusts the read-out conditions for the final readout will be described hereinbelow.

Figure 24:
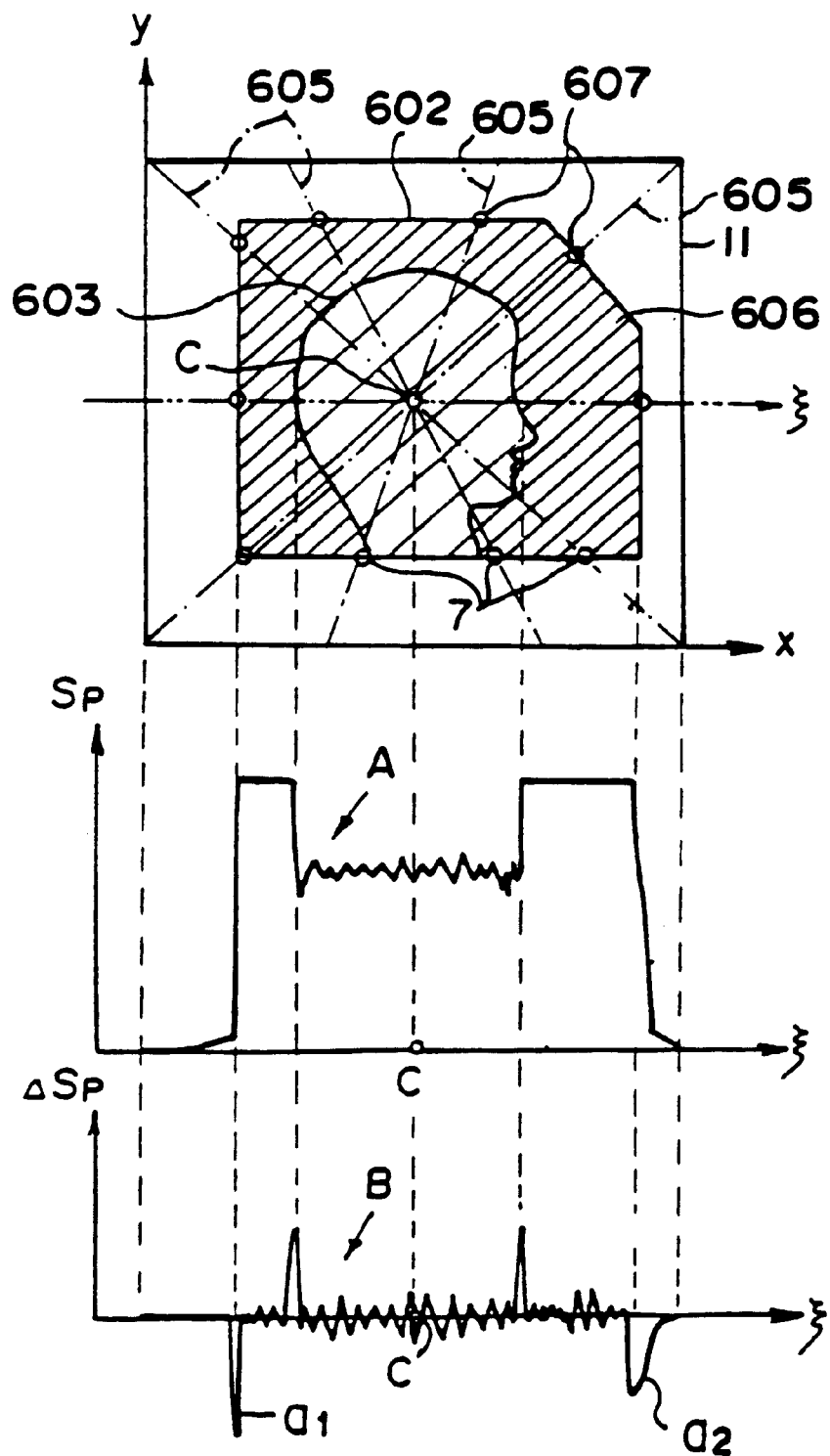
FIG. 24 is an explanatory view showing an example of an X-ray image, a preliminary read-out image signal representing the X-ray image, and differentiated values of the preliminary read-out image signal.

FIG. 24 is an explanatory view showing an example of an X-ray image, a preliminary read-out image signal SP representing the X-ray image, and differentiated values ASP of the preliminary read-out image signal, the explanatory view serving as an aid in explaining an embodiment of the determination means in the nineteenth apparatus in accordance with the present invention.

With reference to FIG. 24, an image of an object 603 (the head of a human body in this case) is stored in the region inside of an irradiation field 602 on the stimulable phosphor sheet 11. In this embodiment, the center point C of the stimulable phosphor sheet 11 is selected as the predetermined point located in the region inside of the irradiation field 602. Differentiation operations are carried out on the image signal components of the preliminary read-out image signal SP corresponding to the picture elements arrayed along each of a plurality of lines 605, 605, . . . which extend radially from the center point C. The point for which the corresponding value of the preliminary read-out image signal SP decreases sharply is detected as a contour point, which is located on the contour of the irradiation field.

How a contour point is detected along the $\xi$ axis, which is one of the lines 605, 605, . . . will be described hereinbelow.

Curve A represents the values of the image signal components of the preliminary read-out image signal SP corresponding to the picture elements arrayed along the $\xi$ axis.

The values of the image signal components of the preliminary read-out image signal SP are largest for a background region 606 which is located outside of the region defined by the object image 603 but inside of the irradiation field 602 and upon which X-rays impinged directly. The values of the image signal components of the preliminary read-out image signal SP corresponding to the contour of the irradiation field 602 decreases sharply.

Curve B represents the results of differentiation carried out on the image signal components of the preliminary read-out image signal SP represented by curve A starting from that signal component corresponding to the center point C and continuing with components corresponding to positions lying in the negative direction along the $\xi$ axis (i.e. leftward in FIG. 24) and in the positive direction along the $\xi$ axis (i.e. rightward in FIG. 24).

Curve B has a single major peak a1 which projects downwardly for the line extending from the center point C in the negative direction along the $\xi$ axis. Therefore, the position on the stimulable phosphor sheet 11 which corresponds to the peak a1 is detected as a contour point on the line extending from the center point C in the negative direction along the $\xi$ axis.

On the line extending from the center point C in the positive direction along the $\xi$ axis, curve B has a peak a2 which projects downwardly. Therefore, the position corresponding to the peak a2 is detected as a contour point on the line extending from the center point C in the positive direction along the $\xi$ axis.

In the manner described above, contour points 607, 607, . . . are detected respectively on a plurality of the lines 605, 605, . . . each of which connects the center point C with the edge of the stimulable phosphor sheet 11. After the contour points 607, 607, . . . are detected, lines connecting them may be assumed to follow the contour of the irradiation field. One of several methods is used to find the lines connecting the contour points 607, 607, . . . , for example, a method wherein prospective contour points remaining after a smoothing process has been carried out are connected together, a method wherein the method of least squares is applied to find a plurality of straight lines and wherein the straight lines are then connected together, or a method wherein a spline curve or the like is applied. In this embodiment, a plurality of straight lines connecting the contour points are found by utilizing a Hough transformation. The processing done to find the straight lines will hereinbelow be described in detail.

Figure 25:
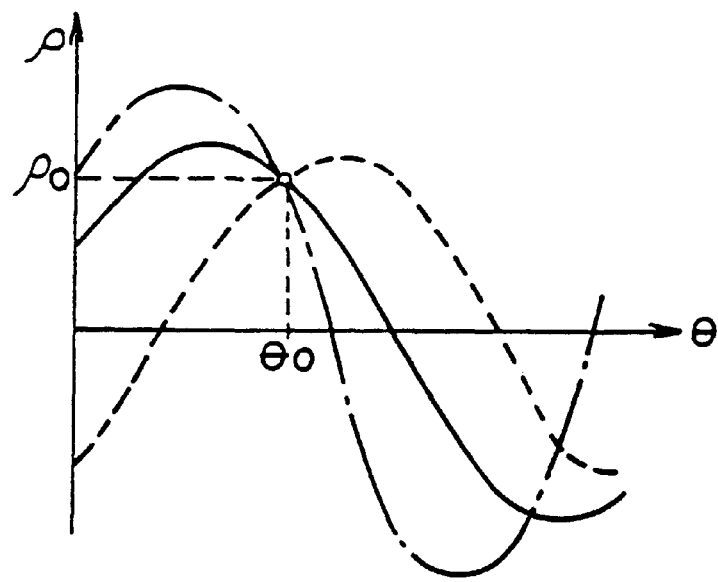
FIG. 25 is an explanatory graph showing how straight lines, which connect contour points of an irradiation field, are detected.

A corner (the lower corner of the left edge) of the stimulable phosphor sheet 11 shown in FIG. 24 is taken as the origin, and the x and y axes are set as shown in FIG. 24. The coordinates of the contour points are expressed as (x1,y1), (x2,y2), . . . , (xn,yn). These coordinates are represented by (xo,yo). As shown in FIG. 25, calculations are made to find the curves expressed as $$\rho = xo \cos\theta + yo \sin\theta \tag{25}$$

where xo and yo are fixed numbers, for each contour point coordinate (xo,yo). FIG. 25 shows the curves thus obtained, and the number of curves equals the number of the contour point coordinates (xo,yo).

Figure 26:
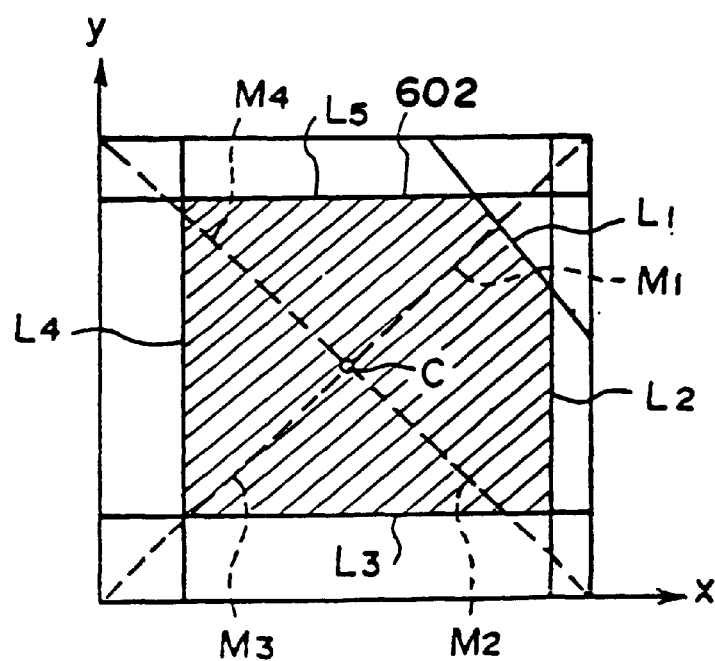
FIG. 26 is an explanatory view showing how a region surrounded by straight lines, which connect contour points of an irradiation field, is extracted.

Then, calculations are made to find the coordinates ($\rho o$, $\theta o$) of the points where the curves intersect and where the number of curves intersecting at each point ($\rho o, \theta o$) is not smaller than a predetermined number Q. Because of errors in finding the contour point coordinates (xo,yo), many curves rarely intersect exactly at a single point. Therefore, by way of example, in the case where multiple sets of two curves have intersections spaced from one another by only small distances not longer than a predetermined distance, the point of intersection at the middle of the group of the intersections is taken as the aforesaid intersection ($\rho o, \theta o$). Then, for each point of intersection ($\rho o, \theta o$), a straight line is calculated, which is expressed as $$\rho o = x \cos\theta o + y \sin\theta o \quad (26)$$

on the x-y orthogonal coordinate system. A plurality of the contour point coordinates (xo,yo) lie along the straight line thus calculated. In cases where the contour points 607, 607, . . . are distributed as shown in FIG. 24, the straight lines L1, L2, L3, L4 and L5 shown in FIG. 26 are obtained. They are extensions of the lines forming the contour of the irradiation field 602 shown in FIG. 24. The region surrounded by the plurality of straight lines L1, L2, L3, . . . , Ln obtained in this manner is then detected, and said region is detected as the irradiation field 602. Specifically, for example, the shape of the region is found in the manner described below. The computer system 40 stores the coordinates for line segments M1, M2, M3, . . . , Mm connecting the corners of the stimulable phosphor sheet 11 with the center point C (four line segments in cases where the stimulable phosphor sheet 11 is rectangular), and detects whether or not each of the line segments M1 to Mm intersects with each of the straight lines L1 to Ln. In cases where an intersection is present, the computer system 40 divides the stimulable phosphor sheet 11 into two regions: one including the corner of the stimulable phosphor sheet 11 to which the line segment is connected and delineated by the straight line and the other including the remainder of the stimulable phosphor sheet 11. The computer system 40 then discards the region including the corner. This operation is carried out for all of the straight lines L1 to Ln and the line segments M1 to Mm, and the region surrounded by the straight lines L1 to Ln is not discarded. The region thus obtained is detected as the irradiation field 602 shown in FIG. 24.

After the shape and location of the irradiation field 602 is found, the preliminary read-out image signal SP corresponding to the region inside of the irradiation field is fed into the neural network. The read-out conditions for the final readout are adjusted so that, during the final readout, the image signal corresponding to the region inside of the irradiation field may be detected under appropriate read-out conditions.

Figure 27:
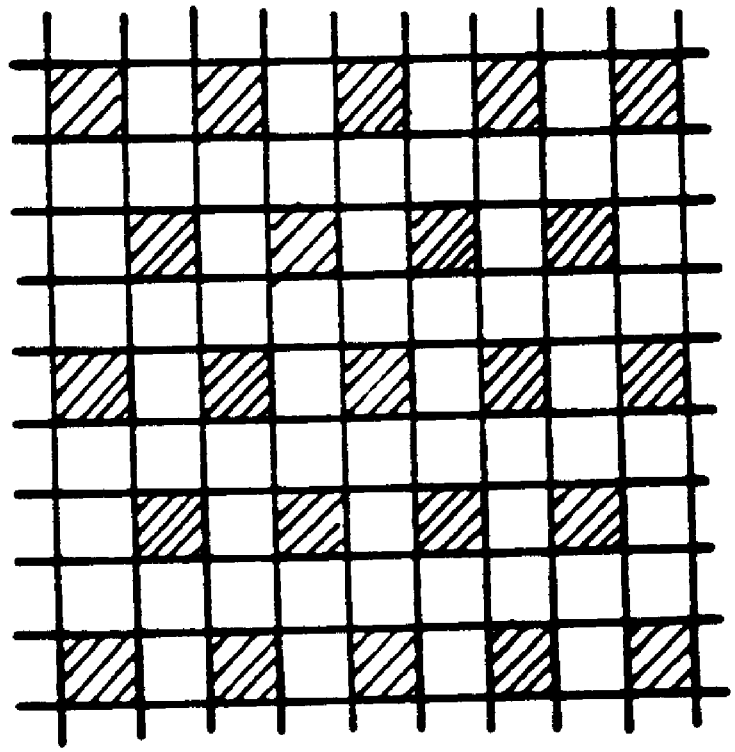
FIG. 27 is an explanatory view showing some of picture elements in an X-ray image, which are located in an irradiation field.

FIG. 27 shows some of the picture elements located in the region inside of the irradiation field in an X-ray image. Each square cell represents a single picture element.

In this embodiment, after the shape and location of the irradiation field 602 have been determined, only the image signal components of the preliminary read-out image signal SP, which represent the picture elements hatched in FIG. 27, are sampled from those corresponding to the picture elements located in the region inside of the irradiation field 602. The sampled image signal components are fed into the neural network. The preliminary read-out image signal SP corresponding to the region inside of the irradiation field 602 need not necessarily be thinned out. However, when the preliminary read-out image signal SP corresponding to the region inside of the irradiation field 602 is thinned out and fed into the neural network, the number of input points of the neural network can be reduced even further.

In most images, the major part of the image is present in the vicinity of the center part in the region inside of the irradiation field. Therefore, the preliminary read-out image signal SP corresponding to the region inside of the irradiation field 602 may be thinned out such that more image signal components remain, which correspond to the center part in the region inside of the irradiation field 602, and less components remain, which correspond to the peripheral areas.

The neural network is constituted as shown in FIG. 3. Signals F1, F2, . . . , Fn1 fed into the first layer (the input layer) are the image signal components of the preliminary read-out image signal SP representing the picture elements located in the region inside of the irradiation field 602 in the X-ray image. The preliminary read-out image signal has been thinned out in the manner described above with reference to FIG. 27. Two outputs $y_1^3$ and $y_2^3$ obtained from the third layer (the output layer) are the signals corresponding to the sensitivity and the contrast during the final readout.

Preliminary read-out image signals are obtained in the manner described above from a plurality of stimulable phosphor sheets storing X-ray images, for which the appropriate read-out conditions for the final readout are known. The preliminary read-out image signal SP is then thinned out in the manner shown in FIG. 27. In this manner, the n1 number of inputs F1, F2, . . . , Fn1 are obtained. The n1 number of inputs F1, F2, . . . , Fn1 are fed into the neural network shown in FIG. 3, and the learning operations of the neural network are repeated in the same manner as that described above. The instructor signals representing the read-out conditions for the final readout appropriate for the image represent the sensitivity $\tilde{y}_1^3$ and the contrast $\tilde{y}_2^3$. At the time at which the learning operations are completed, the two outputs $y_1^3$ and $y_2^3$ represents the appropriate sensitivity and the appropriate contrast during the final readout.

Therefore, after the learning operations are completed, a preliminary read-out image signal SP representing an X-ray image, for which the appropriate read-out conditions for the final readout are unknown, is obtained. The shape and location of the irradiation field in the X-ray image are then determined from the preliminary read-out image signal SP. The preliminary read-out image signal SP corresponding to the region inside of the irradiation field is fed into the neural network shown in FIG. 3. The outputs $y_1^3$ and $y_2^3$ obtained from the neural network are utilized as signals representing the read-out conditions (i.e. the sensitivity and the contrast) for the final readout appropriate for the X-ray image. Because the learning operations have been carried out in the manner described above, the signals accurately represent the appropriate read-out conditions for the final readout.

In the aforesaid embodiment of the nineteenth apparatus in accordance with the present invention, the computer system determines the read-out conditions for the final readout. Alternatively, predetermined read-out conditions may be used when the final readout is carried out regardless of the characteristics of the preliminary read-out image signal SP. On the basis of the preliminary read-out image signal SP, the computer system 40 may adjust the image processing conditions to be used in carrying out image processing of the image signal SQ. The computer system 40 may also adjust both the read-out conditions and the image processing conditions.

The aforesaid embodiment of the nineteenth apparatus in accordance with the present invention is applied to the radiation image read-out apparatus wherein the preliminary readout is carried out. However, the nineteenth apparatus in accordance with the present invention is also applicable to radiation image read-out apparatuses wherein no preliminary read-out operations are carried out, and only the aforesaid final read-out operations are carried out. In such cases, the image read-out operation is carried out under predetermined read-out conditions, and an image signal is thereby obtained. In the computer system, the image processing conditions are determined on the basis of the image signal. The image signal is image processed under the image processing conditions thus determined.

The nineteenth apparatus in accordance with the present invention is also applicable when conventional X-ray film, or the like, is used.

Also, the nineteenth apparatus in accordance with the present invention is not limited to the determination of the read-out conditions for the final readout and/or the image processing conditions. For example, the portion of the object the image of which was recorded, or the like, may be employed as the characteristic measures.

An embodiment of the twentieth apparatus, i.e. the radiation image analyzing apparatus, in accordance with the present invention will be described hereinbelow.

This embodiment is incorporated in the computer system 40 shown in FIG. 5.

In the computer system 40, the shape and location of an irradiation field are determined from the preliminary read-out image signal SP. Thereafter, the read-out conditions for the final readout, i.e. the sensitivity and the contrast during the final readout, are determined. By way of example, the voltage applied to the photomultiplier 27', the amplification factor of the amplifier 26' of the final read-out means 100', or the like, is controlled in accordance with the read-out conditions for the final readout.

In the computer system 40, by using the neural network, the subdivision pattern of radiation images, the shape and location of an irradiation field, the orientation in which the object was placed when the image of the object was recorded, and/or the portion of the object the image of which was recorded are determined from the preliminary read-out image signal SP. Thereafter, the read-out conditions for the final readout are determined.

Figure 28:
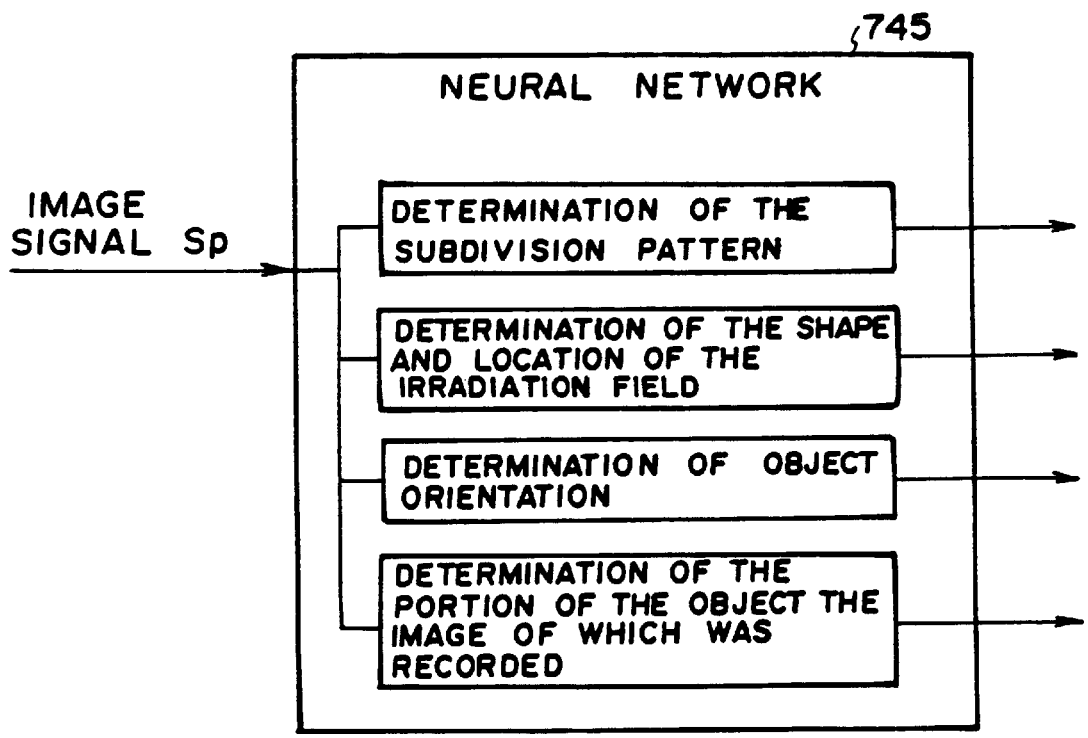
FIG. 28 is a block diagram showing the major part of an embodiment of the radiation image analyzing apparatus in accordance with the present invention.

As shown in FIG. 28, the preliminary read-out image signal SP is fed into a neural network 745. The neural network 745 determines the subdivision pattern of radiation images, the shape and location of an irradiation field, the orientation in which the object was placed when the image of the object was recorded, and/or the portion of the object the image of which was recorded are determined from the preliminary read-out image signal SP. The results of the determination are fed out as the characteristic measures from the neural network 745.

As shown in FIG. 27, only the image signal components of the preliminary read-out image signal SP, which represent the picture elements hatched in FIG. 27, may be sampled. Only the sampled image signal components may be fed into the neural network 745. In this manner, the number of input points of the neural network can be reduced. In most images, the major part of the image is present in the vicinity of the center part in the image. Therefore, the preliminary read-out image signal SP may be thinned out such that more image signal components remain, which correspond to the center part in the image, and less components remain, which correspond to the peripheral areas.

The neural network is constituted as shown in FIG. 3. Signals F1, F2, . . . , Fn1 fed into the first layer (the input layer) are the image signal components of the preliminary read-out image signal SP. The preliminary read-out image signal has been thinned out in the manner described above with reference to FIG. 27. Two outputs $y_1^3$ and $y_2^3$ obtained from the third layer (the output layer) are the signals representing the shape and location of the irradiation field (a circular irradiation field, a rectangular irradiation field, or the like) and the portion of the object the image of which was recorded (the head, the chest, the shoulder, the arm, or the like).

Preliminary read-out image signals are obtained in the manner described above from a plurality of stimulable phosphor sheets storing X-ray images, for which the shape and location of the irradiation field and the portion of the object, the image of which was recorded, are known. The preliminary read-out image signal SP is then thinned out in the manner shown in FIG. 27. In this manner, the n1 number of inputs F1, F2, . . . , Fn1 are obtained. The n1 number of inputs F1, F2, . . . , Fn1 are fed into the neural network shown in FIG. 3, and the learning operations of the neural network are repeated in the same manner as that described above. The instructor signals representing the results of determination, which are correct for the image, represent the x-coordinate $\tilde{y}_1^3$ and the y-coordinate $\tilde{y}_2^3$. At the time at which the learning operations are completed, the two outputs $y_1^3$ and $y_2^3$ accurately represents the shape and location of the irradiation field and the portion of the object the image of which was recorded.

In cases where the signal representing the irradiation field represents, for example, only whether the irradiation field is circular or rectangular, one of the two outputs may represent 1 (for the circular irradiation field) or 0 (for the rectangular irradiation field). In such cases, the determination can be carried out very easily by the neural network.

Also, for the portion of the object the image of which was recorded, several portions of the object may be represented by numerals. In this manner, the determination can be carried out very easily by the neural network.

After the learning operations are completed, a preliminary read-out image signal SP representing an X-ray image, for which the shape and location of the irradiation field and the portion of the object, the image of which was recorded, are unknown, is obtained. The preliminary read-out image signal SP is fed into the neural network shown in FIG. 3. The outputs $y_1^3$ and $y_2^3$ obtained from the neural network are utilized as signals representing the shape and location of the irradiation field and the portion of the object, the image of which was recorded. Because the learning operations have been carried out in the manner described above, the signals accurately represent the shape and location of the irradiation field and the portion of the object, the image of which was recorded.

By way of example, the voltage applied to the photomultiplier 27', the amplification factor of the amplifier 26' of the final read-out means 100', or the like, is controlled in accordance with the signals accurately representing the shape and location of the irradiation field and the portion of the object, the image of which was recorded, the signals being obtained from the neural network. The final readout is carried out under the controlled conditions.

In the aforesaid embodiment of the twenties apparatus in accordance with the present invention, the shape and location of the irradiation field and the portion of the object, the image of which was recorded, are determined by the neural network. The subdivision pattern and the orientation, in which the object was placed when the image of the object was recorded, can also be determined in the same manner by the neural network. In such cases, as the two outputs, the signals representing the subdivision pattern and the orientation, in which the object was placed when the image of the object was recorded, are generated.

In cases where the signal representing the orientation, in which the object was placed when the image of the object was recorded, represents 1 (frontal orientation) or 0 (side orientation), the determination can be carried out very easily by the neural network.

Also, the signal representing the subdivision pattern may represents numerals assigned to four patterns (e.g., a two-on-one subdivision pattern having two radiation images which are vertically adjacent to each other, a two-on-one subdivision pattern having two radiation images which are horizontally adjacent to each other, a four-on-one subdivision pattern having four radiation images which are vertically and horizontally adjacent to each other, and a one-on-one pattern). In this manner, the determination can be carried out very easily by the neural network.

How a binary pattern signal representing the shape and location of the irradiation field, which have been determined by the neural network, is post-processed will be described hereinbelow.

The signal $y_1^3$ fed out of the neural network represents the shape and location of the irradiation field. However, the signal is slightly inaccurate for the edge of the irradiation field. Therefore, the shape of the irradiation field, which is formed on the basis of the binary pattern signal, is not completely straight with respect to the edge of the irradiation field.

Therefore, a binary image process should preferably be carried out on the binary pattern signal obtained from the neural network. With such a process, a signal accurately representing the edge of the irradiation field can be obtained.

First, how a figure fusing process (a binary image smoothing process), which is an example of the binary image process, is carried out will be described below. In general, the figure fusing process is composed of two basic processes: i.e. contraction and dilatation.

The contraction process is also referred to as the erosion process. With this process, all of picture elements located at the boundary of a figure are eliminated (i.e., the picture elements, which have been set to 1, are converted into the picture elements having been set to 0). Specifically, a picture element in an input image fij is converted into a picture element in an output image gij, the conversion being expressed as $$gij = \begin{cases} 0: & \text{when } fij = 0, \text{ or when one of four} \\ & \text{(or eight) neighboring picture elements} \\ & \text{around } fij \text{ is } 0 \\ 1: & \text{in other cases} \end{cases}$$

The dilatation process is also referred to as the expansion process or the propagation process. With the dilatation process, the picture elements located at the boundary of a figure are increased (i.e., the picture elements, which have been set to 0, are converted into the picture elements having been set to 1). Specifically, a picture element in an input image fij is converted into a picture element in an output image gij, the conversion being expressed as $$gij = \begin{cases} 1: & \text{when } fij = 1, \text{ or when one of four} \\ & \text{(or eight) neighboring picture elements} \\ & \text{around } fij \text{ is } 1 \\ 0: & \text{in other cases} \end{cases}$$

When the basic contraction and dilatation processes are combined, most of the noise components in a binary image can be eliminated. Therefore, the binary image can be smoothed.

For example, as shown in FIG. 29A, in cases where an isolated point "a" having been set to 1 is present in the original image, in order for the isolated point "a" to be eliminated, the contraction process is carried out on the original image, and it is thus converted into the image shown in FIG. 29B. Thereafter, the dilatation process is carried out to convert the image of FIG. 29B into the image shown in FIG. 29C. In FIGS. 29A, 29B, 29C, 30A, 30B, and 30C, circles indicate the picture elements having been set to 1, and dots indicate the picture elements having been set to 0.

In the image which has been obtained as shown in FIG. 29C, no isolated point "a" is present. In this manner, the isolated point "a" can be eliminated.

As shown in FIG. 30A, in cases where a missing point "b" (i.e. an isolated point having been set to 0) is present in the original image, in order for the missing point "b" to be eliminated, the dilatation process is carried out on the original image, and it is thus converted into the image shown in FIG. 30B. Thereafter, the contraction process is carried out to convert the image of FIG. 30B into the image shown in FIG. 30C. In the image which has been obtained as shown in FIG. 30C, no missing point "b is present. In this manner, the missing point "b" can be eliminated.

FIG. 31 shows an example of how the figure fusing process is applied to the binary pattern signal representing the shape and location of the irradiation field.

With reference to FIG. 31, a contraction process 701 and a dilatation process 702 are carried out in this order on the binary pattern signal, which has been obtained from the neural network and represents the shape and location of the irradiation field. Thereafter, a dilatation process 703 and a contraction process 704 are carried out in this order.

By carrying out the contraction process 701 and then carrying out the dilatation process 702 on the binary pattern signal representing the shape and location of the irradiation field, isolated points present in the vicinity of the edge of the irradiation field can be eliminated. By carrying out the dilatation process 703 and then carrying out the contraction process 704 on the binary pattern signal representing the shape and location of the irradiation field, missing points present in the vicinity of the edge of the irradiation field can be eliminated.

Therefore, when the isolated point eliminating processes and the missing point eliminating processes are carried out sequentially on the binary pattern signal representing the shape and location of the irradiation field, the boundary in the binary pattern can be smoothed. As a result, a binary pattern signal, which accurately represents the shape and location of the irradiation field at its edge, can be obtained.

A different example of the binary image process will be described hereinbelow.

With reference to FIG. 32, in this example, the edge of the irradiation field is accurately detected by carrying out differentiation processing on the signal components of the binary pattern signal corresponding to the edge of the irradiation field.

Specifically, with the binary pattern signal, which has been obtained from the neural network and represents the shape and location of the irradiation field, the boundary in the binary pattern does not necessarily coincide with the edge of the irradiation field. However, the amount of such an error is small. Therefore, by carrying out differentiation processing only on the signal components of the binary pattern signal corresponding to the boundary in the binary pattern, the edge of the irradiation field can be detected and accurately.

On the basis of the shape and location of the irradiation field, which have been determined by the aforesaid two binary image processes, the read-out conditions for the final readout and/or the image processing conditions are determined.

How the signal, which is obtained from the neural network and represents the portion of the object the image of which was recorded, is post-processed will be described hereinbelow.

As described above, the read-out conditions for the final readout and/or the image processing conditions are determined on the basis of the information, which is obtained from the neural network and represents the portion of the object the image of which was recorded. In cases where a pattern of an artificial bone or a plaster cast is included in the image, the ordinary image analysis cannot be carried out for determining the conditions.

In such cases, the neural network judges whether a pattern of an artificial bone or a plaster cast is or is not included in the image.

The judgment is made based on the signal $y_2^3$, which is obtained from the neural network and represents the portion of the object the image of which was recorded.

In cases where, from the signal $y_2^3$ representing the portion of the object the image of which was recorded, it has been judged that a pattern of an artificial bone is present in the image, the ordinary image analysis is not carried out, but a special analysis for a pattern of an artificial bone is carried out. For example, as disclosed in Japanese Unexamined Patent Publication No. 61(1986)-170729, a predetermined cumulative correction value is added to the ordinary image analysis. In cases where it has been judged that a pattern of a plaster cast is included in the image, the ordinary image analysis is not carried out, but a fixed sensitivity read-out operation is carried out. Alternatively, an alarm is issued, and an image analysis (an interactive processing as disclosed in Japanese Unexamined Patent Publication No. 61(1986)-156250) is carried out manually.

The ordinary image analysis is carried out in cases where, from the signal $y_2^3$ representing the portion of the object the image of which was recorded, it has been judged that no pattern of an artificial bone or a plaster cast is included in the image.

In the aforesaid embodiment of the twentieth apparatus in accordance with the present invention, the computer system determines the read-out conditions for the final readout. Alternatively, predetermined read-out conditions may be used when the final readout is carried out regardless of the characteristics of the preliminary read-out image signal SP. On the basis of the preliminary read-out image signal SP, the computer system 40 may adjust the image processing conditions to be used in carrying out image processing of the image signal SQ. The computer system 40 may also adjust both the read-out conditions and the image processing conditions.

The aforesaid embodiment of the twentieth apparatus in accordance with the present invention is applied to the radiation image read-out apparatus wherein the preliminary readout is carried out. However, the twentieth apparatus in accordance with the present invention is also applicable to radiation image read-out apparatuses wherein no preliminary read-out operations are carried out, and only the aforesaid final read-out operations are carried out. In such cases, the image read-out operation is carried out under predetermined read-out conditions, and an image signal is thereby obtained. In the computer system, the image processing conditions are determined on the basis of the image signal. The image signal is image processed under the image processing conditions thus determined.

The twentieth apparatus in accordance with the present invention is also applicable when conventional X-ray film, or the like, is used.

We claim:

1. A method for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the method for adjusting read-out conditions and/or image processing conditions for a radiation image comprising the steps of:

i) feeding information, which represents a probability density function of said first image signal, into a neural network, and ii) feeding out information representing the read-out conditions and/or the image processing conditions from said neural network.

2. An apparatus for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the apparatus for adjusting read-out conditions and/or image processing conditions for a radiation image comprising:

i) a probability density function creating means for creating a probability density function of said first image signal and feeding out information, which represents said probability density function, and ii) a neural network for receiving said information, which represents said probability density function, from said probability density function creating means, adjusting the read-out conditions and/or the image processing conditions on the basis of said probability density function, and feeding out information representing the read-out conditions and/or the image processing conditions, which have thus been adjusted.

3. A method for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the method for adjusting read-out conditions and/or image processing conditions for a radiation image comprising the steps of:

i) feeding information, which represents a probability density function of said first image signal, and subsidiary information, which gives specifics about said radiation image stored on said stimulable phosphor sheet, into a neural network, and ii) feeding out information representing the read-out conditions and/or the image processing conditions from said neural network.

4. An apparatus for adjusting read-out conditions and/or image processing conditions for a radiation image, wherein a first image signal representing a radiation image of an object is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the apparatus for adjusting read-out conditions and/or image processing conditions for a radiation image comprising:

i) a probability density function creating means for creating a probability density function of said first image signal and feeding out information, which represents said probability density function, ii) a subsidiary information feed-out means for feeding out subsidiary information, which gives specifics about said radiation image stored on said stimulable phosphor sheet, and iii) a neural network for receiving said information, which represents said probability density function, from said probability density function creating means, receiving said subsidiary information from said subsidiary information feed-out means, adjusting the read-out conditions and/or the image processing conditions on the basis of said probability density function and said subsidiary information, and feeding out information representing the read-out conditions and/or the image processing conditions, which have thus been adjusted.

5. A method for adjusting image processing conditions for a radiation image, wherein image processing conditions, under which an image signal is to be image processed, are adjusted on the basis of the image signal representing a radiation image of an object, the method for adjusting image processing conditions for a radiation image comprising the steps of:

i) feeding information, which represents a probability density function of said image signal, into a neural network, and ii) feeding out information representing the image processing conditions from said neural network.

6. An apparatus for adjusting image processing conditions for a radiation image, wherein image processing conditions, under which an image signal is to be image processed, are adjusted on the basis of the image signal representing a radiation image of an object, the apparatus for adjusting image processing conditions for a radiation image comprising:

i) a probability density function creating means for creating a probability density function of said image signal and feeding out information, which represents said probability density function, and ii) a neural network for receiving said information, which represents said probability density function, from said probability density function creating means, adjusting the image processing conditions on the basis of said probability density function, and feeding out information representing the image processing conditions, which have thus been adjusted.

7. A method for adjusting image processing conditions for a radiation image, wherein image processing conditions, under which an image signal is to be image processed, are adjusted on the basis of the image signal representing a radiation image of an object, the method for adjusting image processing conditions for a radiation image comprising the steps of:

i) feeding information, which represents a probability density function of said image signal, and subsidiary information, which gives specifics about said radiation image, into a neural network, and ii) feeding out information representing the image processing conditions from said neural network.

8. An apparatus for adjusting image processing conditions for a radiation image, wherein image processing conditions, under which an image signal is to be image processed, are adjusted on the basis of the image signal representing a radiation image of an object, the apparatus for adjusting image processing conditions for a radiation image comprising:

i) a probability density function creating means for creating a probability density function of said image signal and feeding out information, which represents said probability density function, ii) a subsidiary information feed-out means for feeding out subsidiary information, which gives specifics about said radiation image, and iii) a neural network for receiving said information, which represents said probability density function, from said probability density function creating means, receiving said subsidiary information from said subsidiary information feed-out means, adjusting the image processing conditions on the basis of said probability density function and said subsidiary information, and feeding out information representing the image processing conditions, which have thus been adjusted.

* * * * *